(12) United States Patent　(10) Patent No.: US 7,433,137 B2
Irisawa　(45) Date of Patent: *Oct. 7, 2008

(54) LENS BARREL, CAMERA AND PORTABLE INFORMATION TERMINAL APPARATUS

(75) Inventor: Shigeru Irisawa, Chigasaki (JP)

(73) Assignee: Ricoh Company, Ltd., Tokyo (JP)

( * ) Notice: Subject to any disclaimer, the term of this patent is extended or adjusted under 35 U.S.C. 154(b) by 71 days.

This patent is subject to a terminal disclaimer.

(21) Appl. No.: 11/583,838

(22) Filed: Oct. 20, 2006

(65) Prior Publication Data

US 2007/0035857 A1　Feb. 15, 2007

Related U.S. Application Data

(63) Continuation of application No. 11/367,352, filed on Mar. 6, 2006, now Pat. No. 7,133,224.

(30) Foreign Application Priority Data

Mar. 9, 2005　(JP)　............................. 2005-064845

(51) Int. Cl.
G02B 7/02　(2006.01)
(52) U.S. Cl. ........................ 359/819; 359/822; 359/826
(58) Field of Classification Search ................ 359/811, 359/813, 817, 821, 822, 823, 826, 829, 819
See application file for complete search history.

(56) References Cited

U.S. PATENT DOCUMENTS 7,133,224 B2 * 11/2006 Irisawa ....................... 359/819

FOREIGN PATENT DOCUMENTS

JP　2003-149723　5/2003
JP　2003-315861　11/2003

* cited by examiner

Primary Examiner—Timothy J Thompson
(74) Attorney, Agent, or Firm—Oblon, Spivak, McClelland, Maier & Neustadt, P.C.

(57) ABSTRACT

A lens barrel includes a) a plurality of lens groups each having at least one lens, b) a plurality of lens retaining frames, including a retractable lens retaining frame, c) lens retaining frame driving devices, d) a main-guide shaft member in parallel to the optical axis to support the retractable lens retaining frame rotatably in longitudinal and circumferential directions of the main-guide shaft member, and e) a sub-guide shaft member to guide the retractable lens retaining frame along the optical axis and to allow the retractable lens retaining frame to be retracted toward the retracted position at a retracting point on the main-guide shaft member and to guide the retractable lens retaining frame on the main-guide shaft member along the optical axis at other than the retracting point. The retractable lens retaining frame is formed with an engaging portion to engage with the sub-guide shaft member and to be guided along the sub-guide shaft member, and the engaging portion being formed with an opened portion configured to allow the retractable lens retaining frame to be released from the sub-guide shaft member at the retracting point.

24 Claims, 33 Drawing Sheets

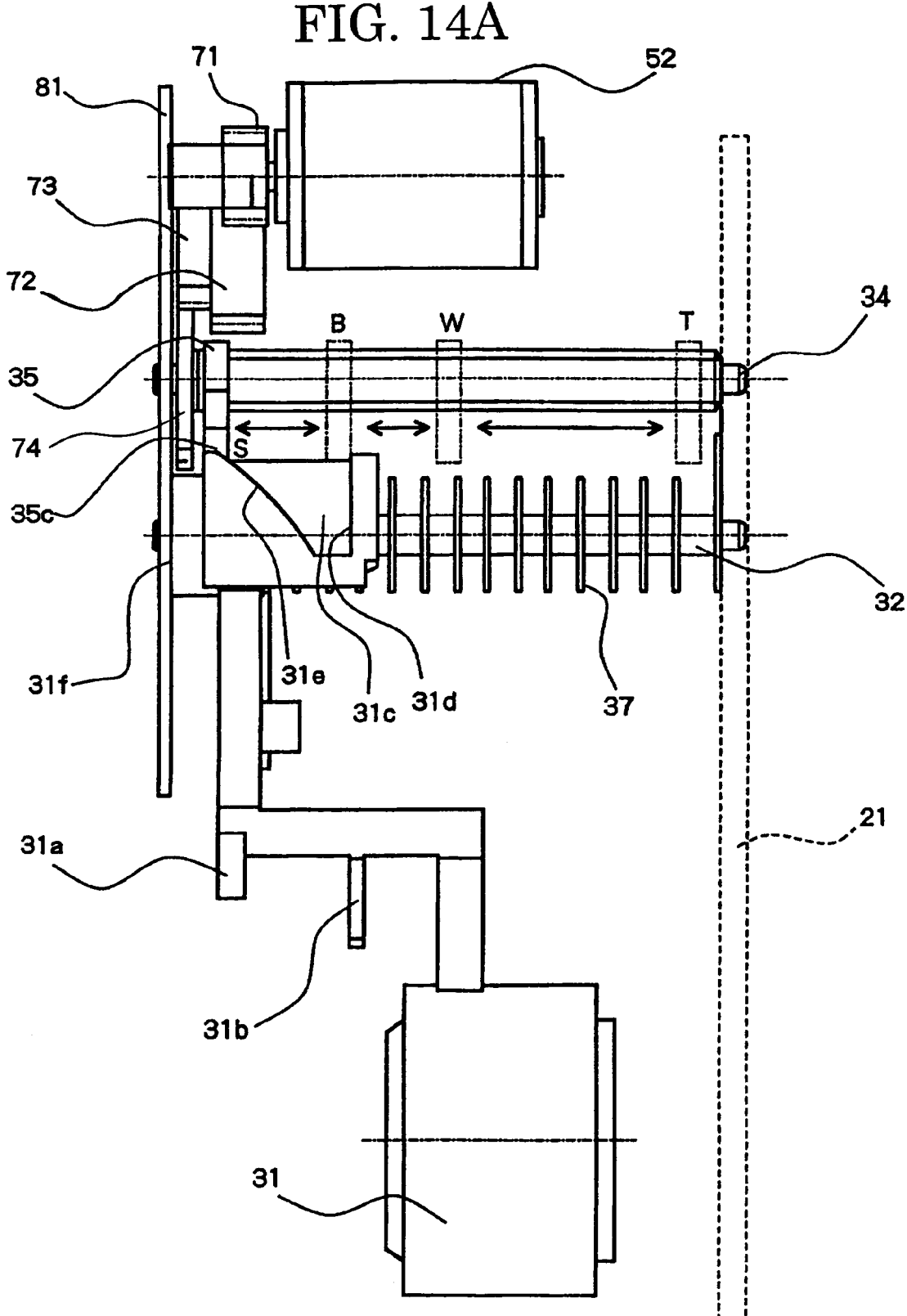

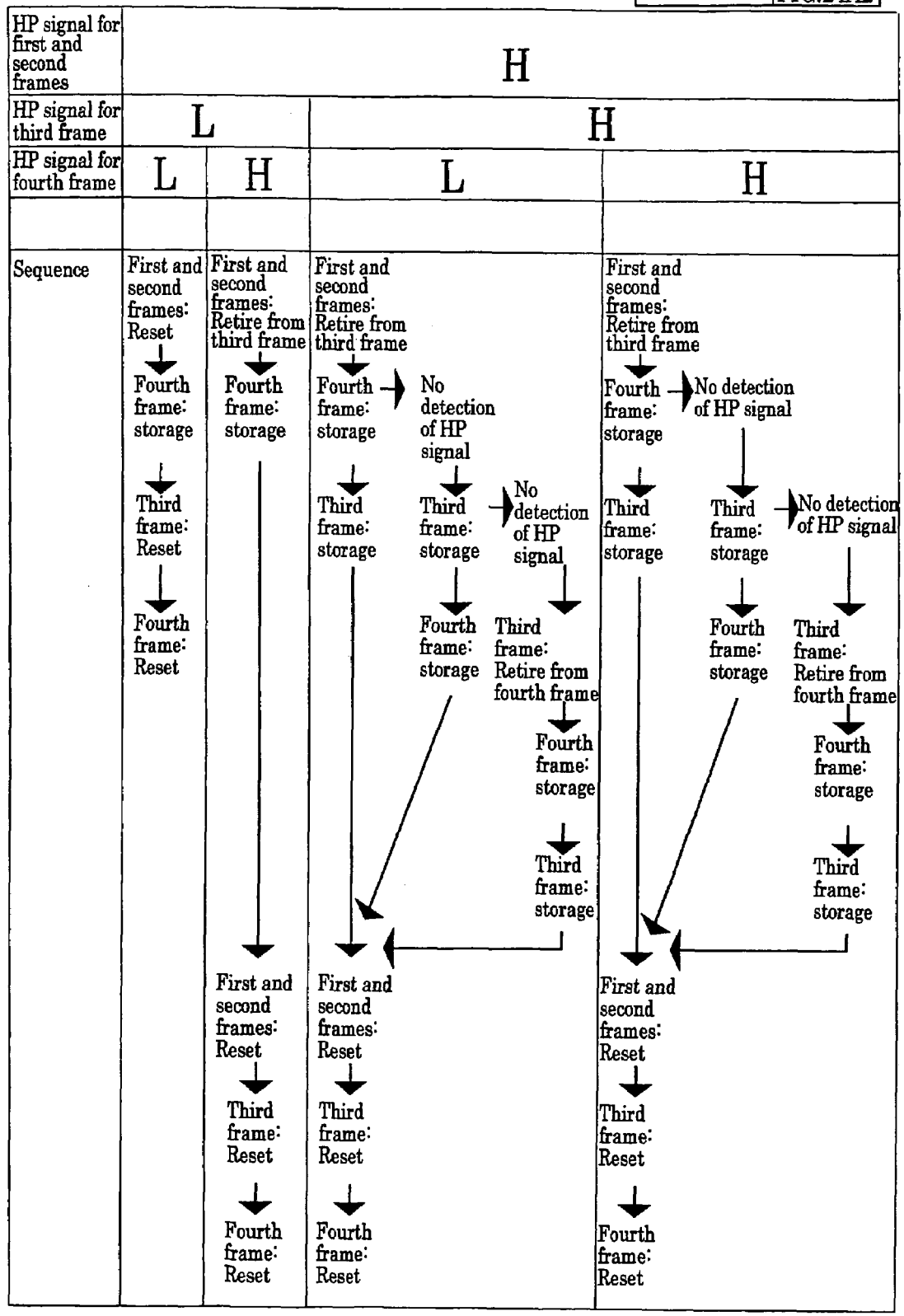

FIG.24A2
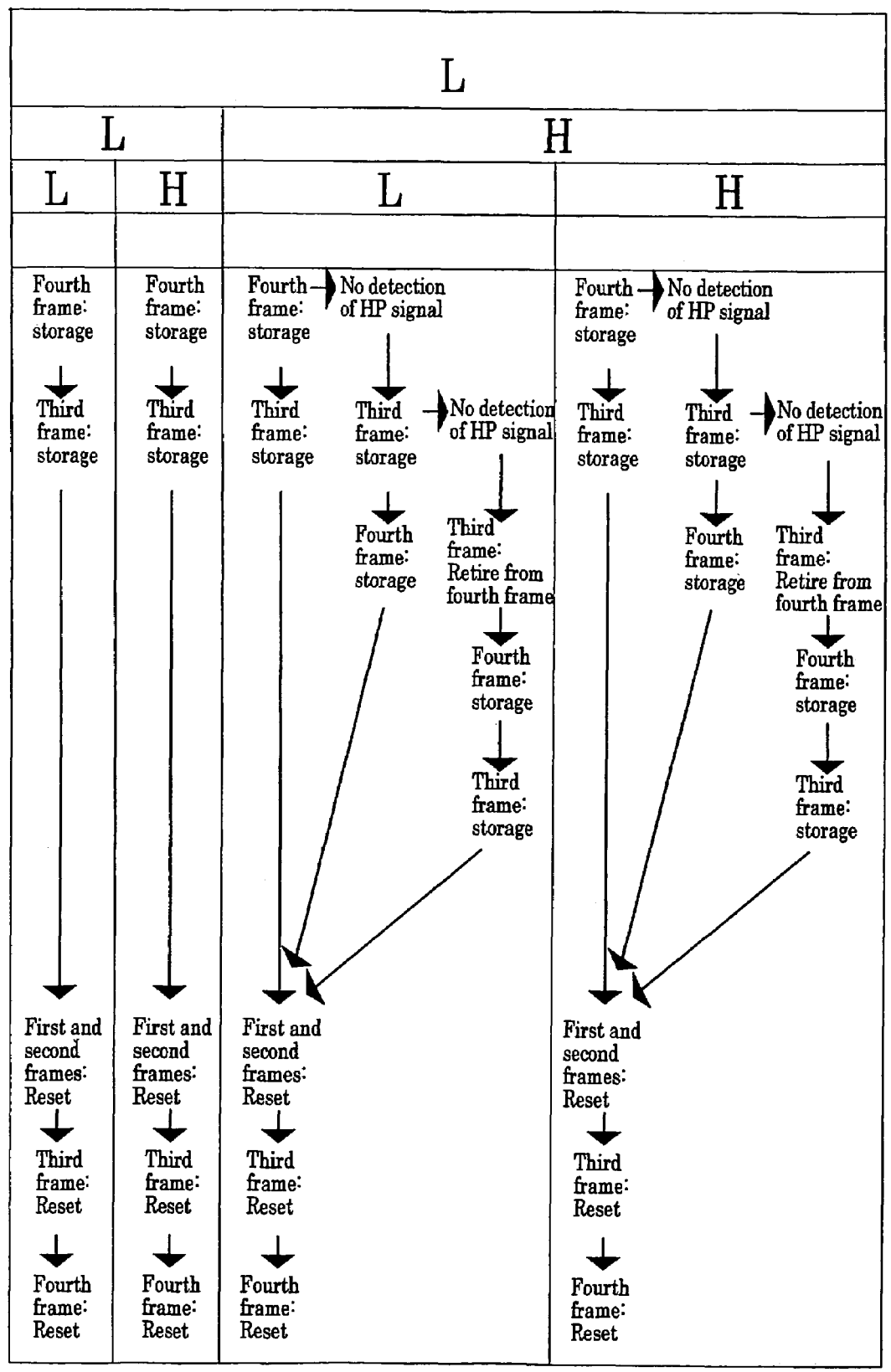

LENS BARREL, CAMERA AND PORTABLE INFORMATION TERMINAL APPARATUS

CROSS-REFERENCE TO RELATED APPLICATION

The present application claims the priority benefit of Japanese Patent Application 2005-064845 filed on Mar. 9, 2005, the entire contents of which are incorporated herein by reference. This application is a continuation of application Ser. No. 11/367,352, filed Mar. 6, 2006, now U.S. Pat. No. 7,133,224.

TECHNICAL FIELD

The present invention relates to a lens barrel which collapses lens groups when in one state, and protrudes the lens groups to predetermined positions for use when in the other state. More particularly, the present invention relates to a lens barrel, a camera, a portable information terminal apparatus and an image pickup apparatus including a lens barrel suitable for a zoom lens unit that can change a focal distance by relatively moving a plurality of lens groups.

BACKGROUND ART

With improvement in high performance of a photographing lens such as a zoom lens unit which is capable of changing the focal distance and in downsizing according to the user's demand as to an image pickup apparatus such as a digital camera, there are increasing types of image pickup apparatus employing a so-called collapsing photographing lens unit in which lens cylinders are collapsed within a body of the image pickup apparatus when photographing is not carried out. Furthermore, since not only a simple reduction in dimensions but also a further reduction in a thickness of the image pickup apparatus are also demanded, it is now important to reduce the thickness of the lens barrel portion in a collapsed state.

As a technology to cope with the demand for reduction in the thickness of the image pickup apparatus, a construction has been used, in which the lens cylinders are collapsed into the body of the image pickup apparatus when the photographing is not carried out and in which a part of the lenses is evacuated from an optical axis of the lenses in photographing, when the lens cylinders are collapsed. Such a technology is disclosed, for example, in JP-A 2003-315861 and in JP-A 2003-149723. According to the structures disclosed in these Japanese unexamined patent application publications, since a part of the lenses is evacuated from the optical axis when the lens cylinders are collapsed, the dimension of the entire lenses in a direction of the optical axis can be reduced in the collapsed state, so that the thickness of the image pickup apparatus can be reduced.

However, in the structures disclosed in JP-A 2003-315861 and JP-A 2003-149723, the position of the lens evacuated from the optical axis is substantially within that lens cylinder which has the maximum outer diameter. Therefore, the lens cylinders contribute to reduction in thickness of the image pickup apparatus when the lenses are collapsed, but the outer diameter of the lens barrel increases. When compared with a case where the lens is not evacuated from the optical axis, since the outer diameter of the lens cylinders increase, the dimensions of the lens cylinders, in particular, the dimensions of the lens cylinders as viewed in a plane orthogonal to the optical axis increase. As a result, there is a problem that the dimensions of the image pickup apparatus, in particular, the dimension as viewed from a front side of the image pickup apparatus increases.

RICOH CO. LTD. proposed in Japanese Patent Application No. 2005-044909 (not published) a lens barrel in which the thickness of an image pickup device can be made smaller without increasing the size of the image pickup device. The lens barrel described in comprises a plurality of lens retaining frames holding a plurality of lens groups, respectively. Among the lens retaining frames, a retractable retaining frame is included, which is adapted to retract at least one lens of at least one lens group from the optical axis of the other lens groups when shifting a collapsed state. The retractable lens retaining frame is supported, by main-guide shaft member parallel to the optical axis of the other lens groups, movably in a longitudinal direction of the main-guide shaft member and rotatably around the axis of the main-guide member. A compression torsion spring provided around the main-guide shaft member gives to the retractable lens retaining frame a rotation-urging force toward the optical axis of the other lens groups as well as an urging force in a collapsing direction along the optical axis.

The location of the optical axis of the lens retained by the retractable lens retaining frame on photographing is defined through the retractable retaining frame is defined when the retractable lens retaining frame is brought into contact with an auxiliary shaft member, by means of the rotation urging force of the spring, for guiding the retractable lens retaining frame along the optical axis of the other lens groups. On the other hand, the retractable lens retaining frame is turned around the main-guide shaft member against the rotation urging force of the spring when being collapsed such that the lens retained by the retractable lens holding frame may be retracted outside the maximum outer diameter of the lens barrel. Thereby, the increase in the outer diameter of the lens barrel can be more suppressed as compared with a conventional case in which the retracted position of the retracted lens is inside the maximum outer diameter of the lens barrel.

However, according to the invention described in Japanese patent application No. 2005-044909, the axis of the lenses is out of alignment on photographing, when the retractable lens retaining frame receives vibration and this vibration swings the retractable lens refraining frame in direction of leaving the auxiliary guide shaft member over the rotation urging force of the compression torsion spring. It may be considered that a restraining member is provided to prevent the auxiliary guide member of the restraint lens retaining frame on photographing, vibration of the retractable lens retaining frame is prevented in the state that the retractable lens retaining frame is held in between the restraining member and the auxiliary guide shaft member. In this case, the restraining member needs to be newly provided, resulting in completed construction.

SUMMARY OF THE INVENTION

Under the circumstances, the present invention is to provide a lens barrel in which the optical axis of the retractable lens retained by the retractable lens retaining frame can be assuredly prevented from shaking on photographing by inhibiting the retractable lens retaining frame from leaving the auxiliary guide shaft member on photographing, without providing a new retraining member or thus resulting in complicated construction.

DISCLOSURE OF THE INVENTION

The lens barrel according to the present invention, comprises:
a) a plurality of lens groups each having at least one lens;

b) a plurality of lens retaining frames each retaining corresponding one of the plurality of the lens groups, said plurality of the lens retaining frames comprising a retractable lens retaining frame, c) lens retaining frame driving devices configured to drive the plurality of the lens retaining frames, said retractable lens retaining frame being configured to retain and move at least one lens group such that the retractable lens retaining frame aligns the corresponding at least one lens group the other along an identical optical axis in photographing state in which at least a part of the plurality of lens groups is moved toward a subject to be photographed, and retracts said corresponding at least one lens group outside a telescopic cylinder containing therein the other lens groups to a retracted position in a collapsed state in which at least a part of the plurality of the lens groups is collapsed to store the lens groups, said telescopic cylinder being constituted by movable lens cylinders for said the other lens groups, respectively;

d) a main-guide shaft member which is in parallel to said optical axis of the other lens group or groups and supports the retractable lens retaining frame rotatably in longitudinal and circumferential directions of the main-guide shaft member, and e) a sub-guide shaft member configured to guide said retractable lens retaining frame along the optical axis, said sub-guide shaft member being configured to allow said retractable lens retaining frame to be retracted toward the retracted position at a retracting point on said main-guide shaft member and to guide said retractable lens retaining frame on the main-guide shaft member along said optical axis at other than the retracting point, said retractable lens retaining frame being formed with an engaging portion configured to engage with the sub-guide shaft member and to be guided along the sub-guide shaft member, and said engaging portion being formed with an opened portion configured to allow said retractable lens retaining frame to be released from the sub-guide shaft member at said retracting point.

The following are preferred embodiments (1) to (7) of the lens barrel according to the present invention. Any combinations of the preferred embodiments are also preferred in the present invention, unless any contrary occurs.

(1) Said movable lens cylinders retains said movable lens retaining frames therein, said movable lens retaining frames are driven by said lens retaining frame driving device via said movable lens cylinders, respectively, and said retractable lens retaining frame retracts said at least one retractable lens outside inner diameter portions of said movable lens cylinders at said retracting point.

(2) The sub-guide shaft member is formed with a diameter-reduced portion at a position corresponding to said retracting point of said retractable lens retaining frame, said diameter-reduced portion being configured to be released from the engaging portion through the opened portion.

(3) A base portion of said sub-guide shaft member is fixed to a stationary portion of a lens barrel body, and said diameter-reduced portion is formed near said base portion.

(4) The lens barrel further comprises an urging device, and said retractable lens retaining frame receives one direction rotation urging force toward the optical axis and an urging force toward a collapsing direction along the optical axis from the urging device.

(5) A digital camera comprises the lens barrel according to the present invention.

(6) A mobile information terminal comprises the lens barrel according to the present invention.

(7) An image inputting device comprises the lens barrel according to the present invention.

According to the present invention, since the engaging portion provided in the retractable lens retaining frame is engaged with the sub-guide shaft member which is configured to allow said retractable lens retaining frame to be retracted toward the retracted position at the retracting point on said main-guide shaft member and to guide said retractable lens retaining frame on the main-guide shaft member along the optical axis at other than the retracting point, the retractable lens retaining frame is allowed to move along the sub-guide shaft member at other than the retracting point on the optical axis, while the retractable lens retaining frame is assuredly prevented from moving away from the sub-guide shaft member. In addition, since the retractable lens retaining frame is allowed at the retracting point to move toward the retracted position by means of the opened portion formed in the engaging portion of the retractable lens retaining frame, no restraining member is newly added to restrain the retractable lens retaining frame from moving away from the sub-guide shaft member on photographing. Therefore, the retractable lens retaining frame can be assuredly prevented from moving away from the sub-guide shaft member on photographing without causing complicated construction due to the addition of such a new member, so that shake of the optical axis of the retractable lens retained by the retractable lens retaining frame can be assuredly prevented on photographing.

According to the construction of the preferred embodiment (1) of the present invention, the dimension of the lens barrel in the direction of the photographing optical axis can be effectively reduced without conspicuously increasing the size within the plane orthogonal to the photographing optical axis.

According to the construction of the preferred embodiment (2) of the present invention, the diameter-reduced portion formed around the sub-guide shaft member at the position corresponding to said retracting point of said retractable lens retaining frame, said diameter-reduced portion can assuredly and smoothly release the engaging portion from the sub-guide shaft member through the opened portion.

According to the construction of the preferred embodiment (3) of the present invention, since the base portion of said sub-guide shaft member is fixed to the stationary portion of the lens barrel body and said diameter-reduced portion is formed near said base portion, the retractable lens retaining frame can be assuredly moved to the retracted position during the collapsing operation.

According to the construction of the preferred embodiment (4) of the present invention, since said retractable lens retaining frame receives one direction rotation urging force toward the optical axis and an urging force toward a collapsing direction along the photographing optical axis from the urging device, the retractable lens retained by the retractable lens retaining frame can be stably operated with further simplified construction at a lower cost and a reduced space.

According to the construction of the preferred embodiment (5) of the present invention, the lens barrel according to the present invention is applied to the digital camera. Therefore, the dimension of the digital camera in the direction of the photographing optical axis can be effectively reduced without conspicuously increasing the size within the plane orthogonal to the photographing optical axis.

According to the construction of the preferred embodiment (6) of the present invention, the lens barrel according to the present invention is applied to the mobile information terminal. Therefore, the dimension of the mobile information terminal in the direction of the photographing optical axis can be effectively reduced without conspicuously increasing the size within the plane orthogonal to the photographing optical axis.

According to the construction of the preferred embodiment (7) of the present invention, the lens barrel according to the present invention is applied to the image inputting device. Therefore, the dimension of the image inputting device in the direction of the photographing optical axis can be effectively reduced without conspicuously increasing the size within the plane orthogonal to the photographing optical axis.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 14A is a side view showing a structure of the third frame and its drive system.

FIGS. 17A and 17B are perspective views showing an exterior appearance and a structure of a camera according to a second embodiment of the present invention as viewed from the subject, in which FIG. 17A shows a state in which a photographing lens is collapsed in a body of the camera, and FIG. 17B shows a state in which the photographing lens is projected or extended from the camera body.

FIG. 24 B is a timing chart of an H signal.

BEST MODE FOR CARRYING OUT THE INVENTION

Figure 1:
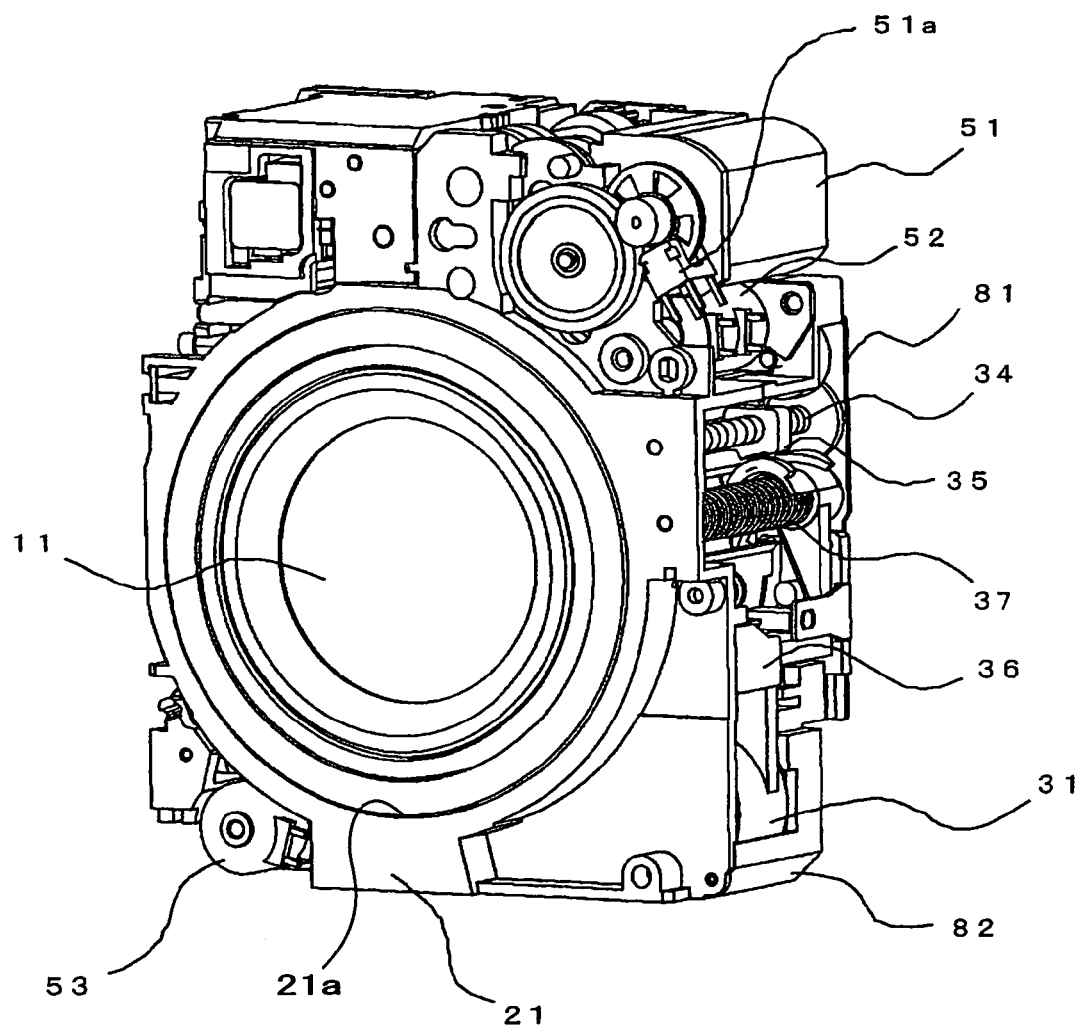
FIG. 1 is a perspective view showing a structure of a main part of an optical system device including a lens barrel according to a first embodiment of the present invention with lens groups collapsed, as view from a subject.

Reference will now be made in detail, based on preferred embodiments of the present invention, to the accompanying drawings. Wherever possible, the same reference numbers are used in the drawings and the description to refer to the same or like parts. The present invention, however, is not limited to these embodiments. Within the scope of the present invention, any structure and material described below can be appropriately modified.

FIG. 1 to FIGS. 16A and 16B and FIGS. 20A and 20B illustrate a first embodiment of a lens barrel according to the present invention.

In FIG. 1 to FIGS. 16(A) and 16(B) and FIGS. 20A and 20B, the lens barrel includes a fixed frame 21 having a fixed cylinder 21a, a telescopic cylinder unit or telescopic cylinder attached to the fixed frame 21, and a plurality of lens groups disposed in the telescopic cylinder. The telescopic cylinder is telescopically movable and collapsible along an optical axis X of the plurality of lens groups. The telescopic cylinder is constituted by the fixed cylinder 21a and movable lens cylinders mentioned later.

Figure 9A:
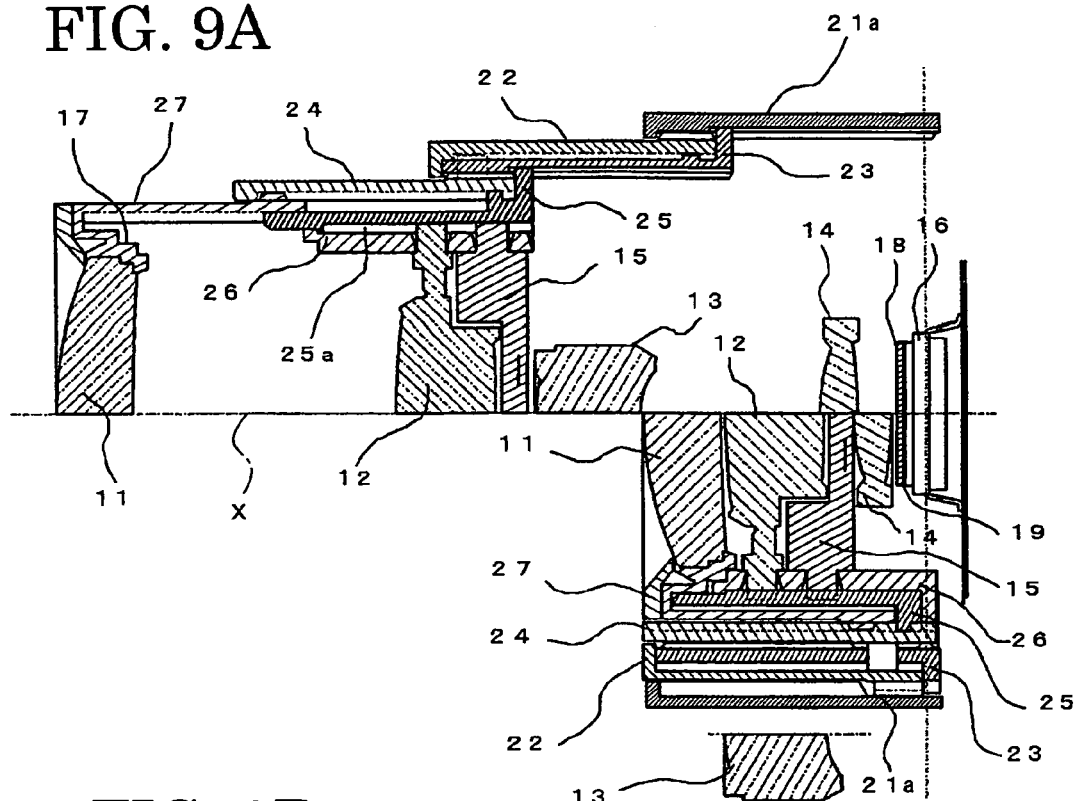
FIGS. 9A and 9B are vertical cross sectional views showing, in an upper half and a lower half with respect to an optical axis, main parts of the lens groups, the lens retaining frames, and the various lens cylinders of the lens barrel in the photographing state, respectively, FIG. 9A showing the state that the lens groups are extended to a position in which the lens groups are extended to a telephotographic position, and FIG. 9B showing the state that the lens groups are projected to a mouth corner.
Figure 9B:
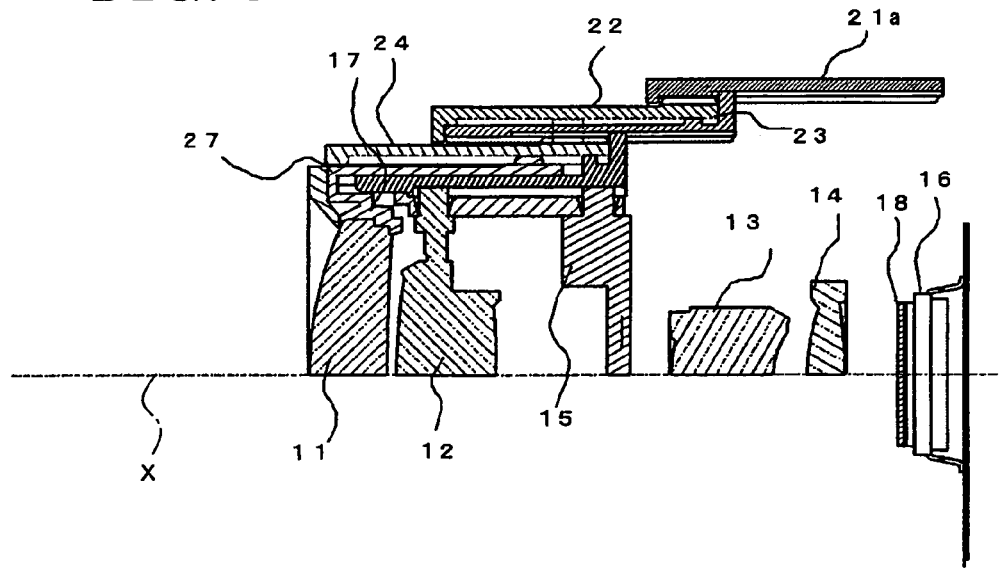

Referring to FIGS. 9A and 9B, the lens groups comprise, for example, a first lens group (movable lens) 11, a second lens group (movable lens) 12, a third lens group (movable lens) 13, and a fourth lens group (movable lens) 14, which are disposed through an optical axis in this order in an image pickup state, as viewed from a side of an object. A shutter/aperture unit 15 is inserted and disposed between the second lens group 12 and the third lens group 13. A solid-state image sensing device 16 constituted by using CCD (Charge-Coupled Device) or is arranged at an imaging side of the fourth lens group 14. A focal distance-variable lens is constituted by these first to fourth lens groups 11 to 14. The first lens group 11 is constituted by at least one lens, and is fixedly held by a linearly-moving cylinder 27 via a first lens retaining frame 17, which totally retains the first lens group 11.

The second lens group 12 includes one or more lens. A cam follower formed on a second frame (not clearly shown) for integrally retaining the second lens group 12 is inserted into a cam groove, for the second lens group 12, formed on the cam cylinder 26 shown in FIGS. 9 and 11, and engages with a linear groove 25a of the second liner 25, and the second lens group 12 is supported by the cam cylinder 26 and the second liner 25. The shutter/aperture unit 15 includes a shutter and an aperture, and a cam follower formed integrally with the shutter/aperture unit 15 is inserted into a cam groove for the shutter/aperture of the cam cylinder 26 shown in FIG. 11 and is engaged with the linear groove 25a on the second liner 25 so that the shutter/aperture unit is supported by the cam cylinder 26 and the second liner 25.

Figure 13A:
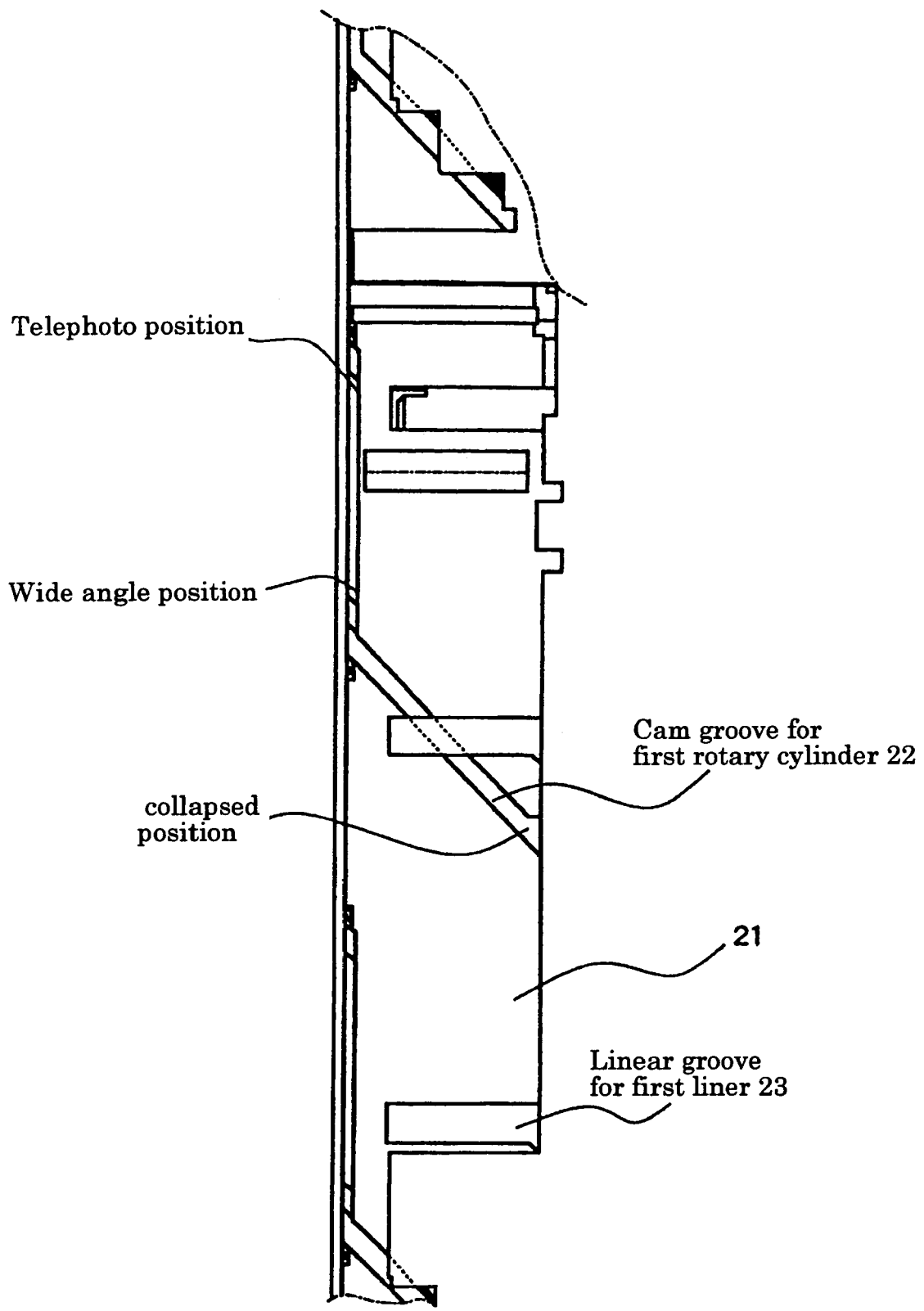
FIG. 13A is a schematic development elevation view showing a shape of cam grooves and key grooves formed on a fixed frame in a developed state with the helicoid omitted.
Figure 13B:
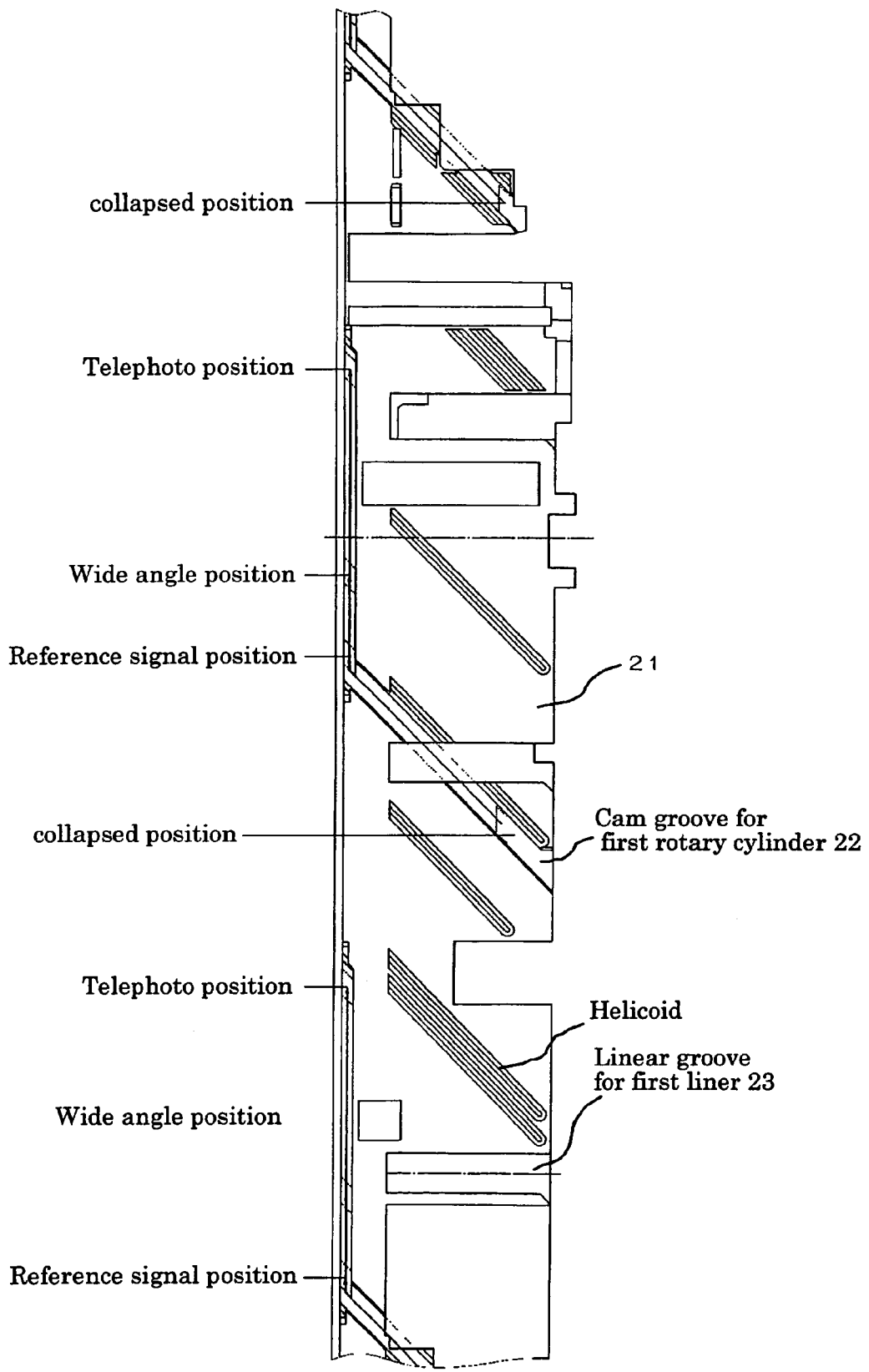
FIG. 13B is a schematic development elevation view with the helicoid added.
Figure 13C:
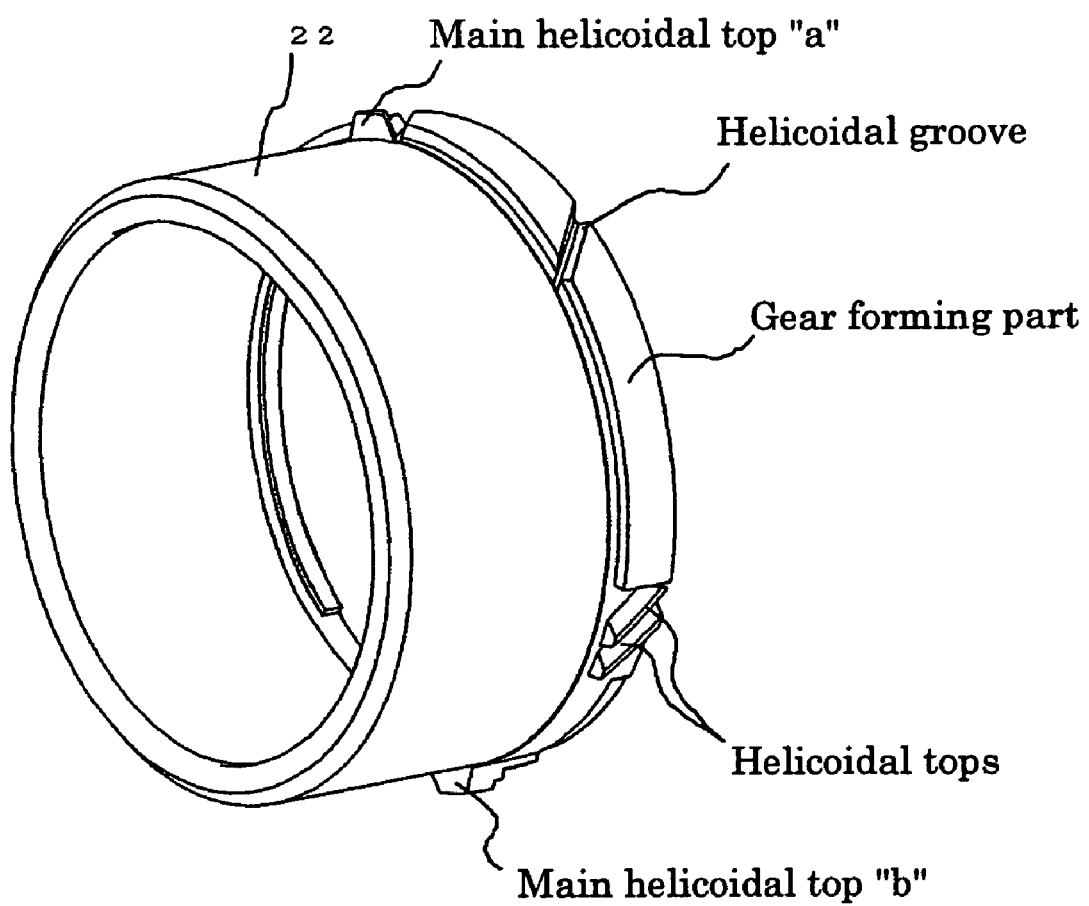
FIG. 13C is a perspective view of an exterior appearance of a first rotary cylinder to be fitted to a helicoid.

The fixed frame 21 includes a fixed cylinder having an inner surface which is formed with a linear groove and a helicoidal cam groove along an axial direction, as shown in FIGS. 13A and 13B. A helicoidal cam follower formed on an outer peripheral surface of a base portion of the first rotary cylinder 22 engages with the helicoidal cam groove, as shown in FIG. 13C, and a key portion projectedly formed on an inner surface of a base portion of the first liner 23 engages with the linear groove of the fixed frame of the fixed frame 21. An inner surface of the first rotary cylinder 22 is formed with a guide groove extending along a plane transverse to the optical axis X. Engaged with the guide groove is a follower or key which is formed to project from the outer peripheral surface of the first liner 23 in the vicinity of the base portion thereof and acts as a linear member. An inner surface of the first liner 23 is formed with a linear groove along the optical axis and a helicoids. In addition, the first liner 23 is formed with a clearance groove in which a cam follower formed projecting from an outer peripheral surface of a base portion of the second rotary cylinder 24 in the vicinity of the base portion is inserted.

A helicoid is formed on the outer peripheral surface of the base portion of the second rotary cylinder 24, and is engaged with the helicoid of the first liner 23. The cam follower formed projecting from the outer peripheral surface of the second rotary cylinder 24 in the vicinity of the base portion engages with the linear groove formed in the inner periphery of the first rotary cylinder 22 through the clearance groove of the cam follower on the first liner 23. A key portion formed projecting from the outer peripheral surface of the base portion of the second liner 25 engages with the linear groove provided on the inner peripheral surface of the first liner 23. An inner surface of the second rotary cylinder 24 is provided with a guide groove along a plane transverse to the optical axis, and a follower or key provided, as a linearly guiding member, projecting from the outer peripheral surface of the second liner 25 is engaged in the guide groove of the second rotary cylinder 24. With such a structure, the second liner 25 moves with the second rotary cylinder 24 in the movement along the optical axis, while the second rotary cylinder 24 is rotatable relative to the second liner 25.

The cam cylinder 26 fitted to the inner periphery of the second liner 25 is configured in such a manner that an engaging projection formed on the outer peripheral surface of the base portion is fitted to and engaged with the base portion of the second rotary cylinder 24 so as to rotate integrally with the second rotary cylinder 24. The inner surface of the second liner 25 is provided with a guide groove along a surface transverse to the optical axis X, and a follower or key projectedly provided, as a linearly guiding member, on the outer peripheral surface (front side) of the cam cylinder 26 engages with the cam groove. With such a structure, the cam cylinder 26 moves with the second liner 25 in the movement along the optical axis X, while is rotatable relative to the second liner 25.

The base portion of the lineally-moving cylinder 27 is inserted between the second rotary cylinder 24 and the second liner 25, and a cam follower is formed projecting from the outer peripheral surface of the lineally-moving cylinder 27 in the vicinity of the base portion, and the cam follower engages with the cam groove formed in the inner peripheral surface of the second rotary cylinder 24. A linear groove is formed on the inner peripheral surface of the lineally-moving cylinder 27 along the axial direction, and the key portion formed on the outer peripheral surface of the second liner 25 engages with the linear groove. A gear portion is formed on the outer periphery of the base portion of the first rotary cylinder 22, the gear portion is engaged with one or more gears which are driven by a zooming motor 51 so that a drive force of the zooming motor 51 is transmitted to the gear portion via the gears, whereby the first lens group 11, the second lens group 12, and the shutter/aperture unit 15 are zoomed in a predetermined manner.

Figure 10:
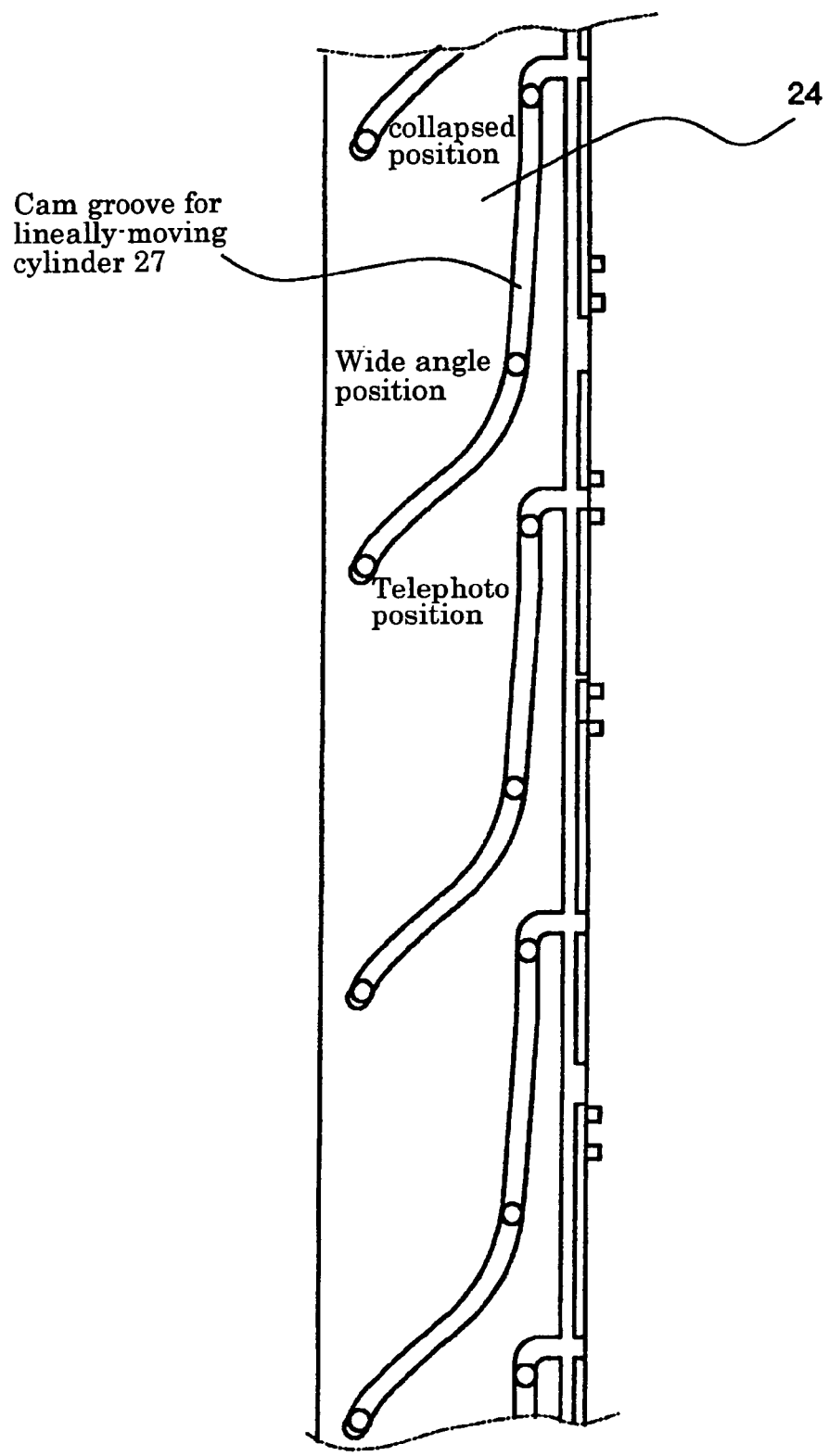
FIG. 10 is a schematic development elevation view showing a shape of cam grooves formed on a second rotary cylinder in a developed state.
Figure 11:
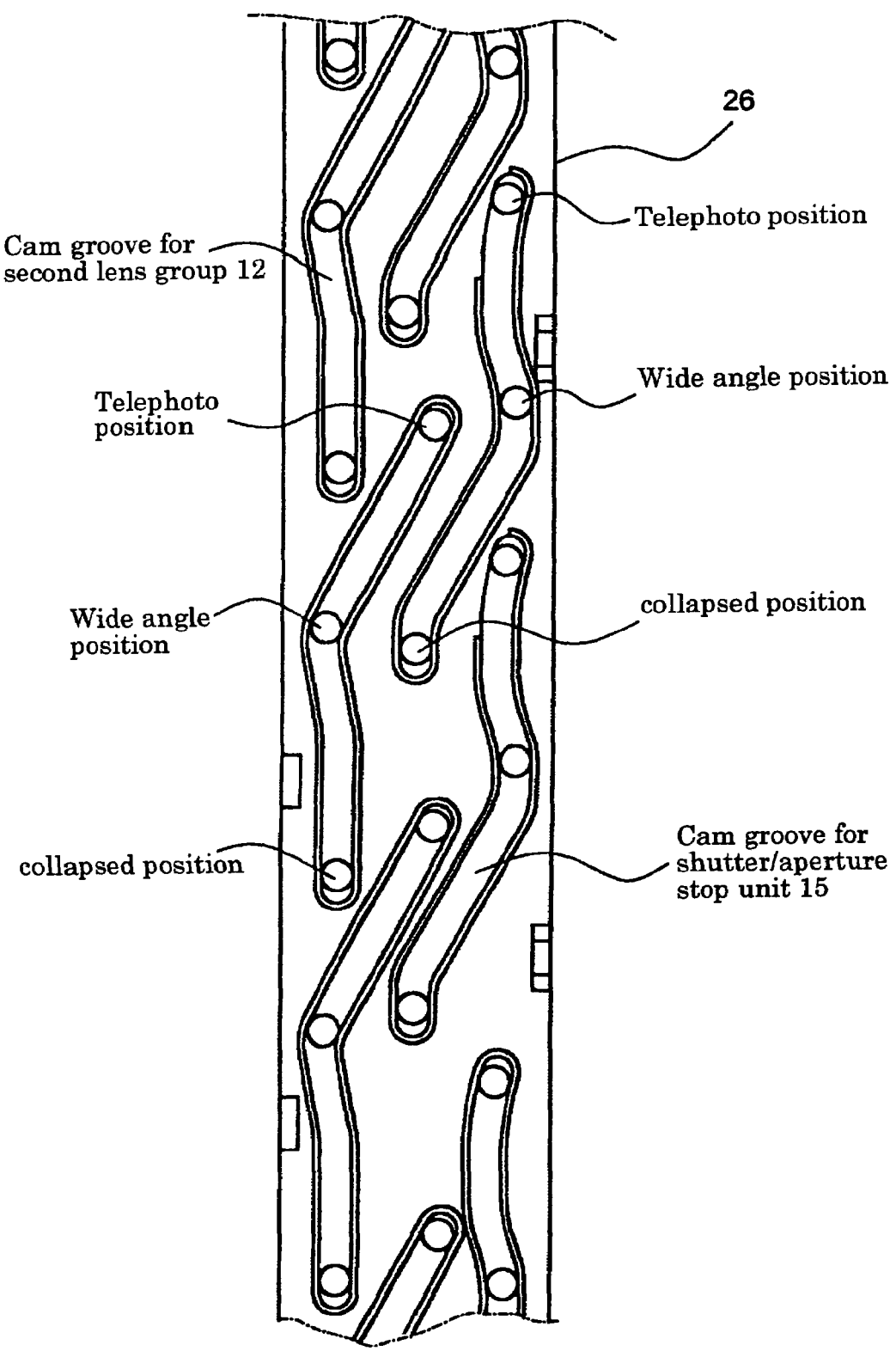
FIG. 11 is a schematic development elevation view showing a shape of cam grooves formed on a cam cylinder in a developed state.
Figure 12:
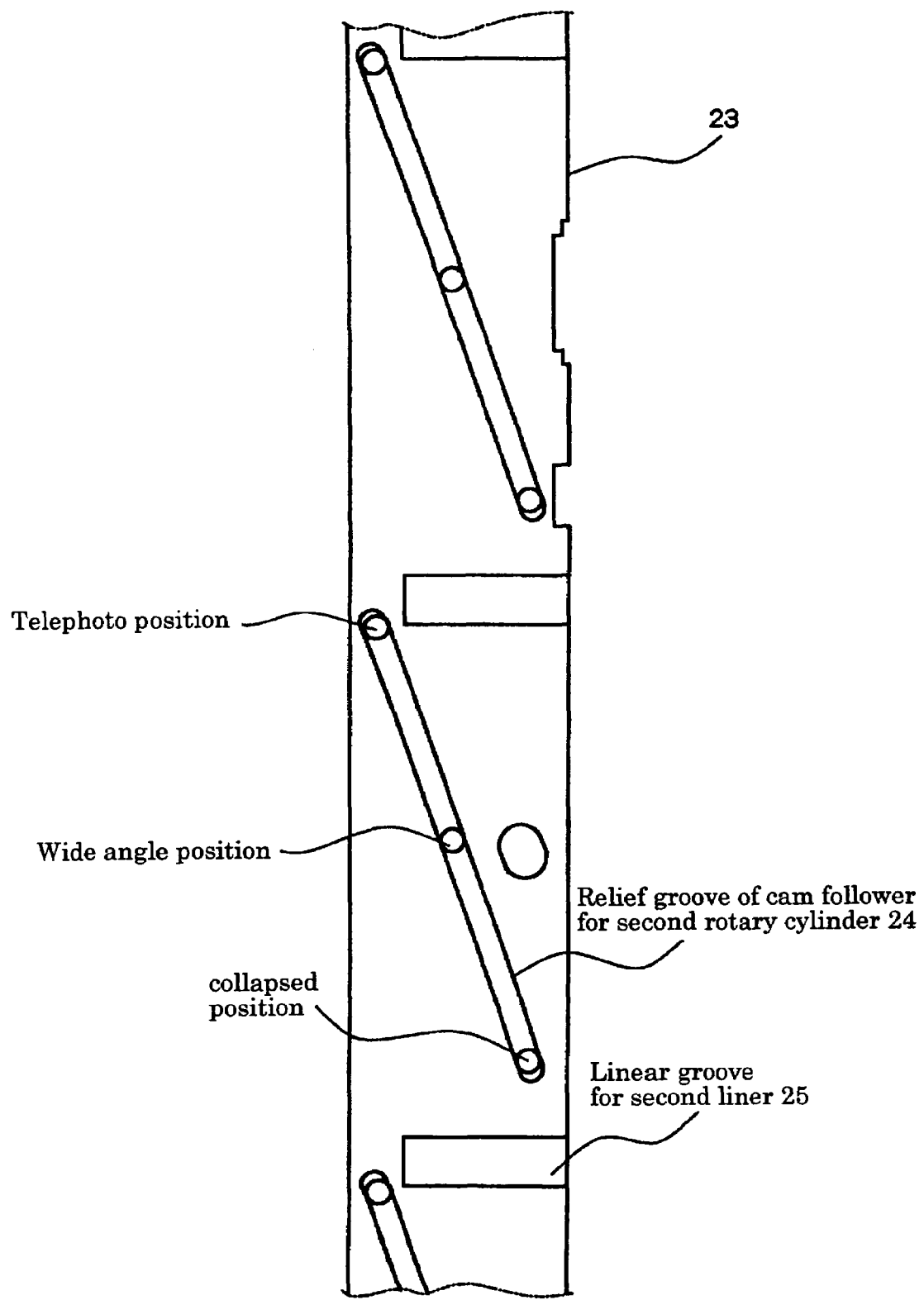
FIG. 12 is a schematic development elevation view showing a shape of cam grooves and key grooves formed on a first liner in a developed state with a helicoid omitted.

Meanwhile, the cam groove on the second rotary cylinder 24 engaging with the cam follower on the linearly-moving cylinder 27 is shown in FIG. 10. The cam groove on the cam cylinder 26 which engages with the cam follower on the lens retaining frame of the second lens group 12 and the cam groove of the cam cylinder 26 which engages with the cam follower of the shutter/aperture unit 15 are shown in FIG. 11, respectively. The cam groove on the first liner 23 which engages with the cam follower of the second rotary cylinder 24 and the straight groove on the first liner 23 which engages with the key portion on the second liner 25 are shown in FIG. 12. A linear groove on the fixed frame 21 engaging with the key portion of the first liner 23 of the fixed frame and the cam groove of the fixed frame 21 engaging with the cam follower of the first rotary cylinder 22 are shown in FIG. 13.

Generally, the rotary cylinder, which is the closest position to the fixed frame and positioned on the outermost circumference is generally screwed onto the fixed frame through a helicoid, and the helicoid is configured to move the rotary cylinder at a constant speed relative to the fixed frame. Therefore, the rotary cylinder is in a half-extended state out of the fixed frame in a short focal length/wide angle position in a course in which the rotary cylinder is moved gradually from the collapsible position through the short focal length/wide angle position to a long focal length/telephoto position. On the contrary, in the structure described above, the first rotary cylinder 22 is threaded with the fixed cylindrical portion of the fixed frame 21 via the cam groove of the helicoidal shape without a simple helicoidal connection. The first rotary cylinder 22 is moved completely to the maximally extended position by being driven from the collapsible or collapsed position to the short focal length/wide angle position. Thereafter, as shown in FIG. 13, because the subject side end of the cam groove lies in parallel with the end surface of the fixed cylindrical portion, the first rotary cylinder 22 rotates at a constant position without moving along the optical axis X during driving from the short focal length/wide angle position to the long focal length/telephoto position.

As the first rotary cylinder 22 is moved from the collapsible position to the short focal length/wide angle position first under rotation in an early stage of drawing out action, it is extended to the side of the subject. After the rotary cylinder 22 reaches the maximally extended position, a zoom position reference-signal is generated by a zoom position detector which is provided on the fixed frame and comprising a photo-reflector, a photo-interrupter, a leaf switch or the like, for example. Thus, when the zoom position reference-signal is generated, it may be determined that the first rotary cylinder 22 reaches the maximally extended position. The retractable lens retaining frame, that is, the third lens retaining frame 31 in this embodiment, begins to enter toward the photographing optical axis.

Consequently, a space is previously ensured to insert the third lend group 13 into the photographing optical axis by completely drawing out the first rotary cylinder 22 and the first liner 23 adjacent to the fixed frame at the earlier step of the extended action.

As described below, as soon as the first rotary cylinder 22 reaches the maximally extended position, the zoom position-reference signal generates, the space for inserting the third lens group is secured, and immediately, the insertion of the third lens group is initiated. Therefore, a time from the collapsible position when an electric source is turned on to the short focal length/wide angle position can be much shortened.

Figure 2:
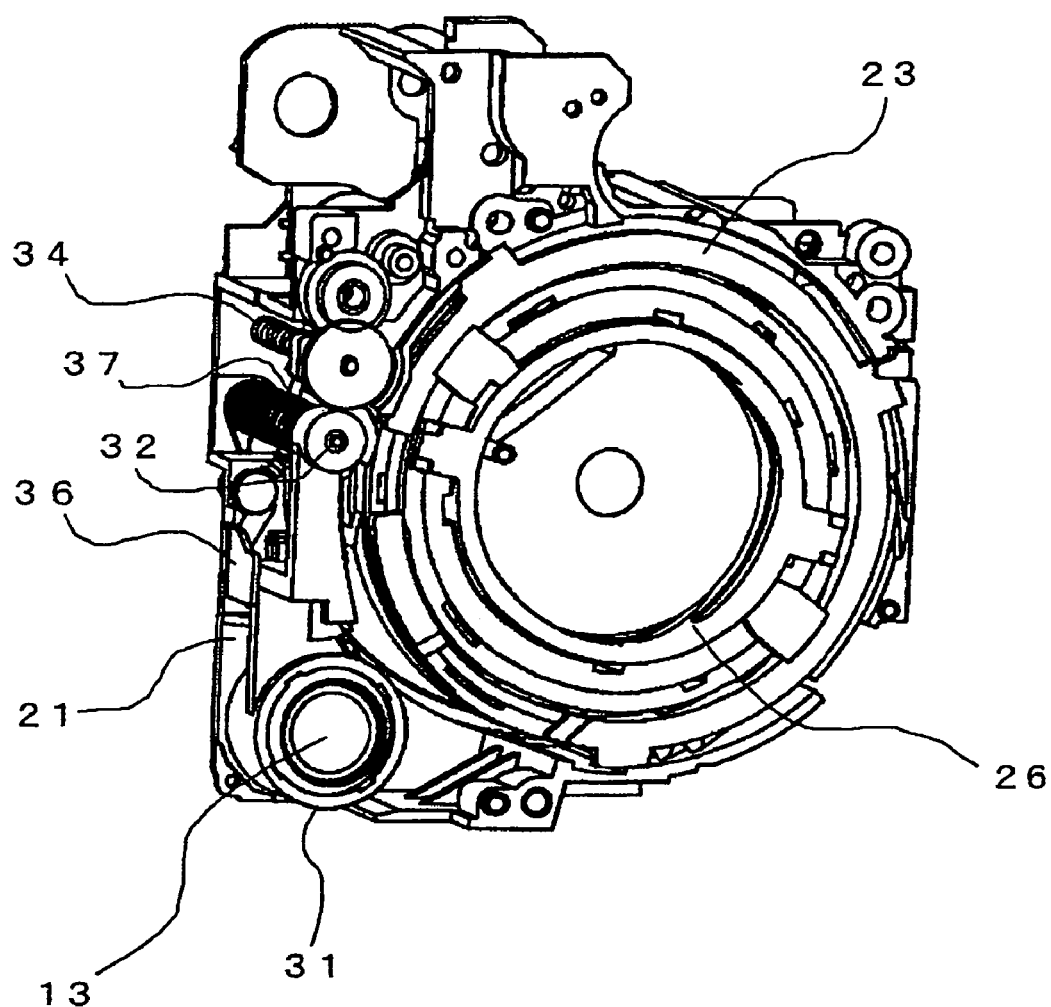
FIG. 2 is a perspective view showing the main part of the lens barrel shown in FIG. 1, as viewed from an imaging plane.
Figure 8:
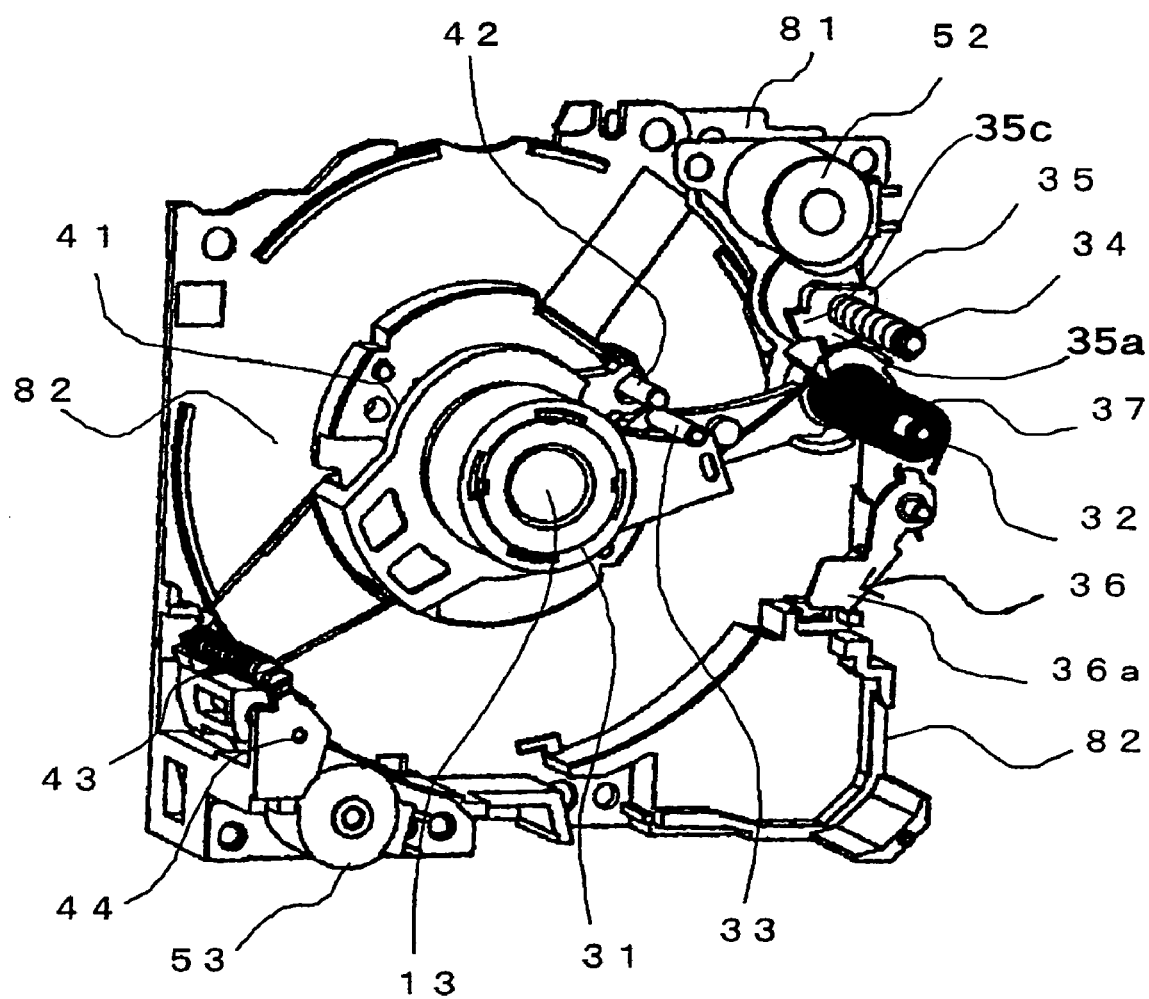
FIG. 8 is a perspective view of a layout of the third frame, the impact preventing member, and the fourth frame for explaining operations of the third frame, which retains the third lens group, and the impact-preventing member in the photographing state with the lens groups projected, as viewed from the subject.

The retractable third lens group 13 is retained to the third frame 31 or retractable lens retaining frame. The third frame 31 retains the third lens group 13 at one end thereof, and the other end of the third frame 31 is supported by a third group main-guide shaft 32 which extends substantially in parallel with the optical axis of the third lens group 13 so as to be capable of rotating, and sliding along the third group main-guide shaft 32. The third frame 31 is rotatable about the third group main-guide shaft 32 between a setting position in which the third lens group 13 is disposed onto the optical axis or the photographing optical axis in a photographing state, as shown in FIG. 8 and the retracted position in which the third lens group 13 is retracted out of the telescopic cylinder in the fixed frame 21, as shown in FIG. 2. In the vicinity of the third lens group 13 on the side of the rotating end of the third frame 31, a crank-shaped bent portion is formed in this embodiment for differentiating the position of the third lens group 13 in the direction parallel with the main-guide shaft between the side of the rotation axis and the side of the supporting portion, a stopper 31a (FIG. 15) and a light-shielding strip 31b are provided on the rotating end to project from the bent portion substantially toward the rotating end.

On the optical performance, in order to lengthen a focus length in the telephoto state, a position of the third lens group 13 in the telephoto state is in an extended position closer to the subject. However, a possible moving amount of the third frame 31 is determined by limitation of a length of the lens barrel in the collapsed state along the optical axis. It is possible to maximize the focus length in the telephoto state by setting a position for retaining the third lens group by the third frame 31 in the closest position to the subject. However, if a position of the stopper 31a along the optical axis sets on the generally same position as the third lens group 13 at the side of the subject, a length of a third frame sub-guide shaft 33, which defines the position of the optical axis of the third lens group 12 retained in the third frame 31 upon receipt of the stopper 31a is longer and a size of the lens barrel in the collapsible position becomes greater. Therefore, it is required that the stopper 31a is set on a side of a focusing position as near as possible and the third frame 31 is formed into a shape having the crank-shaped bent portion. Meanwhile, the third frame 31 may be formed from two parts and in this case, one is a member having the crank-shaped bent portion, the other is a member for retaining the third lens group 13. The two parts operates integrally by being fixed together.

Figure 14B:
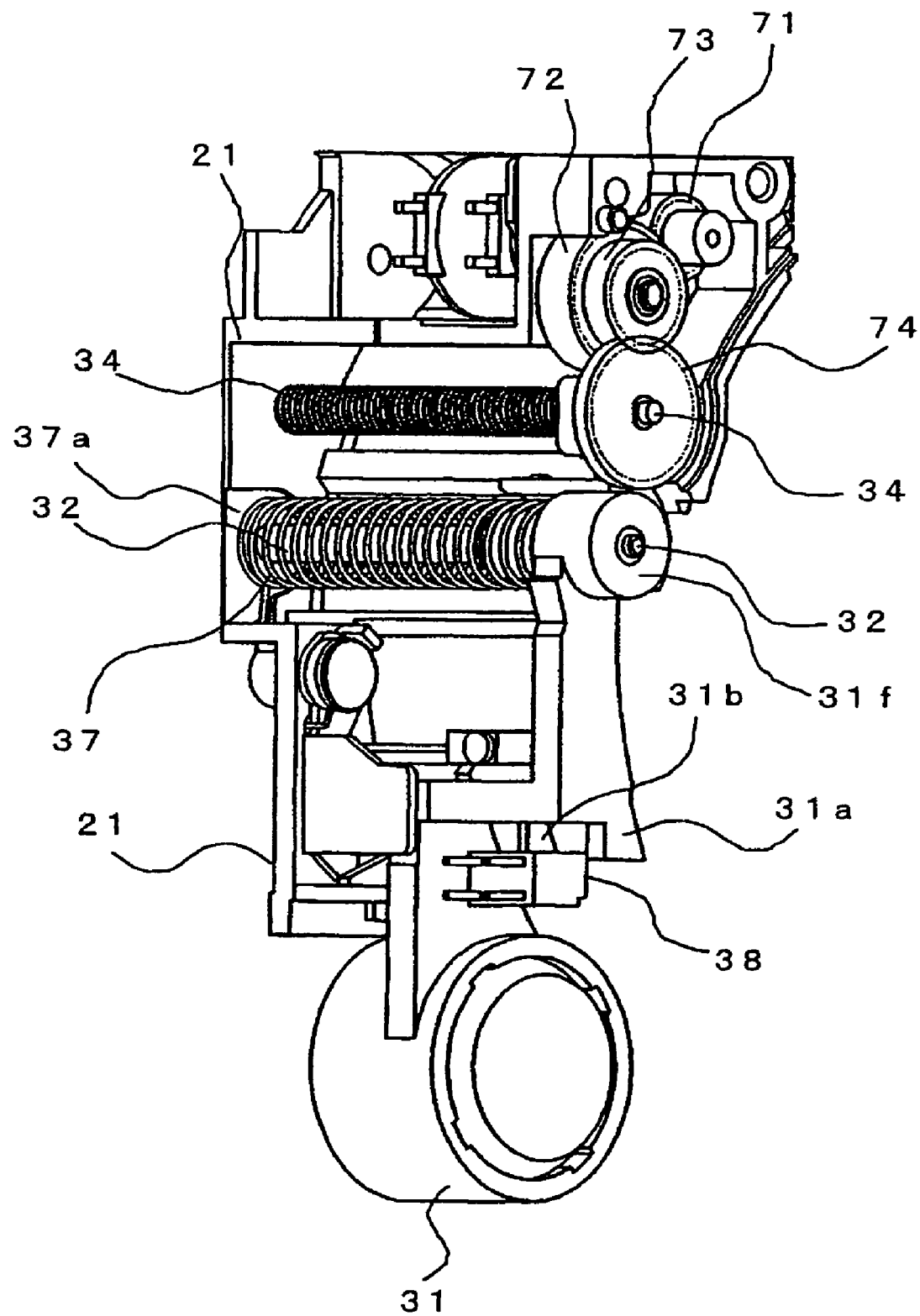
FIG. 14B is a perspective view of FIG. 14A.
Figure 15:
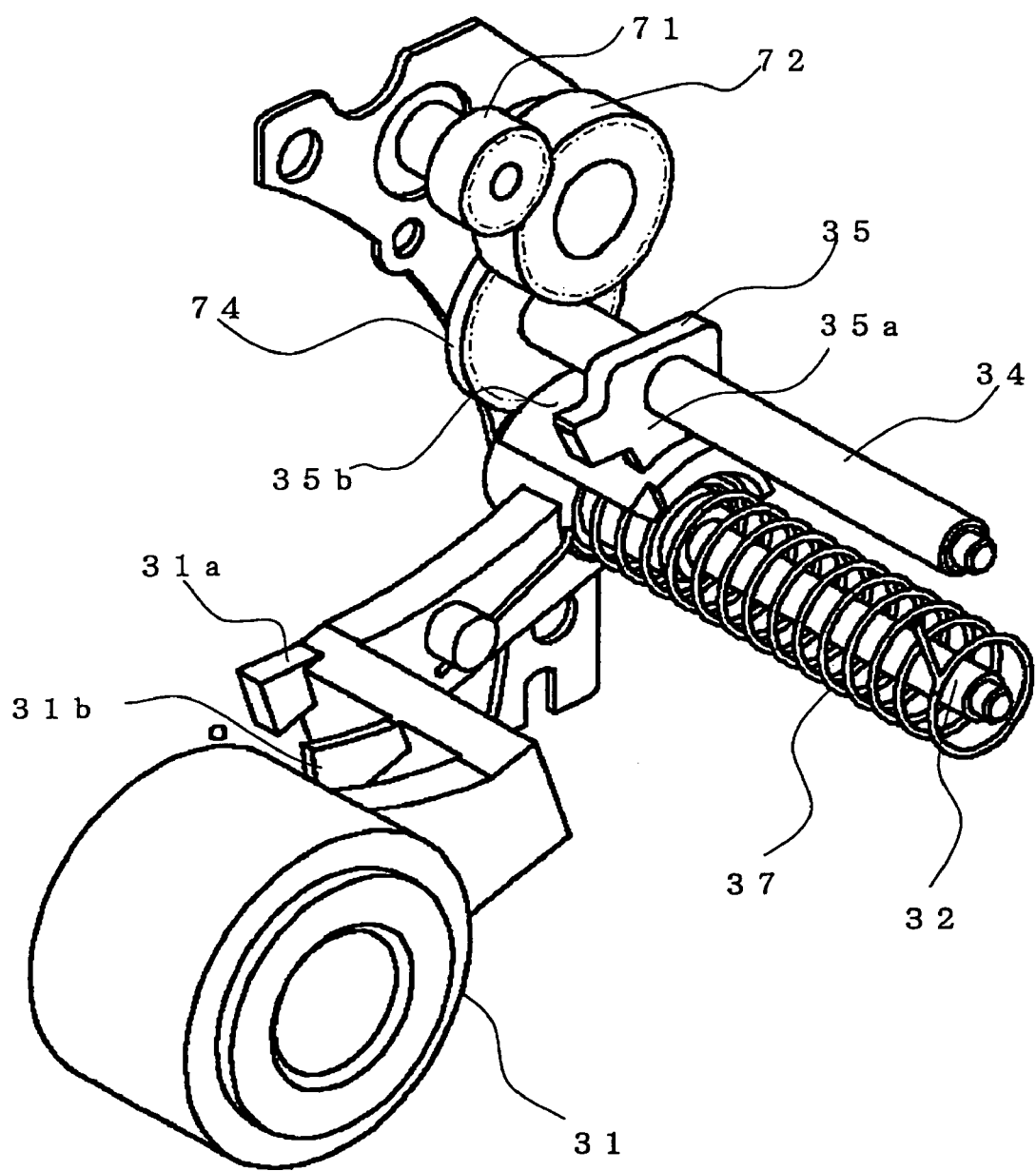
FIG. 15 is a perspective view showing the structure of the third frame and its drive system.

As shown in FIGS. 14A and 14B, a third frame female screw member 35 screwed on a third group lead screw 34 is positioned in the closest position to an image plane of the CCD in the retracted state in which the third frame 31 is retracted. In this state, a compression torsion spring 37 is charged or compressed fully so as to impart constantly a clockwise (direction for the third frame to move toward the optical axis) moment as viewed from the front of the lens barrel to the third frame 31. A cylindrical outer peripheral surface of a supported part provided on the main-guide shaft 32 for the third frame 31 is provided with a stepped portion 31c, and a cam portion 31e disposed inside the stepped portion 31c and formed from an inclined surface, as shown in FIG. 14A. From this state, when a third frame drive motor 52 is rotated clockwise as viewed from the front of the lens barrel, the third group lead screw 34 is rotated clockwise through a gear mechanism including gears 71 to 74, and the third frame female screw member 35 moves toward the subject along the optical axis X. At this time, the third frame 31 is rotated clockwise by a moment force of the compression torsion spring 37, the cam portion 31e engages with a first abutting portion 35a provided on the third frame female screw member 35. Thereafter, when the third frame female screw member 35 is moved in the engaged position to the side of the subject, the light-shielding strip 31b of the third frame 31 is turned around the main-guide shaft 32 up to a position out of a third frame photo-interrupter 38 as a device for detecting a position of the third lens group 13, thereby the third frame photo-interrupter 38 generates a reference signal in a range from L or a low level to H or a high level. Accordingly, a position of the third lens group 13 is controlled by pulse count based on the reference signal from the third frame photo-interrupter 38.

Figure 16A:
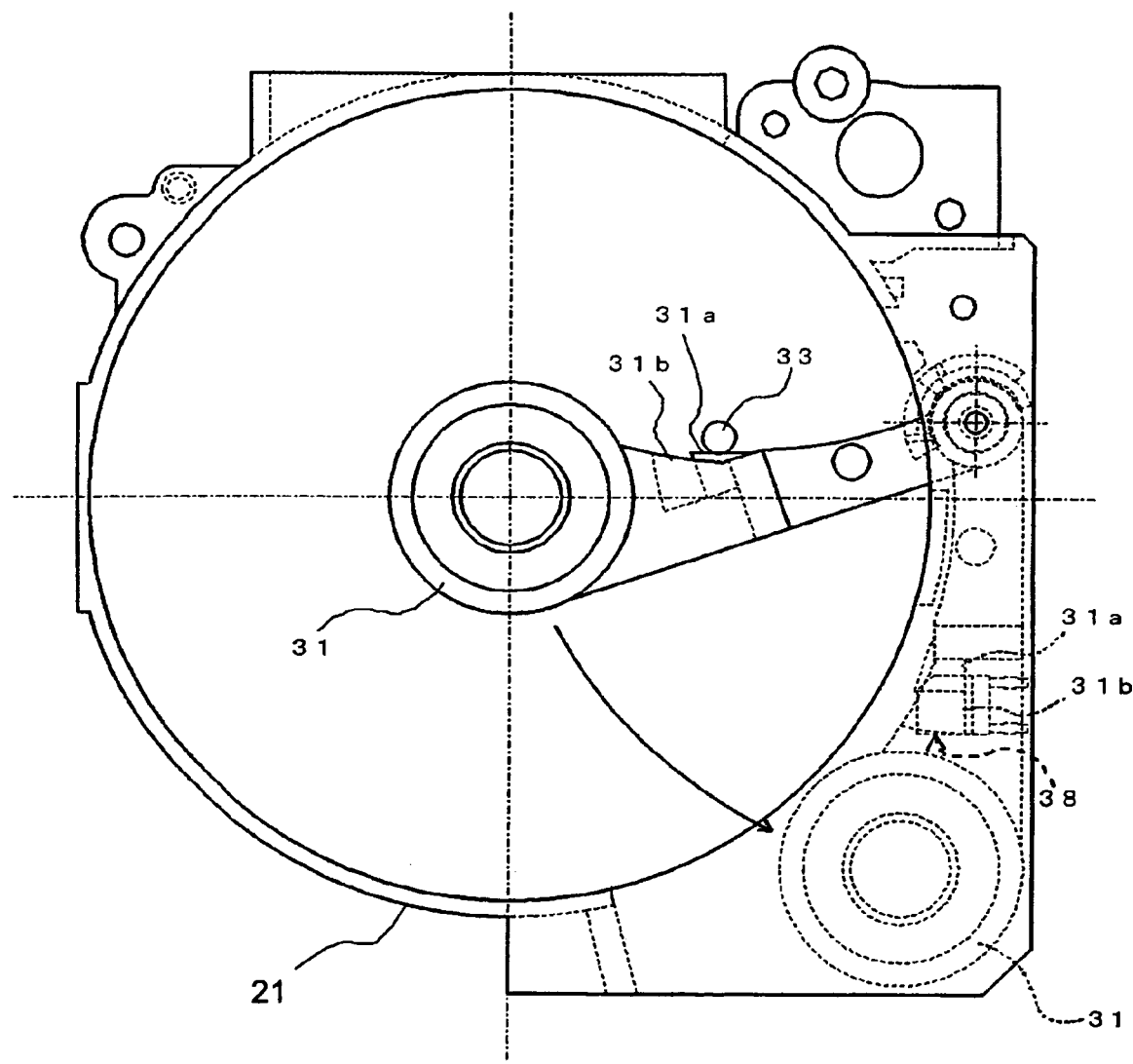
FIG. 16A is a back view of the third frame portion for explaining operation of the third frame, as viewed from the imaging plane.
Figure 16B:
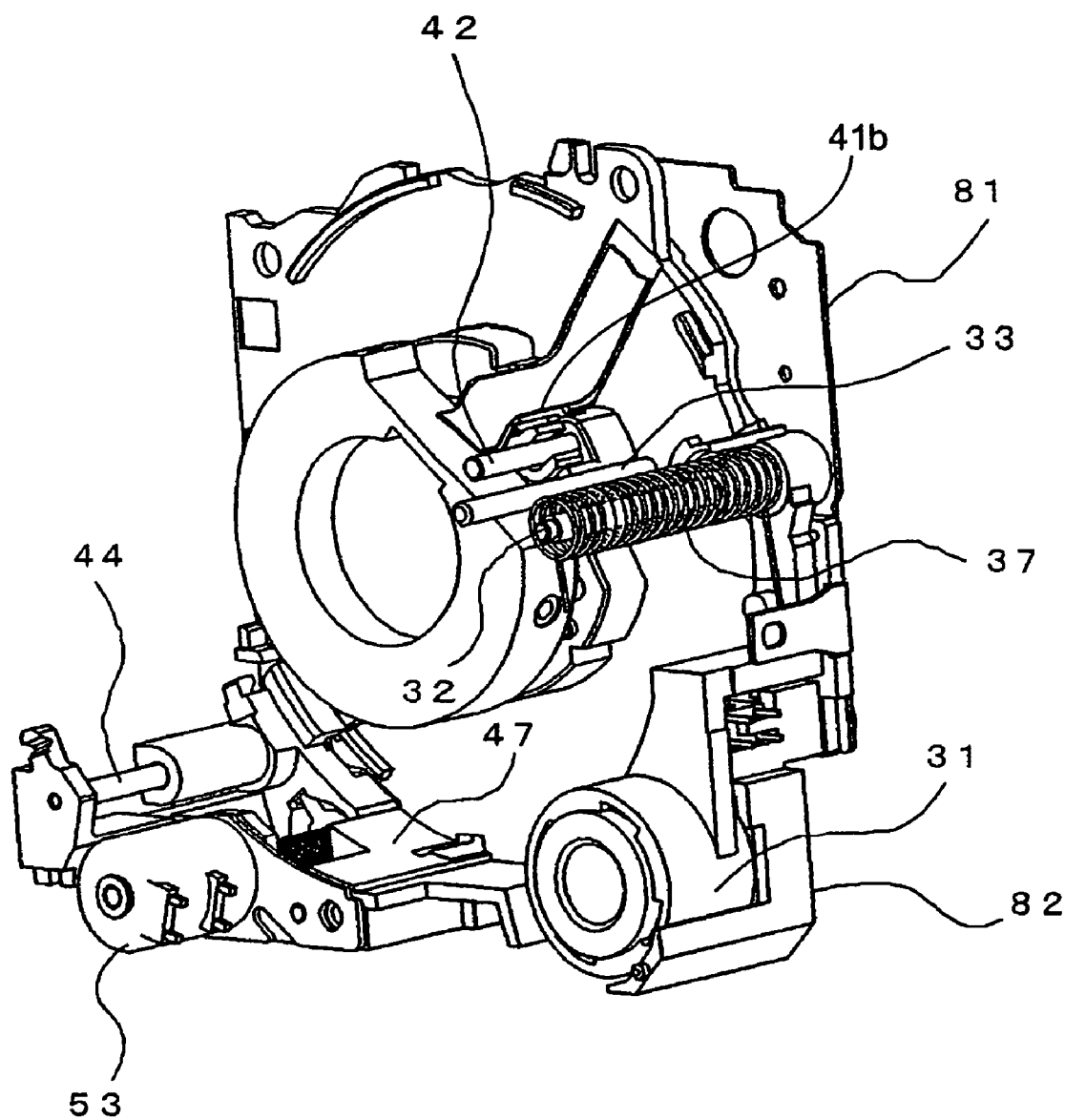
FIG. 16B is a perspective view of mainly showing a shutter portion.

From this state, when the third frame female screw member 35 is moved to a retract-initiating position B of the third frame 31, as shown in FIG. 14A, the third frame 31 further rotates clockwise, the stopper 31a comes into abutment with the third frame sub-guide shaft 33 as shown in FIGS. 8 and 16A, as a result, a position of the third group lens retained by the third frame 31 on the optical axis is determined. Consequently, approach operation of the third lens group 13 to the optical axis is completed. In the retract-initiating position B, the third frame 31 is movable toward the retracted position S. Meanwhile, the light-shielding strip 31b shields the third frame photo-interrupter 38 shown in FIG. 16A so that it is possible to confirm that the third frame 31 is in the retract-initiating position B. When the third frame female screw member 35 is moved to the retract-initiating position B shown in FIG. 14A, the first abutting portion 35a of the third frame female screw member 35 contacts with a front engaging portion 31d of the stepped portion 31c of the third frame 31. Again, the stepped portion 31c of the third frame 31 has the cam portion 31e and the front engaging portion 31d which forms a planner surface generally perpendicular to the third group main-guide shaft 32. The stepped portion has a recessed shape in the cylindrical peripheral face. The third frame 31 is constantly biased to move to a direction transverse to the optical axis, that is to say, from the retracted position to the optical axis and a rotating direction toward the optical axis, that is to say, from the subject to a retainer plate 81 beside the image plane by the compression torsion spring 37 provided on the third group main-guide shaft 32.

In addition, a portion of the fixed frame 21 on which the compression torsion spring 37 is pushed includes a step 37a which is formed as a concave portion for inserting one end of the compression torsion spring 37, as shown in FIG. 14B, to prevent the compression torsion spring from deviating out of a center of the third group min-guide shaft 32 considerably.

Next, when the third frame female screw member 35 is moved to a short focal length/wide angle position such as a wide angle position W shown in FIG. 14A, because the first abutting portion 35a of the third frame female screw member 35 presses the front engaging portion 31d, the third frame 31 is movable to the wide angle position along the optical axis X toward the subject.

Moreover, while the third frame female screw member 35 is disposed between the retract-initiating position B and a telephoto position T, as shown in FIG. 14A, because the third frame 31 is constantly pressed along the optical axis toward the image plane by the compression torsion spring 37, all spaces generated among the third group lead screw 34, the third frame female screw member 35 and the retainer plate 81 are directed to the image plane, the third frame 31 can secure a positional accuracy in the direction of the optical axis.

The third frame female screw member 35 is screwed on the third group lead screw 34 disposed substantially in parallel with the optical axis. The third frame female screw member 35 includes a rotation-preventing projection 35b in addition to the first abutting portion 35a, which engages with the above-described front engaging portion 31d or the cam portion 31c of the third frame 31. The rotation-preventing projection 35b is fitted slidably into a guide groove formed on the cylindrical part of the fixed frame 21 in parallel with the optical axis as a rotation-preventing device for preventing the third frame female screw member 35 from rotating along with the rotation of the third lead screw 34. In other words, the third frame female screw member 35 is moved in the back and forth direction along the optical axis by the rotation of the third lead screw 34, because the third frame female screw member 35 is prevented from rotating by the rotation-preventing projection 35b fitting into the guide groove of the fixed frame 21.

As shown in FIG. 14A in detail, when the third frame female screw member 35 is moved further toward the image plane (left side in the drawing) from the retract-initiating position B shown in FIG. 14A, the third frame female screw member 35 engages with the cam portion 31e of the stepped portion 31c the third lend group-retaining frame 31. The third frame 31 comes into contact with the retainer plate 81 by a biasing force of the compression torsion spring 37 clockwise, the third frame 31 is rotated counterclockwise against the clockwise biasing force exerted by the compression torsion spring 37, and therefore the third frame 31 can be retracted.

On the other hand, while the third frame female screw member 35 is moved from the telephoto position T through the wide angle position W to the retract-initiating position B by the reverse rotation or counterclockwise rotation of the third group lead screw 34, because the first abutting portion 35a of the third frame female screw member 35 engages with the front engaging portion 31d of the stepped portion 31c of the third frame 31, the third frame 31 moves gradually to direct from the side of the subject toward the image plane while maintaining a position on the optical axis limited by the third frame sub-guide shaft 33 by the biasing force toward the optical axis and the biasing force toward the image plane. Meanwhile, when the third frame female screw member 35 reaches the retract-initiating position B, a base end surface 31f of the third frame 31 abuts with the retainer plate 81, the third frame female screw member 35 is disposed with an interval from the front engaging portion 31d and contacts with the cam portion 31e of the stepped portion 31c.

While the third frame female screw member 35 moves from the retract-initiating position B to the collapsed position S, the second abutting portion 35c of the third frame female screw member 35 comes into sliding contact with the cam portion 31e of the stepped portion 31c of the third frame 31 and rotates the third frame 31 against the rotational biasing force exerted by the compression torsion spring 37, whereby the third frame 31 moves from the position on the optical axis to the collapsed position S. The collapsed position S of the third frame 31 corresponds to a position at which it is moved toward the image plane by a predetermined pulse count number after the generation of the reference signal of the range from the H to the L generated from the third frame photo-interrupter 38. After the third frame 31 is moved to the collapsed position S, the first lens group 11, the second lens group 12, and the shutter/aperture unit 15 are allowed to be moved to the collapsible or collapsed position.

In this example, before the third frame 31 is moved to the collapsed position S, a fourth frame 41 for retaining the fourth lens group 14 is first moved to the collapsed position. A first collapsed position of the fourth frame 41 corresponds to a position at which it is moved toward the image plane by a predetermined pulse count number after the generation of a storage reference signal of a range from the H to the L generated by a fourth group reference detector or fourth group photo-interrupter 47. After the fourth frame 41 reaches the first collapsed position, the third frame 31 is initiated to be stored.

That is to say, the third frame female screw member 35 moves toward the image plane by a predetermined pulse count number from the generation of the stored reference signal from the H to the L by the third frame photo-interrupter 38 (see FIG. 16A) and the stored operation of the third frame 31 is completed. After the completion of the stored operation of the third frame 31, the first rotary cylinder 22 is stored or structural parts disposed inside the first rotary cylinder 22 and the first liner 23, that is, the structural parts at the forward position from their base end faces, are stored from the position immediately before contacting with the third frame 31. This results in the safe storage of the first rotary cylinder 22 and so on without interfering with the third frame 31. Positions of the first rotary cylinder 22 and so on can be set by a drive pulse count generated by a zoom count detector comprising a pinion gear attached directly to an output shaft of the zooming motor 51 and having an encoder structure and for example, a first and second frames photo-interrupter 51a disposed adjacent the pinion gear, for example. Meanwhile, although the DC motor is used as the drive source for moving the first rotary cylinder 22 and the drive position of the first rotary cylinder 22 is detected by the detector comprising the encoder and the photo-interrupter, in the above-mentioned example, the similar function can be accomplished by substituting a pulse motor structure for the whole of the above-mentioned structure.

Figure 7:
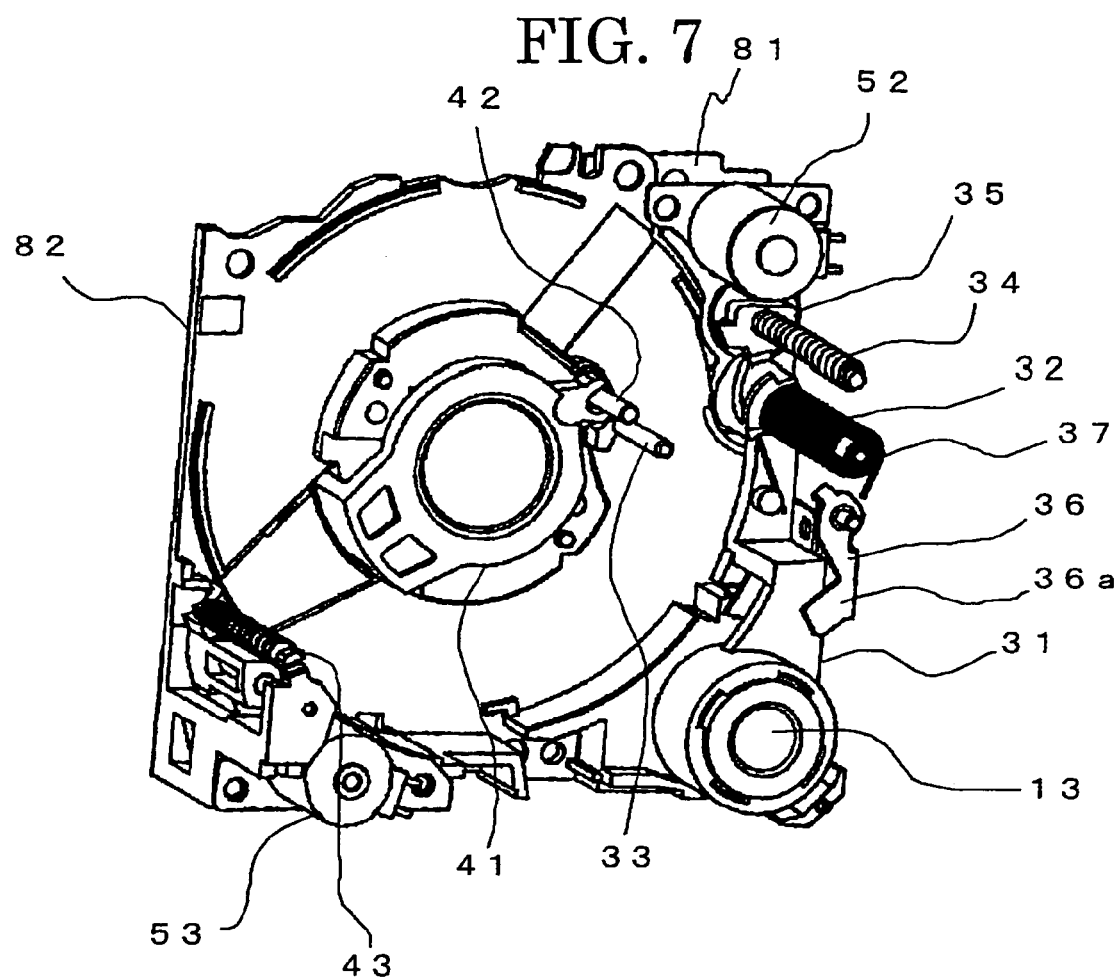
FIG. 7 is a perspective view of a layout of a third frame, an impact preventing member, and a fourth frame in a state in which the lens groups are in a collapsed position, for explaining operations of the third frame which retains the third lens group and the impact preventing member, as viewed from the subject.

To prevent the third frame 31 from collision with the other parts, an impact-preventing member 36 is, as shown in particular in FIGS. 2 and 7, rotatably supported on the fixed frame 21 in the vicinity of the third group main-guide shaft 32 and includes a rotated portion provided at one end of the impact-preventing member and an engaging projection 36a near a rotating end. The impact-preventing member 36 is constantly biased to cause the engaging projection 36a to move toward the photographing optical axis X by a spring or the like. When the third frame 31 is positioned in the collapsed position, the impact-preventing member 36 is pushed out by a rotating force of the third frame 31 against a biasing force of the spring, and is deviated outside the third frame 31 (see FIG. 2 and FIG. 7, specifically). When the third frame 31 is rotated and positioned on the optical axis, the impact-preventing member 36 is released from engagement with the third frame 31, and is rotated to cause the engaging projection 36a to be projected toward the optical axis X by the biasing force, thereby causing the engaging projection 36a to project from the inner surface of the fixed frame of the fixed frame 21. At this time, in addition to the first rotary cylinder 22 and the first liner 23, the second rotary cylinder 24, the second liner 25, the cam cylinder 26 and the lineally-moving cylinder 27 are all positioned on the subject side with respect to the projected position of the engaging projection 36a. Therefore, the engaging projection 36a is positioned to project inwardly of an outer peripheral edge of the base portion of each of the first rotary cylinder 22 and the first liner 23 (see FIG. 5, FIG. 6, and FIG. 8, specifically).

With such a structure, even if an operator rotates the first rotary cylinder 22 manually forcibly and moves it to the collapsed position, the impact-preventing member 36 first contacts with the first rotary cylinder 22. Therefore, because the base portion of the first rotary cylinder 22 cannot be moved toward the image plane than the position of the impact-preventing member 36 along the optical axis, the first rotary cylinder 22 is prevented from contacting with the third frame 31. Accordingly, it is possible to accomplish the prevention of breaking, damage or the like of the third frame 31 due to a strength external force. In addition, the first rotary cylinder 22 can be first moved to the collapsed position after the third frame 31 is moved completely to the collapsed position correctly.

Therefore, in a used or photographing state of the lens barrel, in which the movable cylinders such as the first rotary cylinder 22 and so on are extended, when a great pressure is exerted on a leading end of the lens barrel and so on by a drop of the lens barrel or the like, the engaging projection 36a of the impact-preventing member 36 engages with the first rotary cylinder 22 and the first liner 23, and hence further retraction of the first rotary cylinder 22 and the first liner 23 (as well as the second rotary cylinder 24, the second liner 25, the cam cylinder 26, and the lineally-moving cylinder 27) toward the third lens group 13 is prevented, so that the third frame 31 and the third lens group 13 are prevented from being damaged.

The third group lead screw 34 is rotated in forward and reverse directions by a third frame drive motor 52. The rotation of the third frame drive motor 52 is transmitted to the third group lead screw 34 via gears 71, 72, 73, and 74 arranged in sequence.

Next, a drive structure of the fourth lens group 14 is explained with reference to FIGS. 7 and 8, and FIGS. 20A and 20B being perspective views showing the fourth lens group driving system.

Figure 20A:
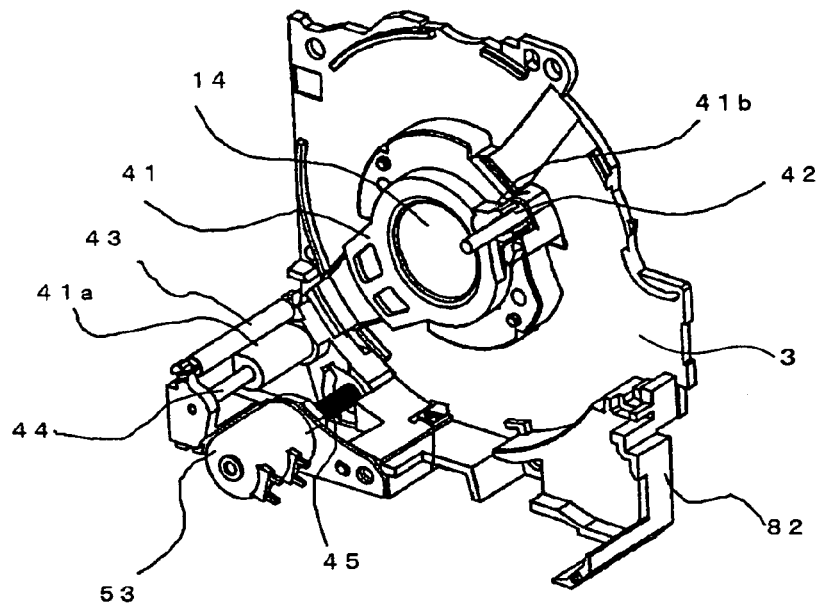
FIG. 20A is a perspective view for schematically showing a structure of a principal portion of the fourth lens retaining frame and its drive system.
Figure 20B:
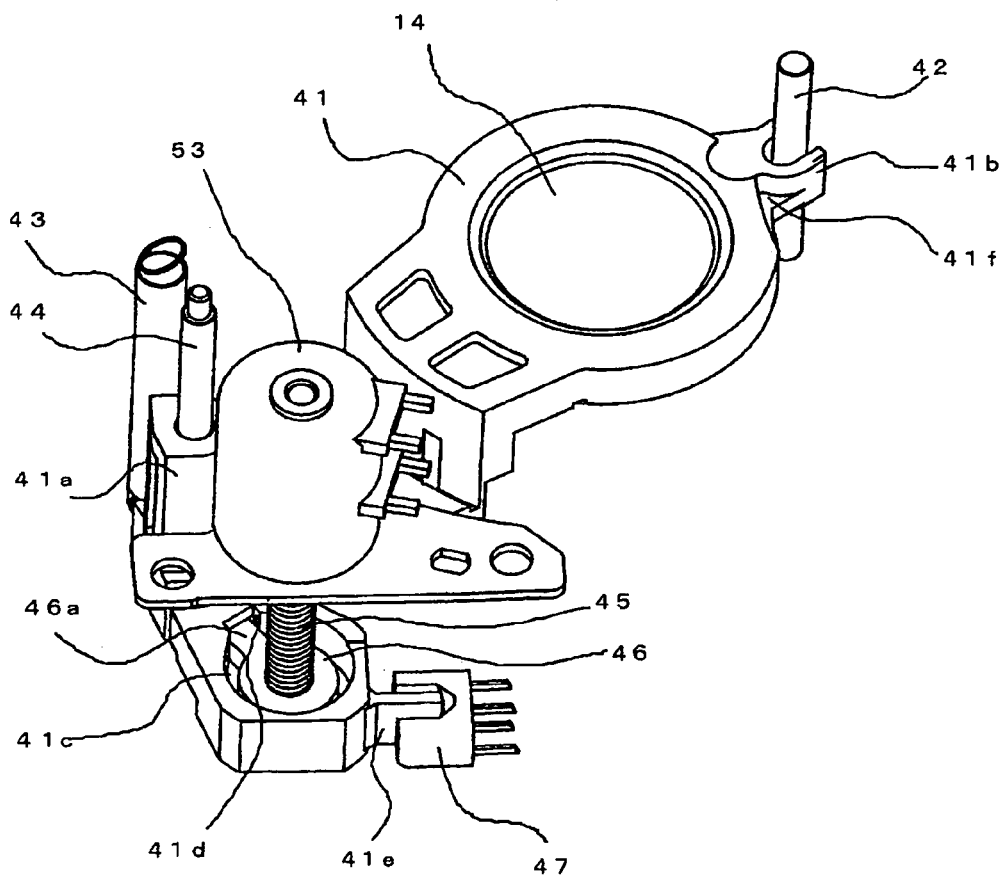
FIG. 20B is a perspective view of FIG. 20A at a different angle with a part thereof omitted.

The fourth lens group 14 used as a focusing lens for focusing the lens groups in the illustrated embodiment is retained by the fourth frame 41, as shown in FIGS. 20A and 20B. The fourth frame 41 includes a sleeve portion 41a in which the fourth frame main-guide shaft 44 disposed in parallel with the optical axis and fixed to a lens barrel base 82 is fitted, and a rotation-preventing portion 41b in which the fourth frame sub-guide shaft 42 disposed in parallel with the optical axis and fixed to the lens barrel base 82 is fitted, to limit the rotation of the fourth frame 41. With such a structure, the fourth frame 41 can be moved freely along the fourth frame main-guide shaft 44 or the optical axis. A fourth frame drive motor 53 comprising a stepping motor is used as a drive source for driving the fourth frame 41 in the illustrated embodiment. Provided on an output shaft of the fourth frame drive motor 53 is a fourth frame lead screw 45 which is threaded into a threaded hole provided in a fourth frame female screw member 46.

The fourth frame 41 has an opening for inserting the fourth frame female screw member 46. The opening has an engaging portion 41c for engaging with the fourth frame female screw member 46 in a perpendicular plane to the optical axis in a side of the image plane. The fourth frame 41 is always engaged with the fourth frame female screw member 46 by allowing the fourth frame 41 to bias to the subject by a fourth frame spring 43. The fourth frame female screw member 46 has a radially projected protrusion 46a. The protrusion 46a is engaged in a bore 41d provided in one side of the opening for inserting the fourth frame female screw member 46 of the fourth frame 41 so that the rotation of the fourth frame female screw member 46 is stopped.

In this way, when the fourth frame drive motor 53 which is the stepping motor is driven, the fourth frame lead screw 45 rotates, the fourth frame female screw member 46 is moved in the forward and reverse directions along an axis of the fourth frame lead screw 45 or the optical axis X. Because the fourth frame 41 engages with the fourth frame female screw member 46, the fourth frame 41 is moved along the optical axis following to the movement of the fourth frame female screw member 46. In this case, although the fourth frame lead screw 45 is formed on the output shaft of the fourth frame drive motor 53, the fourth frame lead screw 45 may be rotated by constituting the fourth frame drive motor 53 and the fourth frame lead screw 45 separately and connecting them through gears or the like.

The fourth frame 41 is provided with a light-shielding piece 41e which shields an optical passage of a fourth group photo-interrupter 47 provided on the lens barrel base 82, the light-shielding piece 41e is capable of light-shielding or passing light through the optical passage of the fourth group photo-interrupter 47 in response to the movement of the fourth frame 41. In this case, the fourth frame 41 can be moved in a predetermined position by recognizing as a reference position a time at which the light-shielding pieces is set from the light-shielding state to the light-passing state, energizing a pulse waveform of any pulse number from the reference position, rotating the fourth frame drive motor 53.

Meanwhile, the fourth frame 41 has a concave portion 41f which is provided in an outer peripheral edge thereof and allows the light-shielding member 31b of the third frame 31 for the photo-interrupter 38 to move toward the optical axis to avoid the interference with the fourth frame 41, thereby the movement amount of the fourth frame 41 can be increased and a range capable of focusing can be enlarged. Moreover, as described above, there is a clearance between the fourth frame 41 and the fourth frame female screw member 46 in the direction of the optical axis, but the position in the direction of the optical axis of the fourth frame 41 can be controlled accurately by constantly biasing the fourth frame 41 toward the subject by the fourth frame spring 43.

The collapsed position of the first rotary cylinder 22, the first liner 23, the first lens group 11, the second lens group 12, and the shutter/aperture unit 15 is controlled based on the zoom position-reference signal generated by the zoom position detector comprising the photo-reflector and so on disposed in the fixed frame 21. That is to say, it is possible to complete the storing operation by moving them toward the image plane by the predetermined pulse count number of the drive pulse generated by the pinion gear acting as the encoder and the zoom count detector disposed adjacent to the pinion gear after the change of from the H to the L of the zoom position storage reference signal occurs. In storing, the fourth frame 41 is positioned in the first collapsed position as described above, while, when the first rotary cylinder 22 is moved to the collapsed position, the most distal surface of the first rotary cylinder 22 or the first liner 23 contacts with the fourth frame 41 and presses the fourth frame 41 to move to the second collapsed position finally. By such an operation, even if variations of the attached position of the fourth group photo-interrupter 47 in the direction of the optical axis occur, the fourth frame 41 can be moved to the collapsed position accurately without requiring a complicated adjustment. Such an operation can be accomplished for the reason that a length of the engaging space formed in the fourth frame 41, in the direction of the optical axis is larger than a thickness of the fourth frame female screw member 46.

The zooming motor 51 for moving the first lens group 11, the second lens group 12, and the shutter/aperture unit 15 is structured by the DC motor for example as described above in the illustrated embodiment. The third frame drive motor 52 for driving the third lens group 13 and the fourth frame drive motor 53 for driving the fourth lens group 14 are generally configured to use a pulse motor for example. The zooming motor 51, the third frame drive motor 52 and the fourth frame drive motor 53 are driven in conjunction with each other in a software-like manner to achieve an appropriate zooming action performed mainly by the first to the third lens groups 11-13 and an appropriate focusing action performed mainly by the fourth lens group 14, for example.

Now, a drive control system for the lens groups structuring the lens barrel is described in detail with reference to FIGS. 21 to 28.

Figure 21:
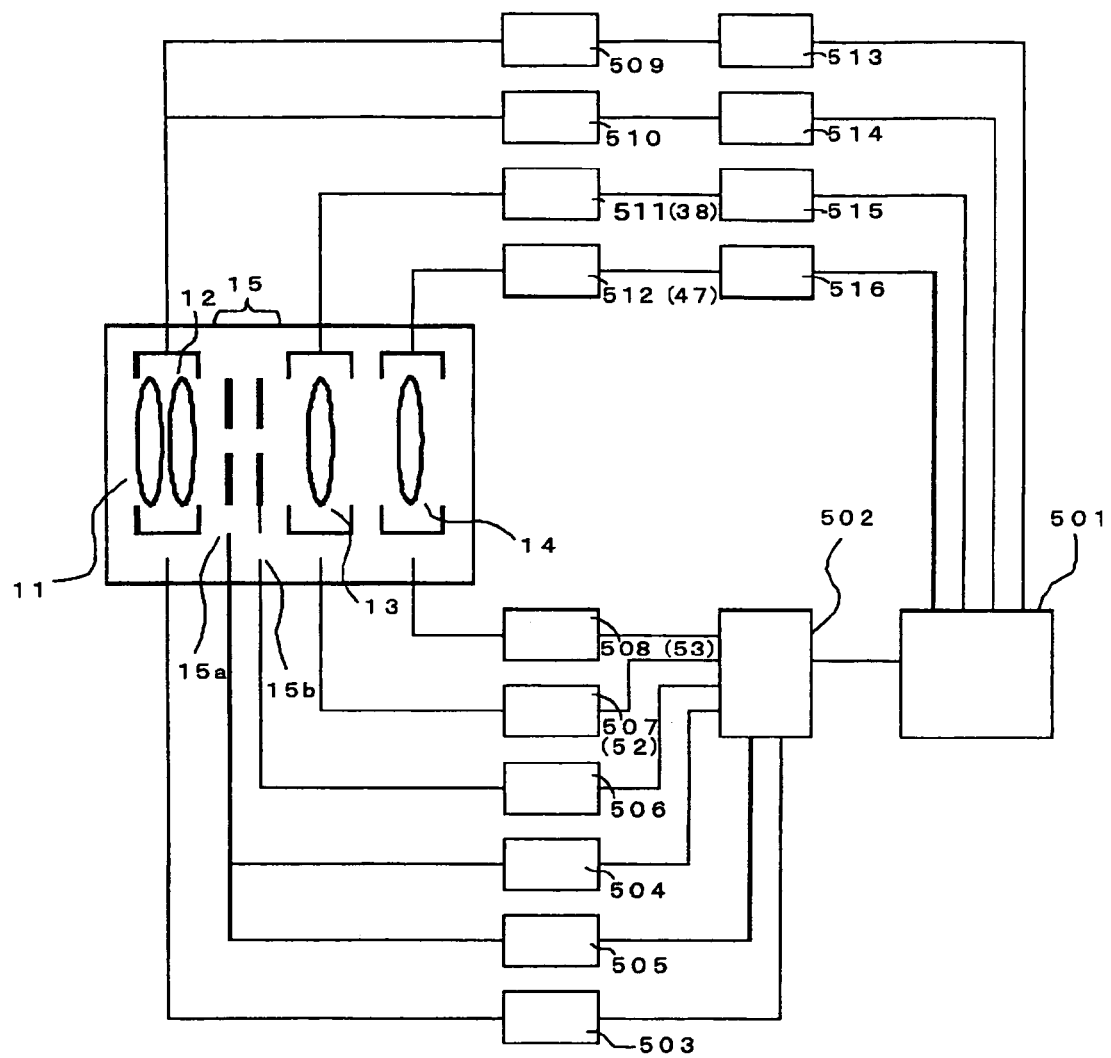
FIG. 21 is a block diagram schematically showing a construction of a drive control system.

The drive control system is shown in FIG. 21. The drive control system includes the central calculation processing device 501, a motor driver 502, a first and second frames DC motor 503, a first aperture stop motor 504, a second aperture stop motor 505, a shutter motor 506, a third frame pulse motor 507, a fourth frame pulse motor 508, a first and second frames photo-interrupter 509, a first and second frames photo-reflector 510, the third frame photo-interrupter 511, a fourth frame photo-interrupter 512, a first and second frames photo-interrupter drive circuit 513, a first and second frames photo-reflector drive circuit 514, a third frame photo-interrupter drive circuit 515, and a fourth frame photo-interrupter drive circuit 516.

The central calculation processing device 501 gives a command such as an initial setting of the motor driver 502, the selection for a drive motor, the setting of a drive voltage, a direction for driving and so on, to the motor driver 502. The motor driver 502 controls the motor system of the first and second frames DC motor 503, the first aperture stop motor 504, the second aperture stop motor 505, the shutter motor 506, the third frame pulse motor 507, the fourth frame pulse motor 508 and so on, in accordance with the command from the central calculation processing device 501. The first and second frames DC motor 503 drives the first and second lens groups 11 and 12. As always, the first and second groups 11 and 12 are driven separately with respect to each other through a cam mechanism in response to the drive of the first and second frames DC motor 503. The first aperture stop motor 504 and the second aperture stop motor 505 are configured to drive an aperture stop of the shutter/aperture unit 15. The shutter motor 506 drives a shutter of the shutter/aperture unit 15. The third frame pulse motor 507 drives the third lens group 13. The fourth frame pulse motor 508 drives the fourth lens group 14.

The central calculation processing device 501 supplies a drive electricity to the first and second frames photo-interrupter 509, the first and second frames photo-reflector 510, the third frame photo-interrupter 511, and the fourth frame photo-interrupter 512 as the device for detecting position through the first and second frames photo-interrupter drive circuit 513, the first and second frames photo-reflector drive circuit 514, the third frame photo-interrupter drive circuit 515, and the fourth frame photo-interrupter drive circuit 516. The central calculation processing device 501 also acquires a positional information signal detected by the first and second frames photo-interrupter 509, the first and second frames photo-reflector 510, the third frame photo-interrupter 351, and the fourth frame photo-interrupter 512. The first and second frames photo-interrupter drive circuit 513, the first and second frames photo-reflector drive circuit 514, the third frame photo-interrupter drive circuit 515, and the fourth frame photo-interrupter drive circuit 516 have a function to control suitably a level of a projecting current and an output signal of each of the first and second frames photo-interrupter 509, the first and second frames photo-reflector 510, the third frame photo-interrupter 511, and the fourth frame photo-interrupter 512. The motor driver 502 receives a command from the central calculation processing device 501 and executes the command. The central calculation processing device 501 sets a designated voltage to one or more selected motors of the first and second frames DC motor 503, the first aperture stop motor 504, the second aperture stop motor 505, the shutter motor 506, the third frame pulse motor 507, the fourth frame pulse motor 508, and controls them in accordance with a timing of drive command.

<Activation Sequence>

Figure 22:
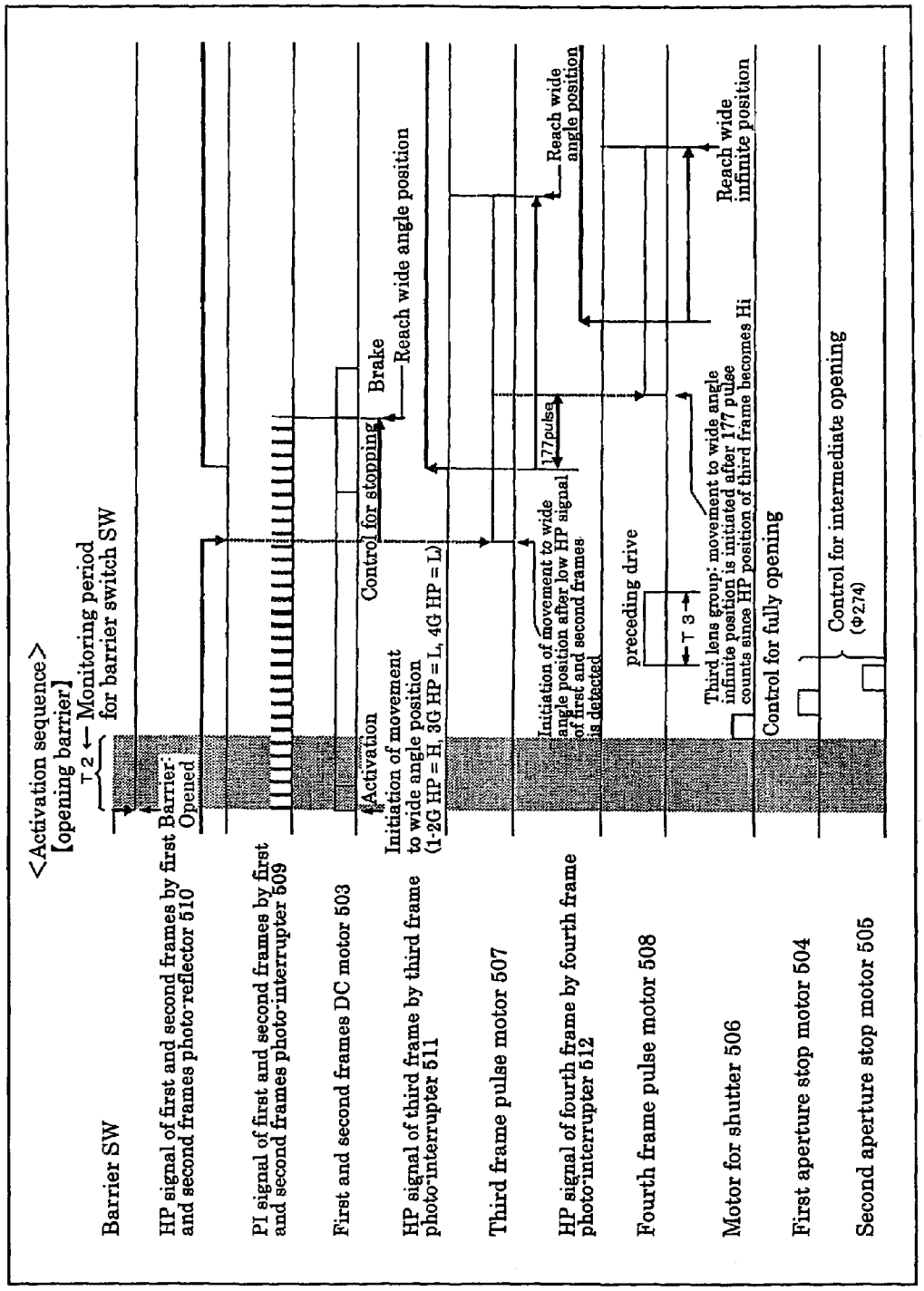
FIG. 22 is a timing chart in a starting sequence in which a lens barrier is opened.

An activation sequence of the above-mentioned drive control system is explained with reference to FIG. 22.

By opening the lens barrier 62, a barrier switch signal (barrier SW) from a barrier switch (not shown) changes from the H to the L and an initial setting of the lens barrel is initiated. Meanwhile, the barrier switch is operated by opening mechanically the lens barrier 62 with an operating lever or the like (not shown), while the lens barrier may be opened by operation of the barrier switch. Executing of the initial setting causes the initialization of the motor driver 502 for driving the motor system, and also causes the initialization of the first and second frames photo-interrupter 509, the first and second frames photo-reflector 510, the third frame photo-interrupter 511, and the fourth frame photo-interrupter 512, as the position detecting devices which detect positions through the first and second frames photo-interrupter drive circuit 513, the first and second frames photo-reflector drive circuit 514, the third frame photo-interrupter drive circuit 515, and the fourth frame photo-interrupter drive circuit 516.

In the case that detected results by the first and second frames photo-interrupter 509, the third frame photo-interrupter 511, and the fourth frame photo-interrupter 512 indicate the collapsed position, the first and second frames DC motor 503 is adapted to be driven toward the wide angle position. A driven amount of the first and second frames DC motor 503 is detected by the first and second frames photo-interrupter 509 for detecting the moving amount of the first and second lens groups. The moving amount is detected by counting edge portions of the pulse signal (PI signal) by the first and second frames photo-interrupter 509.

During an activation period immediately after the first and second frames DC motor 503 is activated, the drive voltage is set to be lower than a constant voltage so as to prevent a rush current by the DC motor. After the activation period is completed, the drive voltage is increased to a stationary voltage.

A period for monitoring the barrier switch (barrier SW) immediately after the initiation of the activation of the first and second frames DC motor 503 is set and a state of the barrier switch signal is monitored by the central calculation processing device 501. During the monitoring period, if the barrier switch signal indicates the opening state of the lens barrier, the shutter is set in the full opening by the shutter motor 50 for driving the shutter. Then, the aperture stop is set in an intermediately restricted state by the first and second aperture stop motors 504 and 505. In this example, although the aperture stop is set in the intermediately restricted state, the aperture stop may be set in an opened state (fully opened state).

Subsequently, the fourth lens group 14 is previously driven through the fourth pulse motor 508. By achieving the previous drive of the fourth lens group 14, the total time from the initiation of the drive of the first and second lens groups to the completion of the drive of the final fourth lens group 14 can be reduced. Moreover, it is possible to greaten a torque when driving and thereby to prevent the interference of the fourth lens group with the other parts by setting a pulse rate of the fourth frame pulse motor 508 in the previous drive thereof lately than that in the normal driving state.

Meanwhile, the driven amount of the fourth lens group by the fourth frame pulse motor 508 is set so that the third and fourth lens groups may not interfere with each other.

When the previous drive of the fourth lens group 14 is completed, the waiting for the reference position detection by the first and second frames photo-reflector 510 is set. A place where the reference position signal (HP signal) changes from the H to the L becomes the reference position (HP position) of the first and second lens groups 11 and 12. When the reference position (HP position) of the first and second lens groups 11 and 12 is detected, positional information of the first and second lens groups 11 and 12 is reset. In this embodiment, the HP positions of the first and second lens groups 11 and 12 are configured to be detected by way of detecting the position of first and second frames. The movement of the first and second lens groups 11 and 12 is controlled by counting the pulse-like signal (PI signal) by the first and second frames photo-interrupter 609 so as to acquire the movement amount of the first and second lens groups 11 and 12 based on the positional information to the wide angle position. The wide angle position is previously set, but it can be changed by storing it in a nonvolatile memory such as an EEPROM (Electronically Erasable and Programmable Read Only Memory) or the like and rewriting it.

A specified pulse period before reaching the wide angle position is a stop controlling period, in which the drive voltage is lowered in accordance with residual pulse numbers to the wide angle position so as to reduce overrun in reaching the wide angle position. If the first and second lens groups reach the wide angle position by counting the PI signal by the first and second frames photo-interrupter 509, a braking control is made in order to stop the first and second lens groups. An amount of overrun during the braking period is also counted to decide the final position of the first and second lens groups 11 and 12.

Moreover, when the reference position (HP position) of the first and second lens groups 11 and 12 is detected, the drive of the third frame pulse motor 507 in the direction of wide angle position is initiated to control the third lens group 13 with the first and second lens groups 11 and 12. The driving time of the third lens group 13 can be reduced by setting the pulse rate in driving the third group pulse motor highly or rapidly than that in the normal drive.

In the third lens group 13, as described above, the retracted position (in the retracted state) of the third frame 31, the optical axis entrance completed position of the third frame 31 at the time that the state has changed from the retracted state to the photographable state, and the distance from the reference position or the position of the third frame 31 in the photographable state in which the focal distance during the wide-angle photographing and the telephoto photographing is changed, are detected by the position detector structured by the T-shaped protruded member 350 or the L-shaped protruded member 362 and the transmissive photo-interrupter 351. More specifically, the third lens group 13 is waited for detecting the reference position by the third frame photo-interrupter 351. The position at which the predetermined number of pulses from the place where the reference position signal (HP signal) detected by the third frame photo-interrupter 351 has changed from the L to the H is detected becomes the reference position (HP position) of the third lens group 13. In this embodiment, the HP position of the third lens group 13 is configured to be detected by way of detecting the position of the third frame 31. When the reference position (HP position) is detected, positional information of the third lens group 13 is reset. The third lens group 13 is pulse-driven according to the movement amount to the wide angle position by the third frame pulse motor 507 on the basis of the detected position (HP position). The wide angle position is previously set, but it can be changed by storing it in the nonvolatile memory such as the EEPROM or the like and rewriting it.

In addition, the final stopping position of the third lens group 13 is the position in which the overrun of the first and second lens groups 11 and 12 is considered. That is to say, because the stopped position of the first and second lens groups 11 and 12 is "the wide angle position plus the overrun amount" due to the overrun, the stopped position of the third lens group 13 is also "the wide angle position plus "X"" in consideration of the overrun of the first and second lens groups 11 and 12. A value of the "X" is obtained by a linear calculation depending on pulse numbers between the zooming positions of the first and second lens groups 11 and 12, the overrun amount, and a pulse number between the zooming positions of the third lens group 13. The zooming position is one of sections divided into 16 equally between the wide angle position and the telephoto position (between W and T).

The drive of the fourth frame pulse motor 508 in the direction of a wide angle infinite position is initiated when the drive of the first and second lens groups 11 and 12 is completed, the reference position (HP position) of the third lens group 13 is detected, and the third lens group 13 is driven more than the specified pulse number. If the drive of the first and second lens groups 11 and 12 is not completed, or the third lens group 13 is not driven more than the specified pulse from the reference position, a standby state is set until the drive of the first and second lens groups 11 and 12 is completed as well as the third lens group 13 is driven more than the specified pulse from the reference position. When the fourth frame pulse motor 508 is driven in the state that the drive of the first and second lens groups 11 and 12 are not completed, the three motors are driven simultaneously and consequently, current consumption increases. Therefore, in such a case, only the third and fourth lens groups are driven simultaneously. Moreover, when the fourth lens group 14 is driven before the third lens group 13 reaches the position more than the specified pulse number, the interference between the third and fourth lens groups 13 and 14 occurs. Therefore, the drive of the fourth lens group 14 is initiated after the third lens group 13 is driven more than the specified pulse number.

The fourth lens group 14 is waited for detecting the reference position by the fourth frame photo-interrupter 512. In addition, the drive voltage of the fourth frame pulse motor 508 is set to be lower than that of the normal drive so as to reduce the current consumption. A place where the reference position signal (HP signal) by the fourth frame photo-interrupter 512 has changed from the L to the H becomes the reference position (HP position) of the fourth lens group 14. When the reference position (HP position) of the fourth lens group is detected, positional information of the fourth lens group 14 is reset. In this embodiment, the HP position of the fourth lens group 14 is configured to be detected by way of detecting the position of the fourth frame 41. The fourth lens group 14 is pulse-driven according to the detected reference position (HP position) by the fourth frame pulse motor 508 on the basis of the movement amount to the wide angle infinite position. The wide angle infinite position is previously set, but it can be changed by storing it in a nonvolatile memory such as the EEPROM or the like and rewriting it.

In the embodiment, as described above and shown in the timing chart of FIG. 22, the number of motors driven simultaneously can be limited up to two so as to reduce the current consumption as well as to shorten the time required for activation by the optimum drive of the motors.

Figure 23:
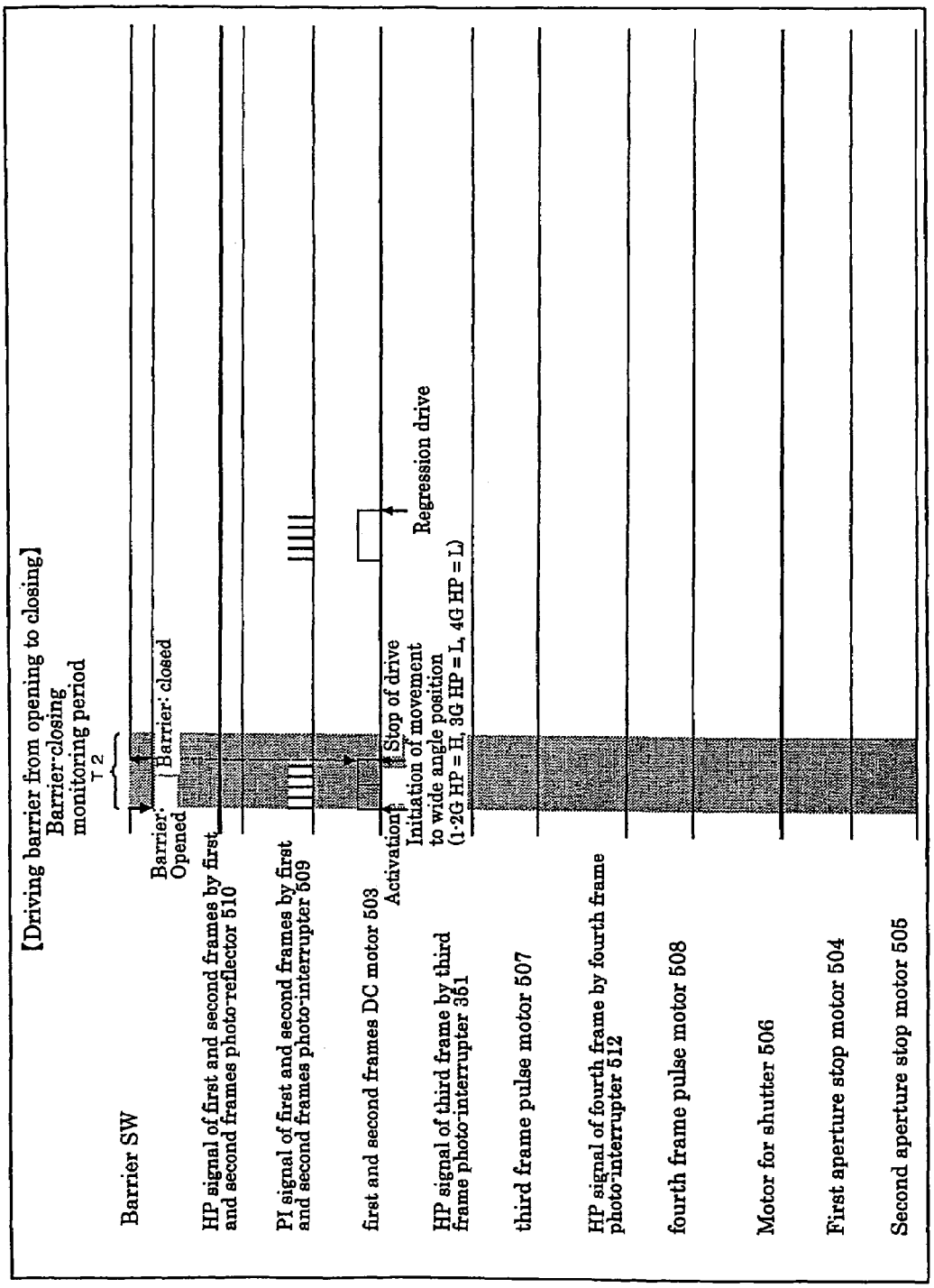
FIG. 23 is a timing chart in a starting sequence in which a lens barrier is operated from an opened position to a closed position.

Next, a case in which the barrier switch signal is changed in a closed state during a period for monitoring the barrier switch immediately after the activation of the first and second frames DC motor 503 is initiated is described with reference to FIG. 23. If the barrier switch signal is changed from the opened state to the closed state during the period, the drive of the first and second frames DC motor 503 is stopped. Thereafter, the drive of the first and second frames DC motor 503 by a movement amount or by the specified pulse number toward the direction of the collapsed position is initiated. In this case, the drive voltage is made lower so as to prevent generation of breaking and damage even if operating parts of the lens barrier hit against the first and second lens groups and so on in the end of the collapsed position. By such a control, the first and second lens groups are prevented from interfering with the lens barrier.

[Reset Sequence]

Figure 24B:
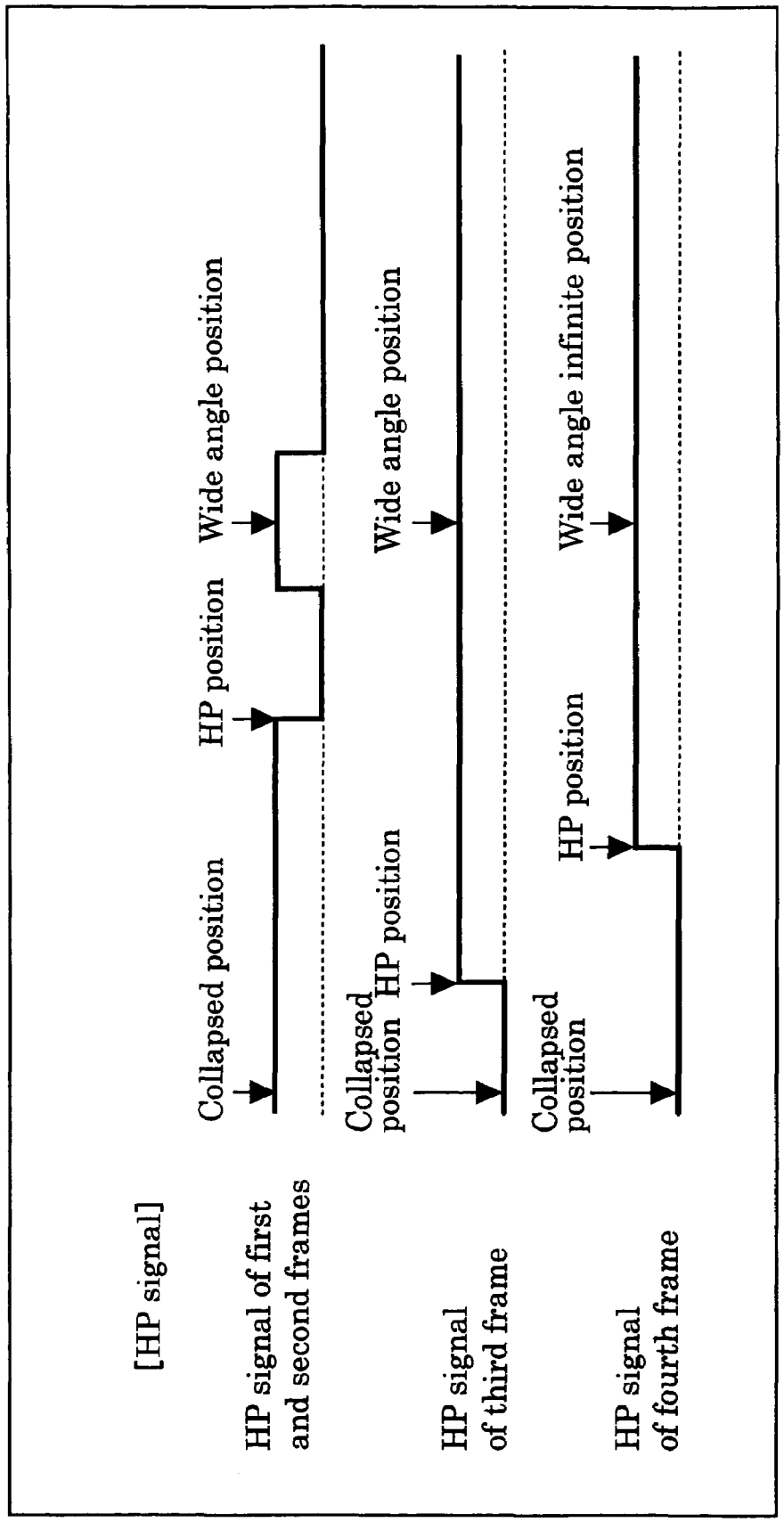
FIG. 24 A is a table showing a reset sequence of the lens barrel.
Figure 25:
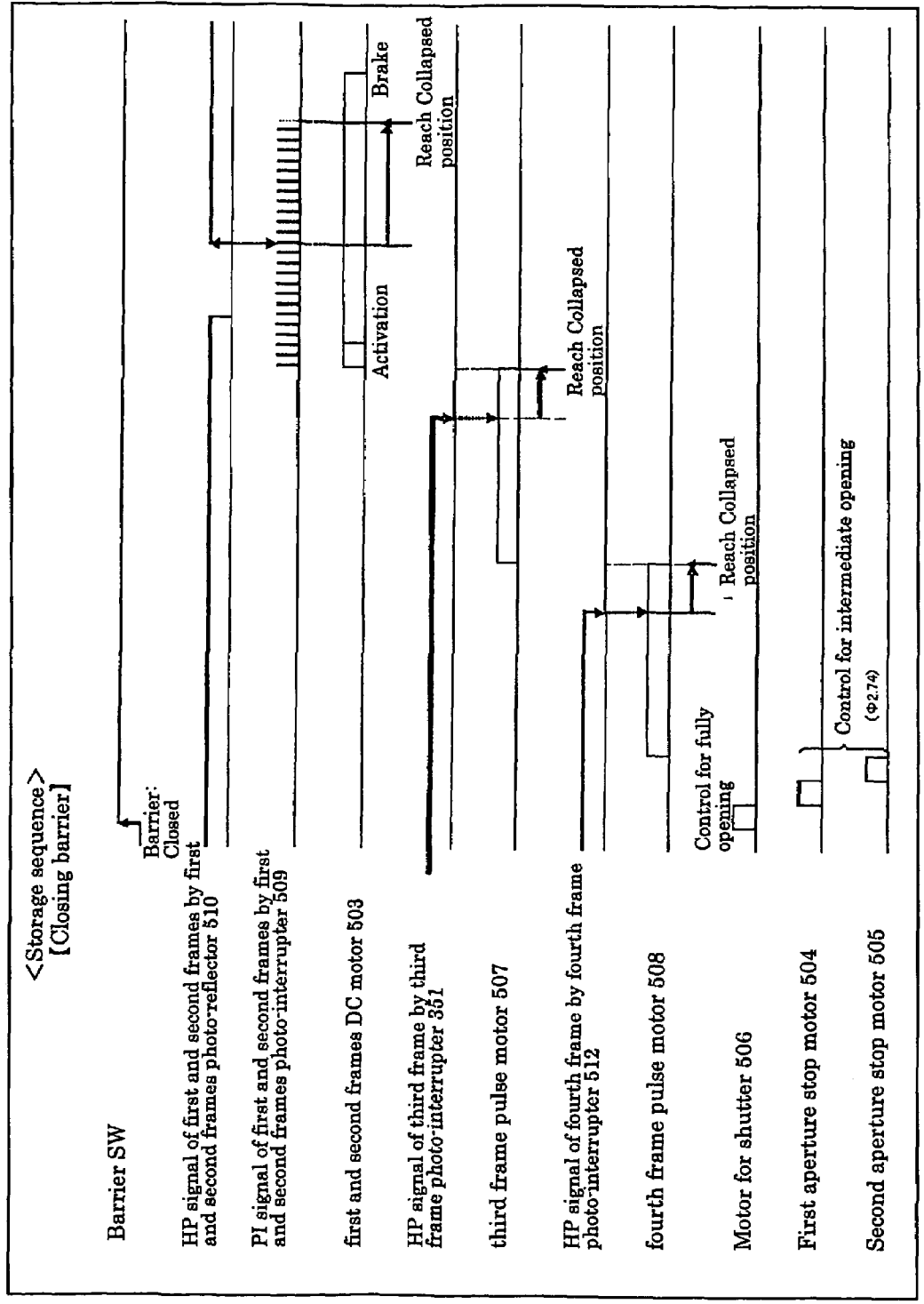
FIG. 25 is a timing chart showing a storage sequence in a state in which the lens barrier is closed.

Moreover, if the detected result of the first and second photo-reflector 510 is not the collapsed position (reference position HP, signal=L), the detected result of the third frame photo-interrupter 351 is not the collapsed position (reference position HP, signal=H), or the detected result of the fourth frame photo-interrupter 512 is not the collapsed position (reference position HP, signal=H), the reset sequence drive is executed. The reset sequence is described referring to FIGS. 24A and 24B, wherein FIG. 24A is a table showing the reset sequence of the lens barrel, and FIG. 24B is a timing chart of the HP signals.

When first and second group HP signal=H, third group HP signal=L, fourth group HP signal=L>

First, as the reset operation of the first and second lens groups 11 and 12, the reference position (HP position) of the first and second lens groups 11 and 12 is detected, and the first and second lens groups 11 and 12 are moved to the wide angle position (first and second groups: Reset). Next, as the storing operation of the fourth lens group 14, the reference position (HP position) of the fourth lens group 14 is detected, and the fourth lens group is moved to the collapsed position (fourth group: Storage). Subsequently, as the reset operation of the third lens group 13, the reference position (HP position) of the third lens group 13 is detected, and the third lens group is moved to the wide angle position (third group: Reset). Finally, as the reset operation of the fourth lens group 14, the reference position (HP position) of the fourth lens group 14 is detected, and the fourth lens group 14 is moved to the wide angle infinite position (fourth group: Reset).

<When first and second group HP signal=H, third group HP signal=L, fourth group HP signal=H>

First, as the retiring operation of the first and second lens groups 11 and 12, the first and second lens groups 11 and 12 are driven in the direction of the telephoto and pulse-driven by the specified pulse after the lowering of the reference signal is detected (first and groups; Retire). Next, as the storing operation of the fourth lens group 14, the reference position (HP position) of the fourth lens group 14 is detected, and the fourth lens group 14 is moved to the collapsed position (fourth group: Storage). Subsequently, as the reset operation of the first and second lens groups 11 and 12, the reference position (HP position) of the first and second lens groups 11 and 12 is detected, and the first and second lens groups 11 and 12 are moved to the wide angle position (first and second groups: Reset). Next, as the reset operation of the third lens group 13, the reference position (HP position) of the third lens group 13 is detected, and the third lens group 13 is moved to the wide angle position (third group: Reset). Finally, as the reset operation of the fourth lens group 14, the reference position (HP position) of the fourth lens group 14 is detected, and the fourth lens group 14 is moved to the wide angle infinite position (fourth group: Reset).

<When first and second group HP signal=H, third group HP signal=H, fourth group HP signal=L>
<When first and second group HP signal=H, third group HP signal=H, fourth group HP signal=H>

First, as the retiring operation of the first and second lens groups 11 and 12, the first and second lens groups 11 and 12 are driven in the direction of the telephoto and pulse-driven by the specified pulse after the lowering of the reference signal is detected (first and groups; Retire). Next, as the storing operation of the fourth lens group 14, the reference position (HP position) of the fourth lens group 14 is detected, and the fourth lens group 14 is moved to the collapsed position (fourth group: Storage). If the reference position (HP position) of the fourth lens group 14 can be detected, the reference position (HP position) of the third lens group 13 is detected and the third lens group 13 is moved to the collapsed position as the storing operation of the third lens group 13 (third group: Storage). If the reference position (HP position) of the fourth lens group 14 cannot be detected, because it is considered that the fourth lens group 14 is interfered with the third lens group 13, the storing operation of the third lens group 13 is previously carried out (third group: Storage). If the storing operation of the third lens group 13 is completed, the storing operation of the fourth lens group 14 is then carried out (fourth group: Storage). If the HP position is not detected at the time of operating the storage of the third lens group 13, because it is considered that the third lens group 13 is interfered with the fourth lens group 14, the third lens group 13 is driven by the specified pulse count in the direction of the telephoto as the retiring operation of the third lens group 13 (third group: Retire). Thereafter, the storing operation (fourth group: Storage) of the fourth lens group 14 and the storing operation (third group: Storage) of the third lens group 13 are carried out. Subsequently, as the reset operation of the first and second lens groups 11 and 12, the reference position (HP position) of the first and second lens groups 11 and 12 is detected, and the first and second lens groups 11 and 12 are moved to the wide angle position (first and second groups: Reset). Next, as the reset operation of the third lens group 13, the reference position (HP position) of the third lens group 13 is detected, and the third lens group 13 is moved to the wide angle position (third group: Reset). Finally, as the reset operation of the fourth lens group 14, the reference position (HP position) of the fourth lens group 14 is detected, and the fourth lens group 14 is moved to the wide angle infinite position (fourth group: Reset).

<When first and second group HP signal=L, third group HP signal=L, fourth group HP signal=L>

<When first and second group HP signal=L, third group HP signal=L, fourth group HP signal=H>

First, as the storing operation of the fourth lens group 14, the reference position (HP position) of the fourth lens group 14 is detected, and the fourth lens group 14 is moved to the collapsed position (fourth group: Storage). Next, as the storing operation of the third lens group 13, the reference position (HP position) of the third lens group 13 is detected, and the third lens group 13 is moved to the collapsed position (third group: Storage). Next, as the reset operation of the first and second lens groups 11 and 12, the reference position (HP position) of the first and second lens groups 11 and 12 is detected, and the first and second lens groups 11 and 12 are moved to the wide angle position (first and second groups: Reset). Subsequently, as the reset operation of the third lens group 13, the reference position (HP position) of the third lens group 13 is detected, and the third lens group 13 is moved to the wide angle position (third group: Reset). Finally, as the reset operation of the fourth lens group 14, the reference position (HP position) of the fourth lens group 14 is detected, and the fourth lens group 14 is moved to the wide angle infinite position (fourth group: Reset).

<When first and second group HP signal=L, third group HP signal=H, fourth group HP signal=L>

<When first and second group HP signal=L, third group HP signal=H, fourth group HP signal=H>

First, as the storing operation of the fourth lens group 14, the reference position (HP position) of the fourth lens group 14 is detected, and the fourth lens group 14 is moved to the collapsed position (fourth group: Storage). If the reference position (HP position) of the fourth lens group 14 can be detected, as the storing operation of the third lens group 13, the reference position (HP position) of the third lens group 13 is detected, and the third lens group 13 is moved to the collapsed position (third group: Storage).

If the reference position (HP position) of the fourth lens group 14 cannot be detected, because it is considered that the fourth lens group 14 is interfered with the third lens group 13, the storing operation of the third lens group 13 is previously carried out (third group: Storage). If the storing operation of the third lens group 13 is completed, the storing operation of the fourth lens group 14 is then carried out (fourth group: Storage).

If the HP position is not detected at the time of operating the storage of the third lens group 13, because it is considered that the third lens group 13 is interfered with the fourth lens group 14, the third lens group 13 is driven by the specified pulse count in the direction of the telephoto as the retiring operation of the third lens group 13 (third group: Retire). Thereafter, the storing operation (fourth group: Storage) of the fourth lens group 14 and the storing operation (third group: Storage) of the third lens group 13 are carried out.

Subsequently, as the reset operation of the first and second lens groups 11 and 12, the reference position (HP position) of the first and second lens groups 11 and 12 is detected, and the first and second lens groups 11 and 12 are moved to the wide angle position (first and second groups: Reset). Next, as the reset operation of the third lens group 13, the reference position (HP position) of the third lens group 13 is detected, and the third lens group 13 is moved to the wide angle position (third group: Reset). Finally, as the reset operation of the fourth lens group 14, the reference position (HP signal) of the fourth lens group 14 is detected, and the fourth lens group 14 is moved to the wide angle infinite position (fourth group: Reset).

[Storing Sequence]

The barrier switch signal changes from L to H by closing the lens barrier 62 to initiate the storing operation. Meanwhile, the barrier switch may be operated by mechanically closing the lens barrier 62 by means of an operating lever or the like, or the lens barrier 62 may be closed by operation of the barrier switch.

The shutter of the shutter/aperture stop unit 15 is set in the fully closed state through the full closing control of the shutter by the shutter motor 506. Next, the aperture stop of the shutter/aperture stop unit 15 is set in the intermediately restricted state through the intermediate restricting control of the aperture stop by the first and second aperture stop driving motors 504 and 505. Subsequently, the storing drive of the fourth lens group 14 is achieved through the fourth frame pulse motor 508. The standby for detecting the reference position of the fourth frame pulse motor 508 by the fourth frame photo-interrupter 512 is set after the drive of the fourth frame pulse motor 508 to the collapsed position is initiated.

The fourth frame pulse motor 508 is pulse-driven by the movement amount to the collapsed position from the place where the reference positional signal (HP signal) by the fourth frame photo-interrupter 512 changes from H to L. The movement amount to the collapsed position is previously set, but the movement amount can be changed by storing it in the nonvolatile memory such as the EEPROM or the like and rewriting it.

Next, the drive of storing the third lens group 13 is executed through the third frame pulse motor 507. The third lens group 13 is waited for detecting the reference position by the third frame photo-interrupter 511 by initiating the drive of the third frame pulse motor 507 in the direction of the collapsed position.

The third lens group 13 is pulse-driven by the movement from the place where the reference position signal (HP signal) by the third frame photo-interrupter 511 has changed from H to L to the collapsed position. Although the movement amount to the collapsed position is set previously, the movement amount can be changed by storing it in the nonvolatile memory such as the EEPROM or the like and rewriting it.

The drive pulse rate of the third frame pulse motor 507 between the reference position and the collapsed position is lower than the drive pulse rate until the reference position. In this way, a smooth pulse drive can be accomplished by changing the pulse rate in accordance with an area in which a torque is necessary.

Next, the drive of storing the first and second lens groups 11 and 12 is executed through the first and second frames DC motor 503. The first and second lens groups 11 and 12 are waited for detecting the reference position by the first and second frames photo-reflector 510 by initiating the drive of the first and second frames DC motor 503 in the direction of the collapsed position. The control for the movement amount of the first and second lens groups 11 and 12 is achieved by counting the pulse-like signal (PI signal) by the first and second frames photo-interrupter 509 to acquire the movement amount from the place where the reference position signal (HP signal) by the first and second frames photo-reflector 510 has changed from L to H to the collapsed position. Although the movement amount to the collapsed position is set previously, the movement amount can be configured to be changed by storing it in the nonvolatile memory such as the EEPROM or the like and rewriting it.

In the drive for storing the first and second lens groups 11 and 12, the PI signal is counted by the first and second frames photo-interrupter 509 without dropping the voltage of the first and second frames DC motor 503 before stopping it, and when the first and second lens groups 11 and 12 reach the collapsed position, a breaking control is achieved in order to stop the drive of the first and second lens groups 11 and 12. This is to prevent the first and second group DC motor from stopping at the middle of the drive due to the dropping of voltage.

[Changing Magnification Sequence]

Figure 26:
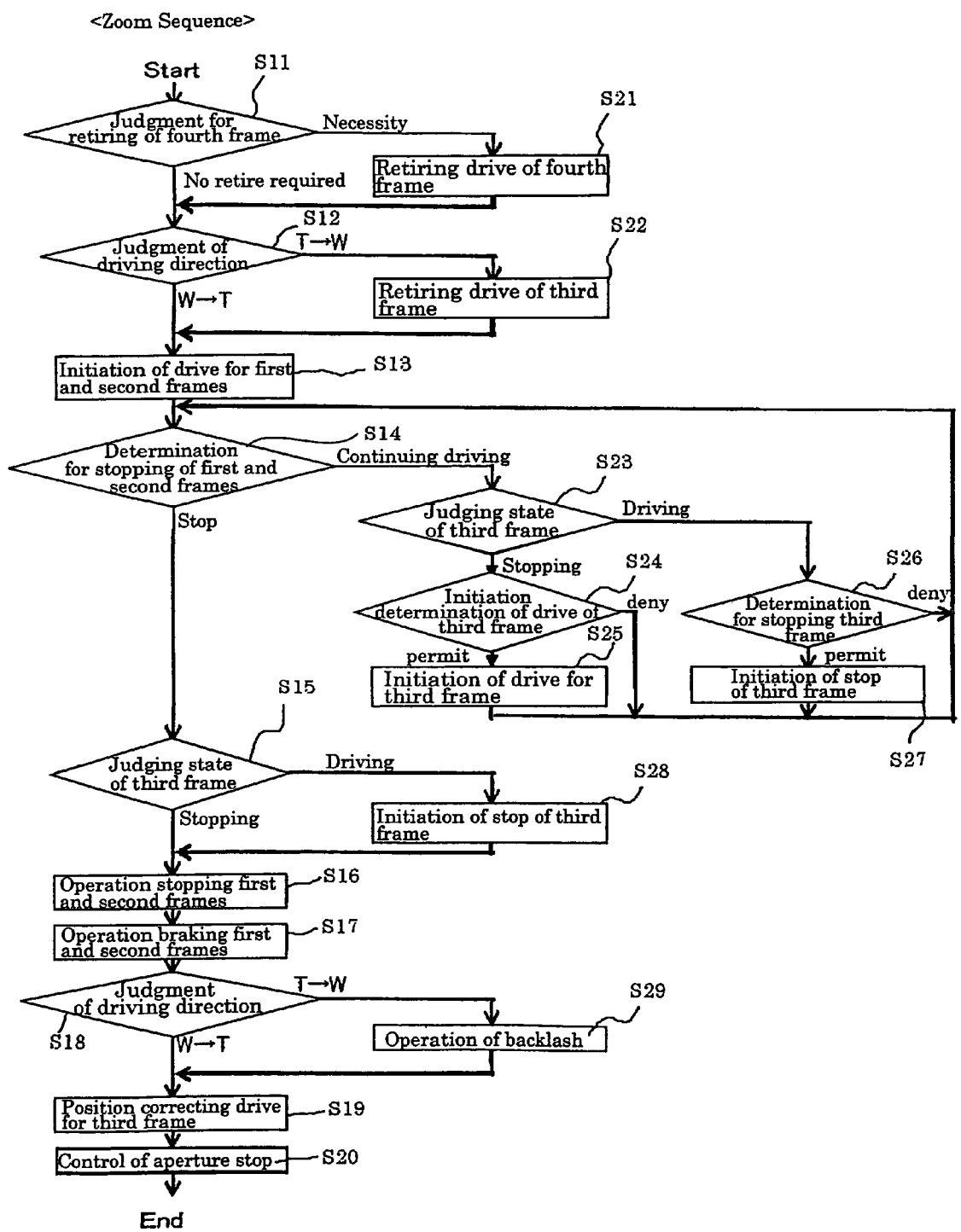
FIG. 26 is a flow chart showing a zoom sequence.

A sequence for operating a changing magnification is described with reference to a flow chart shown in FIG. 26.

When a changing magnification process is initiated by operating a zoom lever, zoom button or the like, whether it is necessary to retire the fourth lens group 14 is determined (step S11). It is determined in the step S11 that the retire process for the fourth lens group 14 is required if the fourth lens group 14 is disposed in a nearer position than a predetermined position in the changing magnification process from the telephoto to the wide angle. Next, a direction of drive of the changing magnification is determined (step S12). If it is the changing magnification from the wide angle to the telephoto, the drive of the first and second lens groups 11 and 12 is initiated by operating the first and second frames DC motor 503 (step S13).

Next, whether the first and second lens groups 11 and 12 are to be stopped is determined (step S14). It is determined in the step S14 that the first and second lens groups 11 and 12 are stopped in a case satisfying one of conditions in which: if a zoom driving switch operated by changing magnification manipulation through the zoom lever or zoom button or the like becomes off; if the first and second lens groups 11 and 12 reach a position in front of a predetermined amount from the telephoto position in the drive from the wide angle to the telephoto; and if the first and second lens groups 11 and 12 reach a position in front of a predetermined amount from the wide angle position in the drive from the telephoto to the wide angle.

If the first and second lens groups 11 and 12 are to be stopped, whether the third lens group 13 is driving is judged (step S15). If the third lens group 13 is stopping, the stopping operation of the first and second lens groups 11 and 12 is executed (step S16) and the breaking operation of the first and second lens groups 11 and 12 is executed (step S17). Subsequently, the driving direction of the changing magnification is determined (step S18). If it is the changing magnification from the wide angle to the telephoto, drive for correcting a position of the third lens group 13 is achieved (step S19), the drive of the aperture stop is executed (step S20), and the process is completed and returned from the step S20 to a process waiting state.

If it is determined that the retire process of the fourth lens group 14 is determined to be required in the step S11, the retire process of the fourth lens group 14 is executed (step S21), and the process is shifted from the step S21 to the step S12. In the step S12, if it is determined that the changing magnification driving direction is the changing magnification from the telephoto to the wide angle, the retire process of the third lens group 13 is executed (step S22), and the process is shifted from the step S22 to the step S14.

In the step S14, if it is determined that the first and second lens groups 11 and 12 continue to drive without stopping them, whether the third lens group 13 is driving is judged (step S23). If the third lens group 13 is stopping, whether the drive of the third lens group 13 is initiated is determined (step S24). It is determined in the step S24 that the drive of the third lens group 13 is permitted in a case satisfying one of conditions in which: if the first and second lens groups 11 and 12 are driven more than the specified driven amount after the initiation of the drive of the first and second lens groups 11 and 12; if the position of the third lens group 13 is away by a predetermined amount or more from the position of the first and second lens groups 11 and 12 when the first and second lens groups 11 and 12 pass a predetermined zooming point in the driving state that the third lens group 13 is re-driven from the wide angle to the telephoto; and if the position of the third lens group 13 is approaching a predetermined amount or more to the position of the first and second lens groups 11 and 12 when the first and second lens groups 11 and 12 pass a predetermined zooming point in the driving state that the third lens group 13 is re-driven from the telephoto to the wide angle. If the drive of the third lens group 13 is permitted in the step S24, the drive of the third lens group 13 is initiated (step S25), and the process is returned from the step S25 to the step S14. If the drive of the third lens group 13 is not permitted in the step S24, the process is returned from the step S24 to the step S14 directly.

In the step S23, if it is judged that the third lens group 13 is driving, whether the drive of the third lens group 13 is stopped is determined (step S26). It is determined in the step S26 that the third lens group 13 is permitted in a case satisfying one of conditions in which: if the position of the third lens group 13 approaches a predetermined amount or more to the position of the first and second lens groups 11 and 12 in the drive from the wide angle to the telephoto; and if the position of the third lens group 13 is away a predetermined or more from the position of the first and second lens groups 11 and 12 in the drive from the telephoto to the wide angle. If the stop of the third lens group 13 is permitted in the step S26, the stop of the third lens group 13 is initiated (step S27), and the process is returned from the step S27 to the step S14. In the step S26, if the stop of the third lens group 13 is not permitted, the process is returned the step S26 to the step S14 directly.

In the step S15, if it is judged that the third lens group 13 is driving, the stop of the third lens group 13 is initiated (step S28), and the process is shifted from the step S28 to the step S16. In the step S18, if it is determined that the changing magnification driving direction is the changing magnification from the telephoto to the wide angle, a backlash operation is executed (step S29), and the process is shifted from the step S29 to the step S19.

Next, a changing magnification operation according to the flow chart is explained in detail with reference to each of the direction of changing magnification.

[From Wide Angle to Telephoto]

Figure 27:
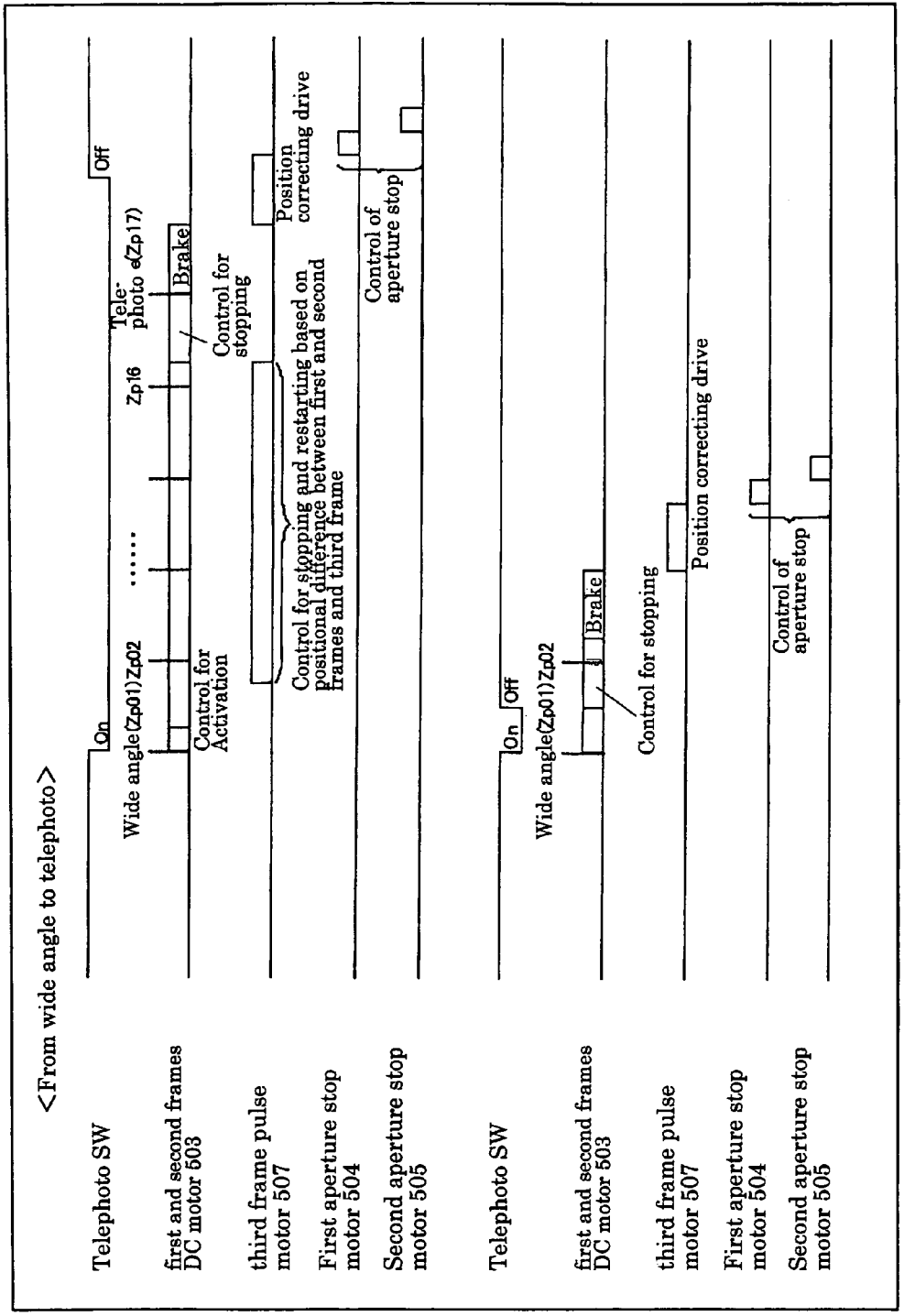
FIG. 27 is a timing chart showing a zooming sequence from the wide angle to the telephoto in zooming.

First, a changing magnification operation from the wide angle to the telephoto is described by referring to the timing chart shown in FIG. 27.

By pressing down a telephoto button of the zoom button, the telephoto switch signal changes from H to L, and thus a variable sequence to the telephoto direction is initiated. Initially, a retire determination of the fourth lens group 14 is executed (step S11).

As described above, in the retire determination of the fourth lens group 14, the fourth lens group 14 is retired only if both of the following conditions are satisfied (AND condition).

(1) Changing magnification drive from telephoto to the wide angle.
(2) The fourth lens group 14 is positioned in a nearer position to the subject (extended out position) away from a predetermined position (retired threshold position).

However, because the above-mentioned conditions are not satisfied in the drive from the wide angle to the telephoto, the fourth lens group 14 is not retired.

Next, in the driving direction, whether the third lens group 13 is to be retired is determined (step S12). In the case of the changing magnification drive from the wide angle to the telephoto, the retiring drive of the third lens group 13 is not necessary. The drive of the first and second lens groups 11 and 12 is initiated through the first and second frames DC motor 503 (step S13). In an actuating period immediately after the initiation of activation of the first and second frames DC motor 503, the drive voltage is set to be lower than the stationary voltage in order to prevent the rush current by the first and second group DC motor. After the activation period is lapsed, the drive voltage is increased to the stationary voltage. The drive voltage between the wide angle and the telephoto is set to be lower than that between the collapsed position and wide angle position. This is for the reason that a higher speed is required between the stored and wide angle positions, and hence a higher voltage is set, while a suitable voltage setting is made between the wide angle and the telephoto so as to allow the first and second frames DC motor 503 to stop at a desired position by operation of the zoom button. The control of the movement amount of the first and second lens groups 11 and 12 is achieved by counting the pulse-like signal (PI signal) by the first and second frames photo-interrupter 509. The zooming points each of which is a control reference position are set in 17 points in which a distance between the wide angle and the telephoto is divided into 16 equally.

Next, whether the first and second lens groups 11 and 12 are to be stopped is determined (step S14). In the determination for stopping the drive of the first and second lens groups 11 and 12, if either one of the following conditions is satisfied (OR condition), a stopping process is executed.

(1) A telephoto zooming drive switch operated by the changing magnification operation through the zoom lever or zoom button or the like is turned off, i.e. changed from L to H.
(2) The first and second lens groups 11 and 12 reach a position in front of the telephoto position when driving from the wide angle to the telephoto.

In a case that the driving of the first and second lens groups 11 and 12 is continuing, the judgment of driving initiation/driving stop of the third lens group 13 is executed in response to the status (during driving or stopping) of the third lens group 13 (step S23). If the third lens group 13 is stopping, the determination of drive initiation of the third lens group 13 is executed (step S24), and if the initiation is permitted, the drive of the third lens group 13 is initiated. In the step S24, the drive of the third lens group 13 is initiated if either one of the following conditions is satisfied.

(1) The first and second lens groups 11 and 12 are driven by the specified driven amount or more after the initiation of the drive of the first and second lens groups 11 and 12.
(2) During the third lens group 13 is re-driving in the drive from the wide angle to the telephoto, the position of the third lens group 13 is away by a predetermined amount from the position of the first and second lens groups 11 and 12 when the first and second lens groups 11 and 12 pass a predetermined zooming point.

Moreover, if the third lens group 13 is driving, whether the third lens group 13 is to be stopped is determined (step S26), and if the stop is permitted, the drive of the third lens group 13 is stopped. In the determination whether the third lens group 13 is to be stopped, the third lens group 13 is stopped if the condition that: the position of the third lens group 13 is positioned closer than the predetermine amount to the position of the first and second lens groups 11 and 12 in the drive from the wide angle to the telephoto, is satisfied.

More specifically, when the first and second lens group 11 and 12 are activated and the driven amount of the first and second lens groups 11 and 12 becomes the specified pulse or more, the drive of the third lens group 13 is initiated. During simultaneous drive of the first, second and third lens groups, if the position of the third lens group 13 approaches by the predetermined amount to the position of the first and second lens groups 11 and 12, the drive of the third lens group 13 is stopped. Thereafter, when the first and second lens groups 11 and 12 are away from the third lens group 13 and they are away from the third lens group 13 by a predetermined amount, the drive of the third lens group 13 is re-started. The drive and stop of the third lens group 13 are repeated in response to a positional relationship among the first and second lens groups 11 and 12, and the third lens group 13. Thereby, it is possible to achieve the changing magnification drive while maintaining a distance among the first, second, and third lens groups 11, 12 and 13. When activating these lens groups, the influence of the rush current caused by the first and second frames DC motor 503 can be avoided by initiating the drive of the third lens group 13 after the drive of the specified amount or more of the first and second lens groups 11 and 12 is carried out, and therefore the current consumption is reduced.

If the telephoto switch signal has changed from L to H before the initiation of the initial drive of the third lens group 13, the stop of the first and second lens groups 11 and 12 is controlled without the simultaneous drive of the third lens group 13 therewith. If the first and second lens groups 11 and 12 are stopped after the stop of them is determined, the stop operation of the third lens group 13 is initiated if the third lens group 13 is driving. Then, the stop of the first and second lens groups 11 and 12 is also initiated. A lower speed control period is set during the stop operation of the first and second lens groups 11 and 12, so that the drive voltage of the first and second frames DC motor 503 is lowered according to the residual pulse number to a target position. Thereby, the over-run amount of the first and second lens groups 11 and 12 when reaching the target position is decreased. If the first and second lens groups 11 and 12 reach the target position by counting the PI signal by the first and second frames photo-interrupter 509, a breaking operation is executed in order to stop the drive of the first and second lens groups 11 and 12. The overrun amount during the period of breaking is also counted to decide a final position of the first and second lens groups 11 and 12.

After the first and second lens groups 11 and 12 are stopped, a correction drive for the position of the third lens group 13 is executed. This is to compute a stopping position of the third lens group 13 corresponding to the final stopping position of the first and second lens groups 11 and 12 and drive the third lens group 13 to the stopping position. A target stopping position of the third lens group 13 corresponding to the stopping position of the first and second lens groups 11 and 12 is interpolatively computed from the positional information of the first and second lens groups 11 and 12 every the zooming point and the positional information of the third lens group 13 every the zooming point. Thereafter, the drive of the aperture stop is achieved to set a position of the aperture stop corresponding to the stopped zooming position of the third lens group 13 (step S20).

[From the Telephoto to the Wide Angle]

Figure 28:
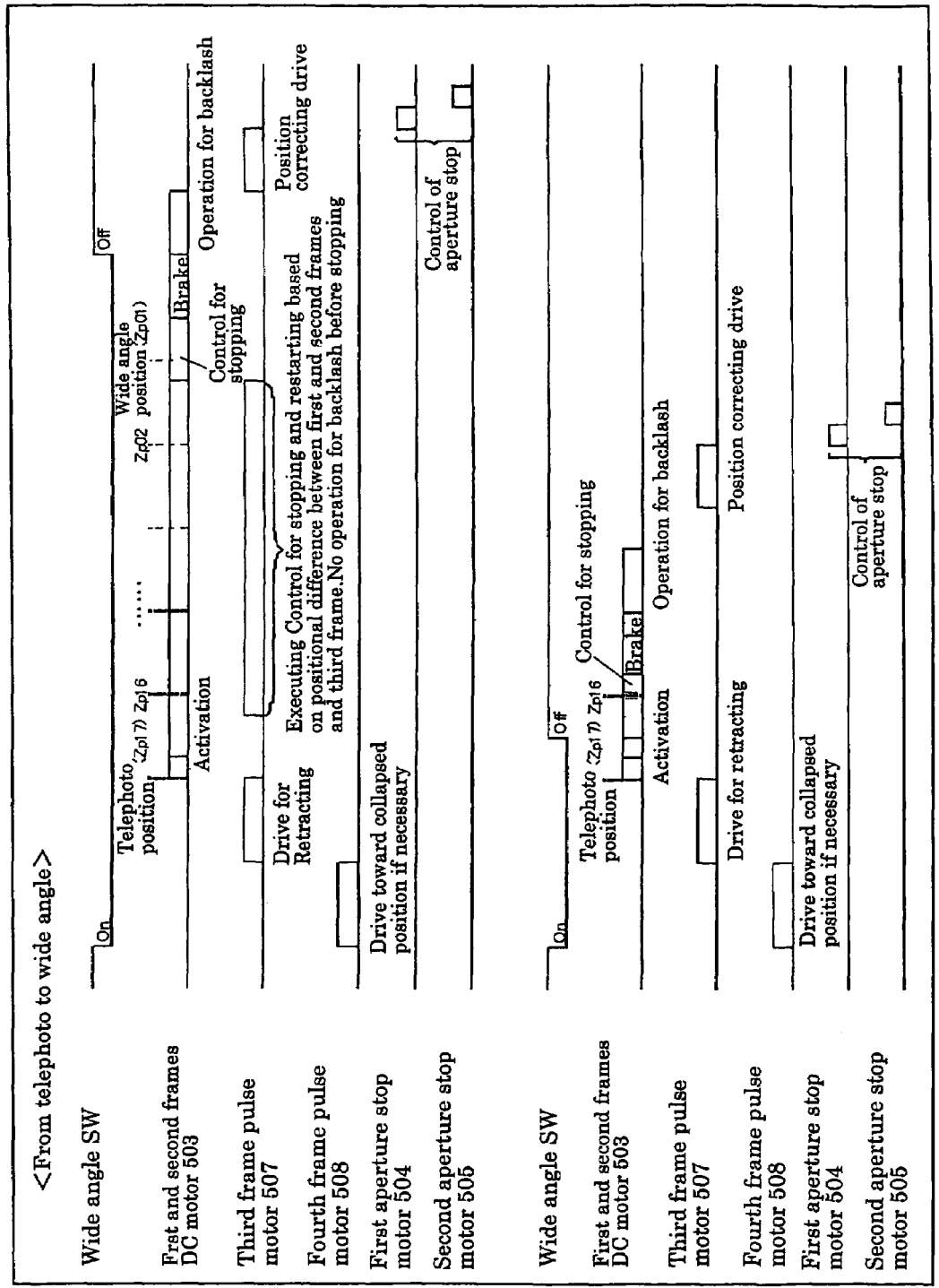
FIG. 28 is a timing chart showing a zooming sequence from the telephoto to the wide angle in zooming.

Next, a changing magnification operation from the telephoto to the wide angle is described with reference to the timing chart shown in FIG. 28.

By pressing down a wide angle button of the zoom button, the wide angle switch signal changes from H to L, and a variable sequence with respect to the wide angle direction is initiated. Initially, a retire determination of the fourth lens group 14 is executed.

As described above, in the retire determination of the fourth lens group 14, the fourth lens group is retired only if both of the following conditions are satisfied (AND condition).

(1) Changing magnification drive from telephoto to the wide angle.
(2) The fourth lens group 14 is positioned in a closer position to the subject (extended out position) away from a predetermined position (retired threshold position).

If the position of the fourth lens group 14 is in the nearer position than the predetermined position when driving from the telephoto to the wide angle, the fourth lens group 14 is retired. The retired amount is set to a range in which the third lens group 13 does not interfere with the fourth lens group 14 in the variable operation of the third lens group 13.

Next, the third lens group 13 is retired. In order to prevent the interference of the third lens group 13 with the first and second lens groups 11 and 12 due to the initiation of the drive of the first and second lens groups 11 and 12, the third lens group 13 is driven previously by the specified amount. The drive of the first and second lens groups 11 and 12 is then initiated through the first and second frames DC motor 503.

As described above, in the activation period immediately after the initiation of activation of the first and second frames DC motor 503, the drive voltage is set to be lower than the stationary voltage in order to prevent the rush current by the first and second frames DC motor 503. After the activation period is lapsed, the drive voltage is increased to the stationary voltage. The control of the movement amount of the first and second lens groups 11 and 12 is achieved by counting the pulse-like signal (PI signal) by the first and second frames photo-interrupter 509. As described above, the zooming points each of which is a control reference position are set in 17 points in which a distance between the wide angle and the telephoto is divided into 16 equally.

In the determination for stopping the drive of the first and second lens groups 11 and 12, if either one of the following conditions is satisfied (OR condition), the stopping process is executed, as described above.

(1) A telephoto zooming drive switch operated by the changing magnification operation through the zoom lever or zoom button or the like is turned off, i.e., changed from L to H.
(2) The first and second lens groups 11 and 12 reach a position in front of the telephoto position when driving from the telephoto to the wide angle.

In a case that the driving of the first and second lens groups 11 and 12 is continuing, the determination of driving initiation/driving stop of the third lens group 13 is executed in response to the status (during driving or stopping) of the third lens group 13. If the third lens group 13 is stopping, the determination for the initiation of drive of the third lens group 13 is executed, and if the initiation is permitted, the drive of the third lens group 13 is initiated. In the determination for initiating the drive of the third lens group 13, the drive of the third lens group 13 is initiated if either one of the following conditions is satisfied (OR condition).

(1) The first and second lens groups 11 and 12 are driven by the specified driven amount or more after the initiation of the drive of the first and second lens groups 11 and 12.
(2) During the third lens group 13 is re-driving in the drive from the telephoto to the wide angle, and the position of the third lens group 13 approaches by a predetermined amount to the position of the first and second lens groups 11 and 12 when the first and second lens groups 11 and 12 pass a predetermined zooming point.

Moreover, if the third lens group 13 is driving, the determination for stopping the drive of the third lens group 13 is executed, and if the stop is permitted, the drive of the third lens group 13 is stopped. In the determination whether the third lens group 13 is to be stopped, the third lens group 13 is stopped if the condition that: the position of the third lens group 13 is away by the predetermine amount or more from the position of the first and second lens groups 11 and 12 in the drive from the telephoto to the wide angle, is satisfied.

More specifically, the first and second lens group 11 and 12 are actuated, and if the driven amount of the first and second lens groups 11 and 12 becomes the specified amount or more, the drive of the third lens group 13 is initiated. During simultaneous drive of the first, second and third lens groups 11, 12 and 13, if the position of the third lens group 13 is away by the predetermined amount from the position of the first and second lens groups 11 and 12, the drive of the third lens group 13 is stopped. Thereafter, when the first and second lens groups 11 and 12 approach to the third lens group 13 and approach to the third lens group 13 by the specified amount or more, the drive of the third lens group 13 is re-started. The drive and stop of the third lens group 13 are repeated in response to a positional relationship among the first and second lens groups 11 and 12, and the third lens group 13. Thereby, it is possible to achieve the changing magnification drive while maintaining a distance among the first, second, and third lens groups 11, 12, and 13. In addition, the influence of the rush current of the first and second frames DC motor 503 can be avoided by initiating the drive of the third lens group 13 after the specified pulse or more is counted from the activation of the first and second lens groups 11 and 12. Thereby, it is possible to reduce the current consumption.

In the drive of the third lens group 13 to the wide angle direction during the drive of the first and second lens groups 11 and 12, basically a control for eliminating a backlash in the movement of the third lens group 13 is required when it is stopped. However, the backlash eliminating control is not carried out (or prohibited) during the changing magnification operation so as to accomplish a smooth movement of the third lens group 13.

If the wide angle switch signal has changed from L to H before the initiation of the initial drive of the third lens group 13, the stop of the first and second lens groups 11 and 12 is controlled without the simultaneous drive of the third lens group 13 therewith. If the first and second lens groups 11 and 12 are stopped after the stop of them is determined, the stop operation of the third lens group 13 is initiated if the third lens group 13 is driving. Then, the stop of the first and second lens groups 11 and 12 is also initiated.

During the stop operation of the first and second lens groups 11 and 12, a lower speed control period is set. Accordingly, the drive voltage of the first and second frames DC motor 503 is lowered based on the residual pulse number to a target position. Thereby, the overrun amount of the first and second lens groups 11 and 12 when reaching the target position is decreased. If the first and second lens groups 11 and 12 reach the target position by counting the PI signal by the first and second frames photo-interrupter 509, a breaking operation is executed in order to stop the drive of the first and second lens groups 11 and 12. The overrun amount during the period of breaking is also counted to decide a final position of the first and second lens groups 11 and 12.

Furthermore, the control for eliminating the backlash of the first and second lens groups 11 and 12 is executed in the movement from the telephoto to the wide angle thereof.

After the first and second lens groups 11 and 12 are stopped, a correction drive for the position of the third lens group 13 is executed. This is to compute the stopping position of the third lens group 13 corresponding to the final stopping position of the first and second lens groups 11 and 12 and drive the third lens group 13 to the stopping position. A target stopping position of the third lens group 13 corresponding to the stopping position of the first and second lens groups 11 and 12 is interpolatively computed from the positional information of the first and second lens groups 11 and 12 every the zooming point and the positional information of the third lens group 13 every the zooming point. In the drive in the wide angle direction of the third lens group 13, the control for eliminating the backlash of the third lens group 13 is executed after it is stopped. Thereafter, the drive of the aperture stop is achieved so that the aperture stop is disposed in a position corresponding to the stopped zooming position of the third lens group 13.

In this example, the drive voltage of the first and second frames DC motor 503 when it is driven in the wide angle direction is set to be higher than that in the telephoto direction in the changing magnification operation between the wide angle and the telephoto. The pulse rate of the third frame pulse motor 507 in the wide angle direction is set to be faster than that in the telephoto direction. An intermittent control for the third lens group 13 is accomplished based on the positional relationship among the first, second, and third lens groups 11, 12, and 13 in order to maintain the distance among the first, second, and third lens groups 11, 12, and 13. Therefore, the drive speed of the third lens group 13 is set to be the same as or faster than the drive speed of the first and second lens groups 11 and 12, in the movement in the telephoto direction. Similarly, the drive speed of the third lens group 13 is also set to be the same as or faster than the drive speed of the first and second lens groups 11 and 12, in the movement in the wide angle direction. With such a structure, the third lens group 13 is driven so that the third lens group 13 is not separated away from the first and second lens groups 11 and 12 in the movement in the telephoto direction, and is not caught up by the first and second lens groups 11 and 12 in the movement in the wide angle direction. In this embodiment, the drive-restarting timing of the third lens group 13 is set at a specific zooming point-passing time. It may be set at every time when the pulse signal (PI signal) generated with the first and second photo interrupter 509 at the time of driving the first and second lens groups 11~12 is detected or every given counts of PI signals. Thereby, finer intermittent control can be made to enhance intergroup accuracy.

As shown in FIG. 9, the solid image pickup element 16 such as CCD (Charge Coupled Device) is arranged behind the fourth lens group 14 that is on a side remoter from the subject. An image of the subject is focused on an input plane of this solid pickup device 16. Depending upon necessity, various optical filters such as a cover glass 18, a low-pass filter 19, and other optical elements are appropriately arranged on the input side of the solid pickup element 16.

Figure 3:
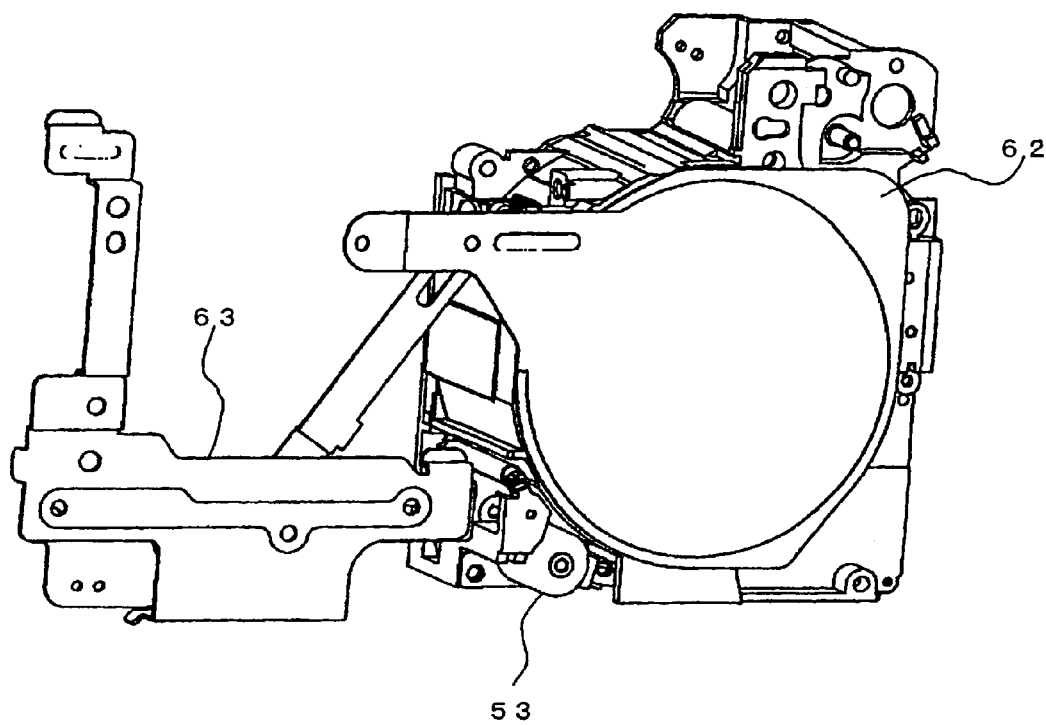
FIG. 3 is a schematic perspective view showing a structure of a main part of the optical system device including the lens barrel in which a lens barrier is closed, as viewed from the subject.
Figure 4:
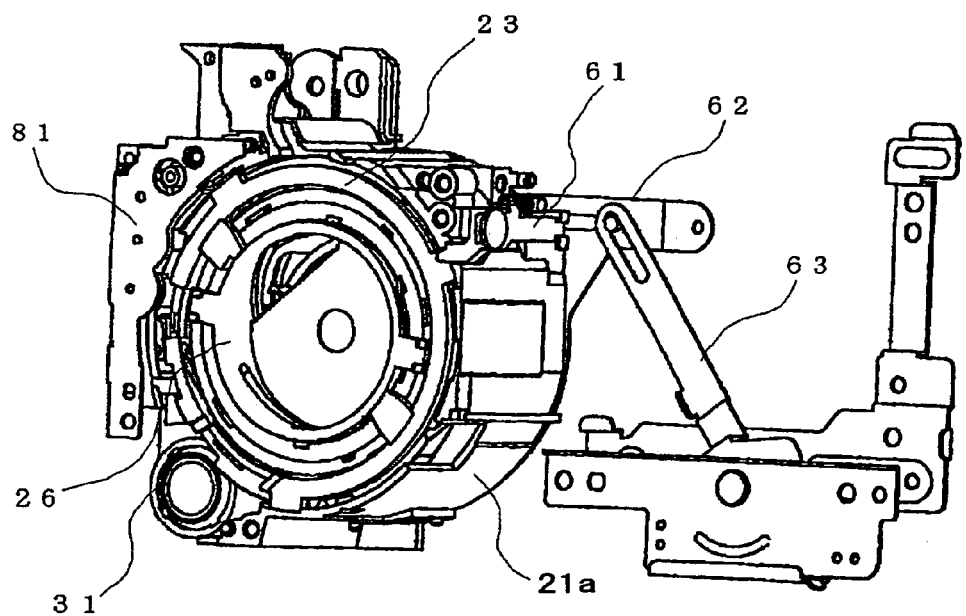
FIG. 4 is a schematic perspective view showing the structure of the main part of the lens barrel shown in FIG. 3, as viewed from the imaging plane.
Figure 5:
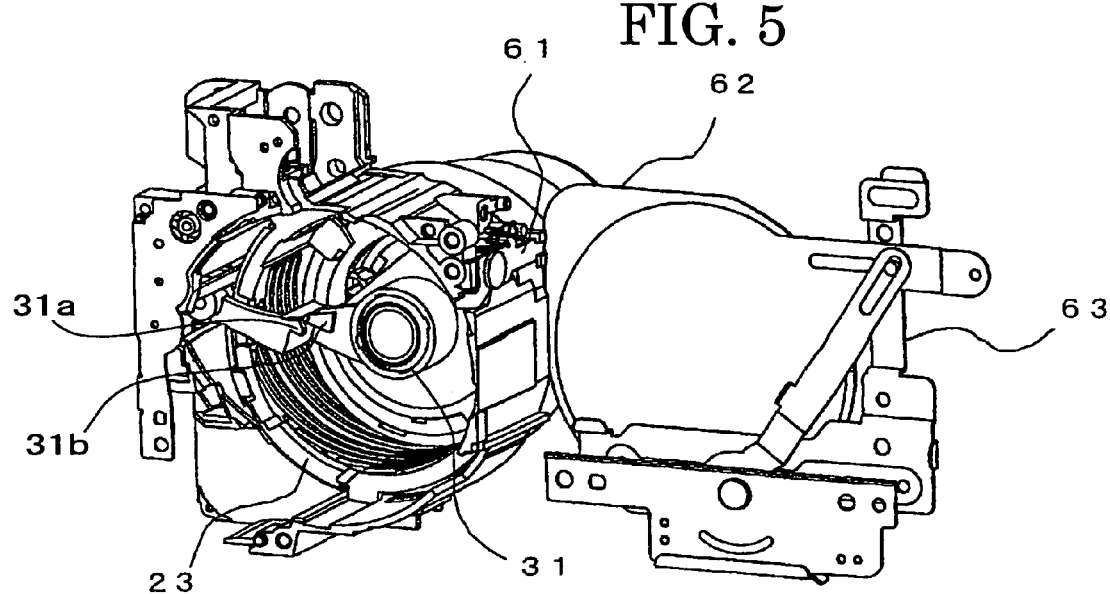
FIG. 5 is a schematic perspective view of the structure of the main part of the lens barrel in a state in which the lens barrier is opened in a photographing state with the lens groups extended, as viewed from the imaging plane.
Figure 6:
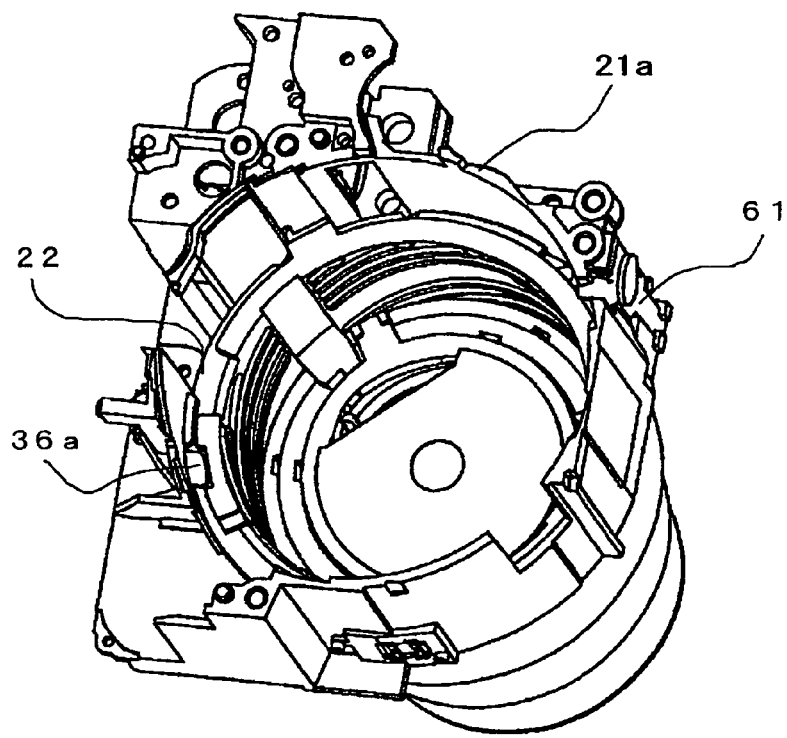
FIG. 6 is a perspective view of the structure of the main part of the lens barrel in the photographing state with the lens groups extended, as viewed from the imaging plane.

Here, a lens barrier 62 for protecting the lens barrel is described as follows. The lens barrier 62 shown in FIG. 3 to FIG. 5 is disposed to cover a side of the first lens group 11 facing the subject, in the stored state, and protects the lens group from contaminations or damages. The lens barrier 62 is moved in back and forth directions transverse to the optical axis by a barrier drive system 63. FIGS. 3 and 4 show a state in which the lens barrier 62 is closed, and FIG. 5 shows a state in which the lens barrier 62 is almost opened. The barrier drive system 63 drives the lens barrier 62 between the closed position (FIGS. 3 and 4) and the opened position (a position farther from the optical axis than the position shown in FIG. 5) through the operation of a barrier-operating element (see a barrier-operating element 301 in FIG. 17A). The barrier drive system 63 has a function to bias the lens barrier 62 in a closing direction at the closed position and in an opening direction at the opened position.

Therefore, when driving the lens barrier 62 in the closed state toward the opening direction, the lens barrier 62 is moved to the opened state semi-automatically when the lens barrier 62 passes a predetermined position. Also, when an attempt is made to close the lens barrier 62 from the opened state, the lens barrier 62 is semi-automatically moved to the closed state semi-automatically when the lens barrier 62 passes a predetermined position. The position in the closed state is not necessarily required to be the same as the predetermined position in the opened state; rather, it is preferable that the lens barrier has a certain degree of hysteresis characteristics in the movement to accomplish a smooth operation of the lens barrier 62.

A barrier control member 61 is provided on a side of the fixed frame 21 in the direction of opening the lens barrier 62 so as to be capable of sliding in a direction along the optical axis, and is biased toward the subject by a spring or the like as needed. In the stored state, an engaging portion of the barrier control member 61 which is formed into a bent shape engages with base edge surfaces of the first rotary cylinder 22 and the first liner 23 and is biased toward the image surface against biasing force of the spring, and hence is not in contact with the lens barrier 62. In the used or photographing state, the lens barrier 62 is completely away from the respective lens groups and retaining frames thereof. In this state, engagement of the engaging portion of the barrier control member 61 is released, and hence the barrier control member 61 is biased toward the subject by the biasing force, and then, a barrier-intercepting portion at the distal end enters into a passage of the lens barrier 62.

In this state, when the lens barrier 62 is rapidly operated to move the lens barrel to the collapsed position, there is a possibility that the lens barrier 62 hits against the lens barrel. However, since the barrier-intercepting portion at the distal end of the barrier control member 61 crosses the passage of the lens barrier 62 to prevent the lens barrier 62 from entering into a moving passage of the lens barrel. When the respective lens groups are stored and the stored state is completed, the base edge surfaces of the first rotary cylinder 22 and the first liner 23 engage with the engaging portion of the barrier control member 61, which is formed into the bent shape, to energize the engaging portion toward the image surface against the biasing force. Therefore, the lens barrier 62 can be moved to the front portion of the lens barrel, and hence the lens barrier 62 is correctly set to the closed position. In this manner, the interference between the lens barrier 62 and the lens cylinders retaining the lens groups can be effectively prevented.

In the above-mentioned embodiments, the structure in which the third lens group 13 is retracted out the lens cylinder unit transverse to the optical axis X has been described. In this structure, the retracted third lens group 13 has the minimum outer diameter. When the third lens group 13 having the minimum outer diameter is retracted, a projective size of the lens barrel in which the third lens group 13 is retracted can be minimized efficiently, and thus the thickness of the lens barrel can be reduced. Moreover, when the retracted lens is extended out of the fixed frame, a size of the device (at least one of the length of the main shaft and that of the lead screw) for driving the retired lens group (i.e. the third lens group) is minimized by taking a structure such that the retracted lens is not away from the imaging plane possibly. Furthermore, the lens retaining frame of the third lens group 13 or the third lens group 13 itself is larger than the lens retaining frames of the other lens groups 11, 12, 14 or the other lens groups 11, 12, 14 in length along the optical axis X, i.e., thickness. When the thickness of the third lens group 13 is larger than that of the other lens groups 11, 12, and 14, consequently, the thickness of the other lens groups decreases. Therefore, the thickness of the lens barrel can be reduced when the lens barrel is in the collapsed position. As a result, the thickness of the lens barrel or a size in the direction of the optical axis of the lens barrel is minimized. In addition, because the retract lens group or the third lens group 13 is disposed behind and adjacent the shutter having the aperture stop function, the diameter of the lens barrel is less, and the retraction of the third lens group 13 is simplified without considering the interference of the shutter with the lens group unit and separating the position of the shutter from the lens cylinder unit, excessively.

Next, a structure of the plurality of lens groups is explained in further detail. Note that the following structure or arrangement of the plurality of lens groups is exemplary, and that the structure or arrangement of the plurality of lens groups may be appropriately modified. The first lens group 11 has a positive power, the second lens group 12 has a negative power, the third lens group 13 has a positive power, and the fourth lens group 14 has a positive power. A changing magnification operation is achieved by changing at least one of intervals between the first and second lens groups 11 and 12, between the second and third lens groups 12 and 13, and between the third and fourth lens groups 13 and 14. A focusing operation is achieved by moving the fourth lens group 14 along the optical axis X to correct the position of the image plane to the image pickup plane. The shutter/aperture unit 15 is disposed between the second lens group 12 and the third lens group 13. In other words, the shutter having the function of the aperture stop is positioned in front of the third lens group 13. The four lens groups are provided in the lens cylinder unit. Because the third lens group having the minimum outer diameter is retracted out of the lens cylinder unit without separating from the image plane excessively, the retraction of the third lens group 13 can be accomplished with the minimum movement and the outer diameter of the lens barrel can be minimized. In addition, the thickness of the lens barrel is decreased by retraction of at least one lens group. Furthermore, it is possible to provide a compact lens barrel having a high changing magnification ratio, 4 times or more. Meanwhile, the lens groups may be structured from a first lens group having a positive power, a second lens group having a negative power, and a third lens group having a positive power, and the third lens group may be retracted. Alternatively, the lens groups may be structured by a first lens group having a negative power, a second lens group having a positive power, and a third lens group having a positive power, and the second lens group or the third lens group may be retracted. Each of the lens groups may be structured from one or more lenses, and the lens groups herein indicate integral one or more lenses. Therefore, all the lens groups may be structured by one lens, respectively.

As mentioned above, the third frame 31 retaining the third lens group 13 receives the moment force of the compression torsion spring 37 placed around the third group main-guide shaft 32. In the photographing state, the third lens group 13 is retained such that the stopper 31a formed at the third frame 31 is brought into contact with the third group sub-guide shaft 33 in parallel to the third group main-guide shaft 32 with the urging force of the compression torsion spring 37. Contact between the third group sub-guide shaft 33 and the stopper 31a retains the third lens group 13, on the photographing optical axis, held by the third lens group 13 retained by the third frame 31.

However, if an external force such as vibration overcoming the moment urging force of the compression torsion spring 37 acts upon the third frame 31 in the photographing state and so the third frame 31 is moved to space the third group sub-guide shaft 33 from the stopper 31a, the optical axis of the third lens group retained by the third frame may be deviated from the optical axis of the other lens groups 11, 12 and 14 positioned along the photographing optical axis.

Figure 29:
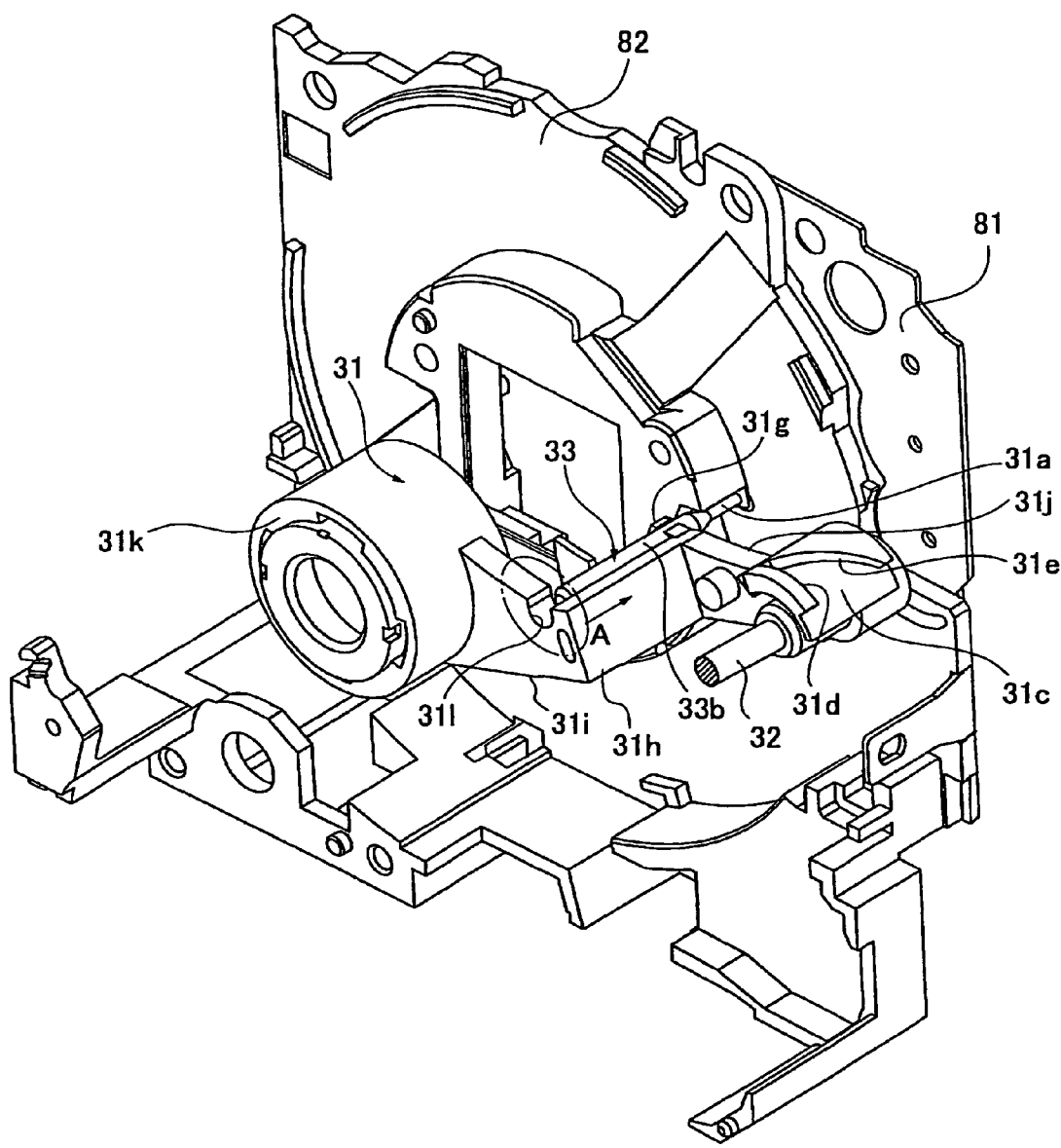
FIG. 29 is a perspective view of the third lens retaining frame at a position on the photographing optical axis from the side of the object.
Figure 30:
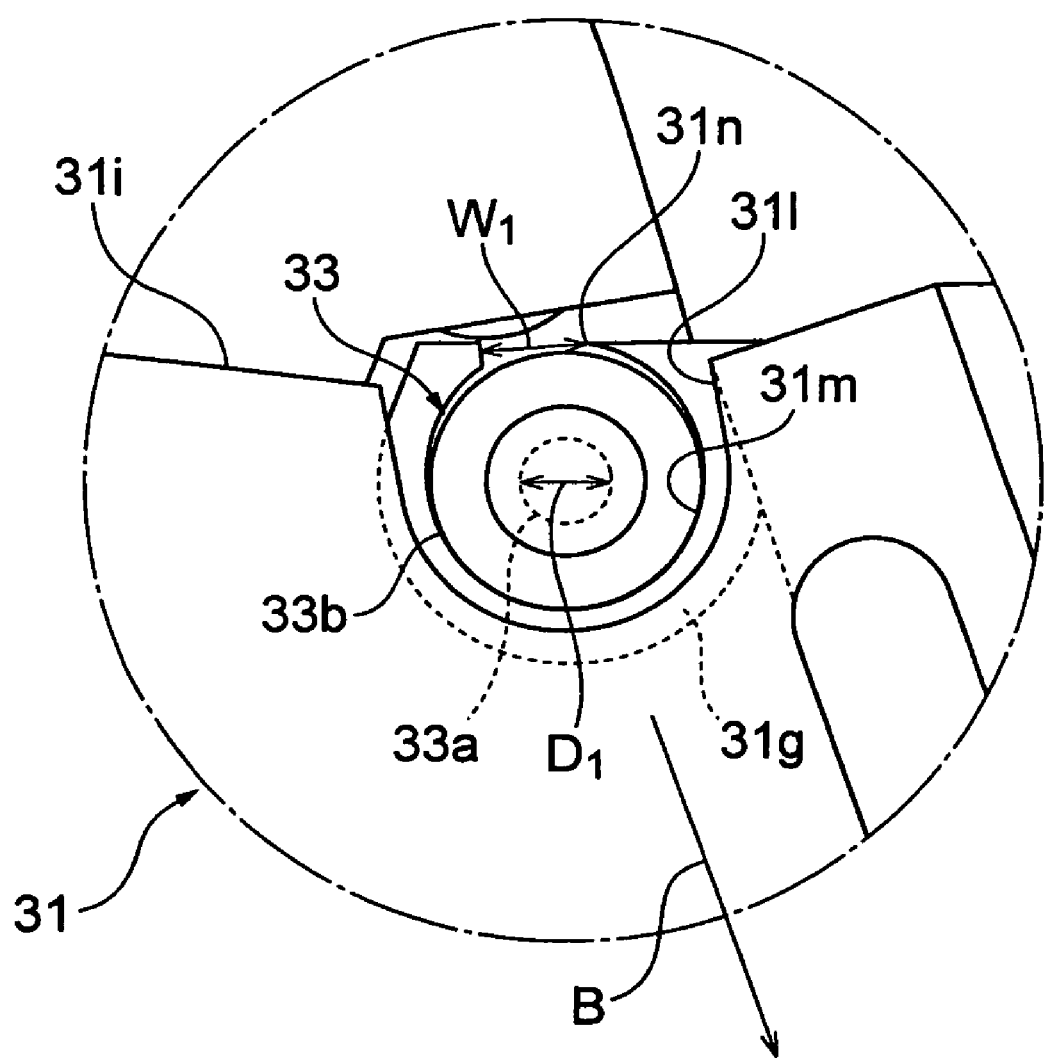
FIG. 30 is a plane view of an area shown by a two-dot chain line in FIG. 29.

In order to assuredly prevent the third lens group 13 from the photographing optical axis with the external force such as vibration, as shown in FIGS. 29 and 30, an engaging portion 31g engageable with the third group sub-guide shaft 33f is formed instead of the stopper 31a, and a diameter-reduced portion 33a is formed at a base portion of the third group sub-guide shaft 33. The third group sub-guide shaft 33 is fitted to the lens barrel base 82 as a stationary portion at its base portion where the diameter-reduced portion 33a is formed. FIG. 29 is a perspective view of the third frame 31, positioned on the photographing optical axis, as viewed from the side of the subject. FIG. 30 is a plane view of an area shown by a two-dot chain line in FIG. 29 as viewed toward the image plane side from an arrow A.

As shown in FIG. 29, the third frame 31 has a crank shape comprising an intermediate portion 31h in parallel to the photographing optical axis, that is in parallel to the third group sub-guide shaft 33, a first arm portion 31i extending at right angle to the intermediate portion from the tip of the intermediate portion, and a second arm portion 31j extending from the rear end of the intermediate portion 31h toward the third group main-guide shaft 32 and in a direction opposite to the extending direction of the first arm portion 31i. A circular retaining portion 31k retaining the third lens group 13 is formed at the tip of the first arm portion 31i. The engaging portion 31g is formed at a side opposite to the extending direction of the second arm portion 31j at the rear end of the intermediate portion 31h. The first arm portion 31i is provided with a U-shaped groove 31l to receive the third group sub-guide shaft 33 with backlash so as to prevent interference between the third group sub-guide shaft 33.

As shown in FIG. 30, the engaging portion 31g is formed with a circular hole 31m having an inner diameter almost equal to the outer diameter of the large diameter portion 33b of the third group sub-guide shaft 33 and adapted to receive the large diameter portion 33b. A cut portion 33n is formed to open an edge portion of the circular hole 31m. The cut portion 31n has a width size W1 smaller than the outer diameter of the large diameter portion 33b of the third group sub-guide shaft 33 and larger than the outer diameter D1 of the diameter-reduced portion 33a.

As shown in FIG. 30, the engaging portion 31g receives the large diameter portion 33b of the third group sub-guide shaft 33 at a position where the third frame 31 retains the third lens group 13 along the photographing optical axis. In this state, since the vibration around the third group main-guide shaft 32 is restricted with the circular hole 31m of the engaging portion 31g, the optical axis of the third lens group 13 is not so largely vibrated as to be deviated from the photographing photographing optical axis even if vibration overcoming the moment urging force of the compression torsion spring 37 acts upon the third frame 31. Thus, the third lens group 13 is permitted to move along the photographing optical axis.

The engaging portion 31g engages with the diameter-reduced portion 33a of the third group sub-guide shaft 33 at a place where the third lens group 13 is retracted from the photographing optical axis. Since the outer diameter D1 of the diameter-reduced portion 33a is smaller than the width W of the cut portion 31n, the engaging portion 31g can be released from the third sub-guide axis 33 through the cut portion 31n of the engaging portion 31g.

As a result, since the sub-guide shaft member 33 for guiding the third lens group 13 retained by the third lens group frame 31 along the other lens groups 11, 12, 14 is engaged with the engaging portion 31g provided at the retractable lens retaining frame 31, the third frame 31 is permitted to move on the third group main-guide shaft 32 along the sub-guide shaft member 33 excluding the retracted point so that the third frame can be assuredly prevented from moving away from the sub-guide shaft member. In addition, since the third frame 31 is allowed at the retracting point to move to its retracted position through the cut portion 31n as the opened portion provided at the engaging portion 31g of the third frame 31, no restraining member is newly added to restrain the third frame 31 from moving away from the sub-guide shaft member on photographing. Therefore, the retractable lens retaining frame can be assuredly prevented from moving away from the sub-guide shaft member on photographing without causing complicated construction due to the addition of such a new member, so that shake of the optical axis of the retractable lens retained by the retractable lens retaining frame can be assuredly prevented on photographing.

When the third lens group 13 retained by the retractable lens retaining frame 31 is retracted out of the inner diameter of the movable lens cylinder at the retracting point, the dimension in the photographing optical axis can be effectively reduced without considerably increasing the size within the plane orthogonal to the photographing optical axis.

Further, the engaging portion 31g provided in the retractable lens retaining frame 31 can be more assuredly and smoothly removed through the opened portion 31n of the engaging portion 31g at the retractable lens retaining frame 31 by means of the diameter-reduced portion 33a at such a portion of the sub-guide shaft member 33 as corresponding to the retracting point of the retractable lens retaining frame 31.

The sub-guide shaft member 33 is fixed to the lens barrel base 82 of the lens barrel at its base portion, and the diameter-reduced portion 33a is formed near the base portion. Thus, the retractable lens retaining frame 31 can be assuredly moved to the retracted position in the collapsing operation.

The retractable lens retaining frame 31 receives one-direction rotation urging force toward the photographing optical axis of the other lens groups 11, 12, 14 as well as the urging force in the collapsing direction along the optical axis of the other lens groups 11, 12 and 14 by means of the urging element 37. Therefore, the retractable lens group retained by the retractable lens retaining frame can be stably operated with further simplified construction at a lower cost and a reduced space.

Referring now to FIG. 17A to FIG. 19, a camera including an optical system device having the lens barrel according to the present invention as shown in the first embodiment will be described as a second embodiment. Although the lens barrel is applied to the camera here, the lens barrel is also applicable to a lens driving apparatus, an optical device, etc. In addition, the lens barrel according to the present invention as shown in the first embodiment is also applicable to a mobile information terminal such as so-called PDA (Personal Data Assistant), a mobile phone and so on, having a camera function or functional part installed therein.

Many of such mobile information terminals have the function and the structure substantially identical to the function and the structure of the camera, although the appearance is slightly different. Therefore, the optical system device including the lens barrel according to the present invention may be employed in such mobile information terminals. Further, the lens barrel according to the present invention may be applied to an image forming device such as a copying machine, a scanner or the like.

Figure 17A:
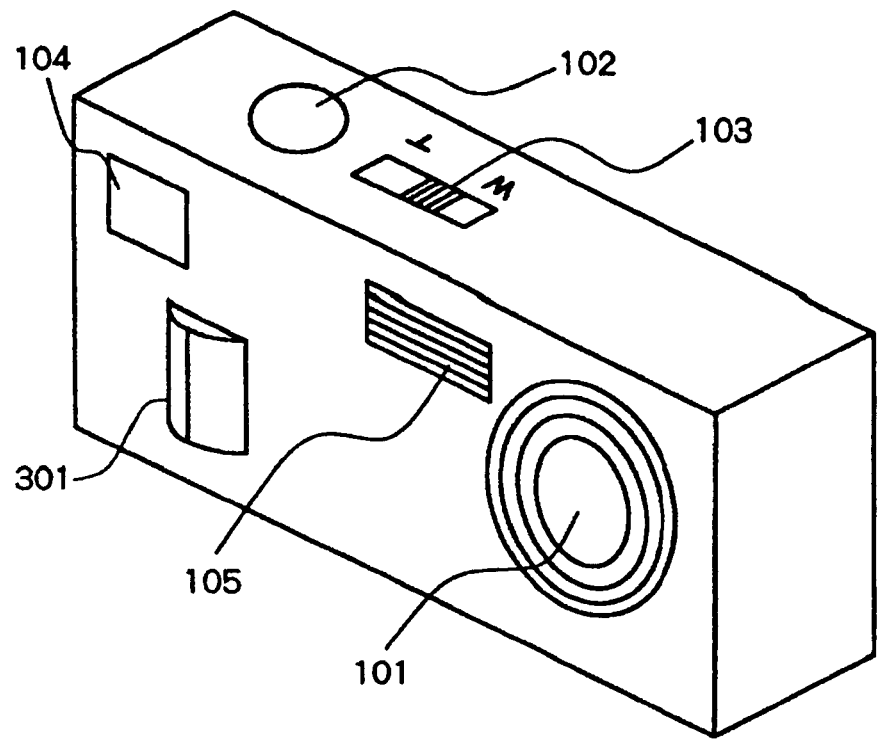
Figure 17B:
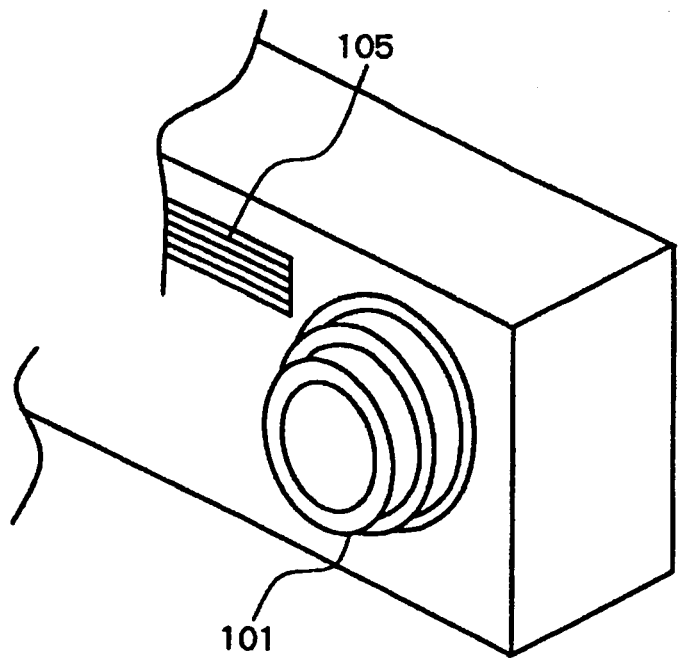
Figure 18:
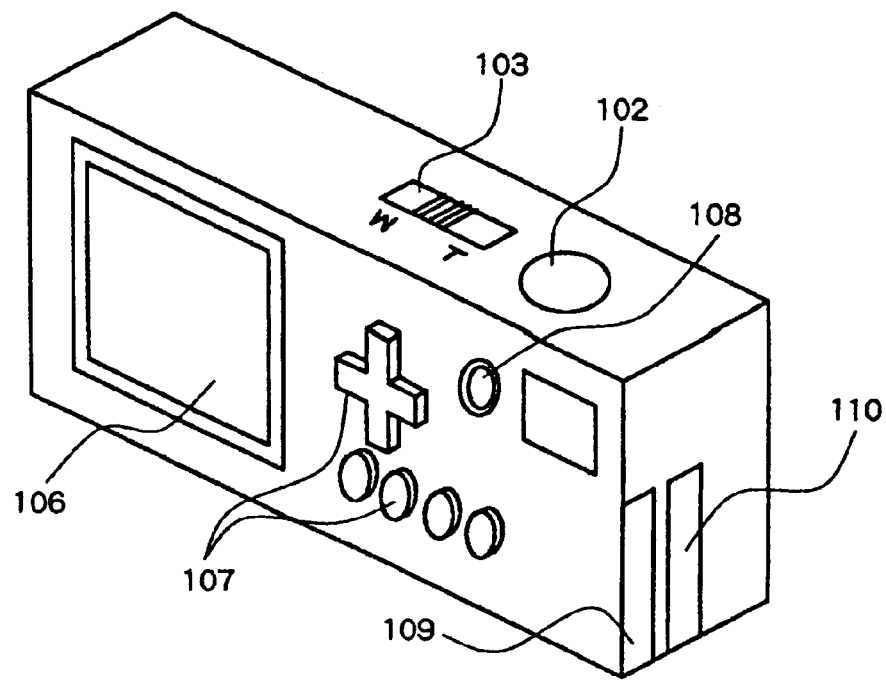
FIG. 18 is a perspective view schematically showing the exterior appearance and structure of the camera of FIGS. 17A and 17B as viewed from a user.
Figure 19:
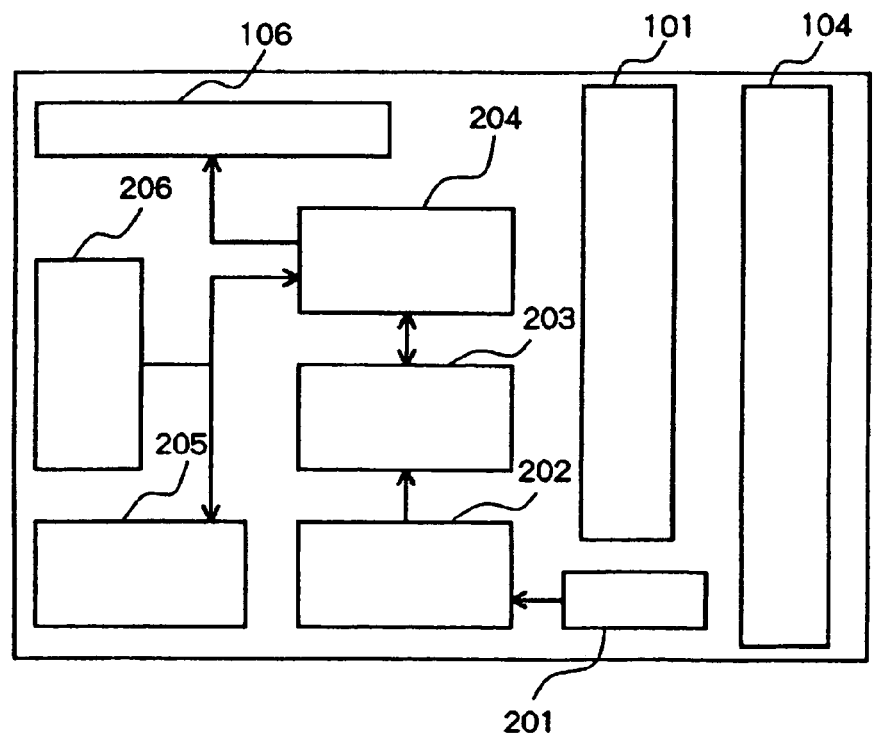
FIG. 19 is a block diagram schematically showing a functional structure of the camera of FIGS. 17A and 17B.

As shown in FIG. 17A, FIG. 17B and FIG. 18, the camera includes an image pickup lens 101, a shutter button 102, a zoom lever 103, a finder 104, a strobe light 105, a liquid crystal display (LCD) 106, an operating button 107, a power switch 108, a memory card slot 109, an expansion card slot 110, the barrier-operating element 301 and so on. Furthermore, as shown in FIG. 19, the camera also includes a photodetector 201, a signal-processing unit 202, an image-processing unit 203, a central processing unit (CPU) 204, a semiconductor memory 205, and an expansion card 206. Although it is not shown specifically, electric power is supplied from a battery as an electric source to the above-mentioned parts to operate the parts.

The photodetector 201 serves as an area sensor such as a CCD (Charge Coupled Device) image pickup element or the like to read an image of a subject to be photographed, that is, of an photographing subject, formed by the image pickup lens 101, which is a photographing optical system. As the image pickup lens 101, the optical system device including the lens barrel according to the present invention as described in the first embodiment is employed. More specifically, the optical system device includes a plurality lens groups as optical elements and a telescopic cylinder unit retaining the lens groups, which structure the lens barrel. The lens barrel has a mechanism of retaining the respective lens groups in the lens cylinder such that the lens groups can be moved in response to the movement of the lens cylinder along the optical axis of the lens groups, similarly to the above-mentioned embodiment. The image pickup lens 101 to be integrated in the camera is generally integrated in the form of this optical system device.

An output from the photodetector 201 is processed by the signal-processing unit 202, which is controlled by the central processing unit 204, and is converted into digital image information. The image information digitized by the signal-processing unit 202 is subjected to a predetermined image processing in the image-processing unit 203 which is also controlled by the central processing unit 204, and then stored in the semiconductor memory 205 such as a non-volatile memory. In this case, the semiconductor memory 205 may be a memory card inserted in the memory card slot 109, or may be a semiconductor memory integrated in a body of the camera. The liquid crystal display 106 may display the photographing image or may display the image stored in the semiconductor memory 205. An image stored in the semiconductor memory 205 can be transmitted to the outside of the camera via the expansion card 206 inserted in the expansion card slot 110. Meanwhile, the above-mentioned central calculation processing device 501 shown in FIG. 21 to control the drive of the lens groups may be included in the central processing unit 204, otherwise structured by use of other micro-processor connecting with the central calculation processing device 501.

The image pickup lens 101 is embedded within the camera body into a collapsed or stored state as shown in FIG. 17A when being transported or carried by a user, and the lens barrier 62 is closed. When the user operates the barrier-operating element 301 to open the lens barrier 62, the power is turned on and the lens barrel is moved from the closed position to an opened position and projected from the camera body as shown in FIG. 17B, so that the photographing state is established. At this time, the image pickup lens 101 within the lens barrel is set so that the respective lens groups of the optical systems structuring a zoom lens are arranged, for example, at a short focal length wide angle position. When the zoom lever 103 is operated, the arrangement of the respective lens groups in the optical system is changed through the movement of the lens groups along the optical axis, and therefore, the zoom can be varied to the telephoto position.

Preferably, an optical system of the finder 104 is configured such that the zooming is varied in association with the change of the angle of field of the image pickup lens 101.

In many cases, focusing is achieved by half-pressing operation of the shutter button 102. The focusing with the zoom lens in the lens barrel according to the present invention is achieved mainly by moving the fourth lens group 14, although it is not limited thereto. When the shutter button 102 is further pressed to a completely pressed state, the photographing is achieved, and subsequently the processing as described above is performed.

In order to display the image stored in the semiconductor memory 205 on the liquid crystal display 106 or transmit the same to the outside of the camera via the expansion card 206, the operating button 107 is operated in a predetermined manner. The semiconductor memory 205 and the communication card 206 or the like are used by being inserted in a specific or multi-purpose slot such as the memory card slot 109 and the communication car slot 110.

When the image pickup lens 101 is in the stored state, the third lens group 13 is retracted from the optical axis to the retracted position outside of the telescopic cylinder unit, and hence is stored in a line with the first lens group 11 and the second lens group 12 in a juxtaposed manner. Therefore, further reduction in thickness of the camera is achieved.

Generally, because a finder mechanism is disposed above the lens barrel, therefore, certain camera operation is easy. Moreover, if the lens barrel includes a zoom changing magnification mechanism, because the finder mechanism also needs the zoom changing magnification mechanism, it is preferable that a drive source (DC motor, pulse motor or the like) for conducting the zoom changing magnification operation and a transmission mechanism (gear connecting mechanism or the like) for transferring a driving force of the drive source to the lens groups are disposed adjacent the finder mechanism. For example, if the finder mechanism is disposed on upper and left position of the lens barrel, the drive source and the transmission mechanism are disposed adjacent the upper and left position of the lens barrel to use a limited space effectively. When the frame for the retractable lens group (third lens group 13 according to the embodiment) is retracted, the retaining frame is stored below the lens barrel in consideration of the left space. The space is lower and right position or lower and left position of the lens barrel. In the embodiment, the space is disposed on the lower and right position of the lens barrel to store the retaining frame of the retracted third lens group. The above-mentioned storage part of the fixed lens cylinder is disposed at the position. The drive source and the transmission mechanism for driving the lens groups are disposed at the lower and left position. As a result, a miniaturized lens barrel can be accomplished with effective use of fourth corners, the upper and left position, the upper and right position, the lower and right position, and the lower and left position of a lens barrel.

When the lens barrel according to the present invention is used for the digital camera, the size in the photographing or photographing optical axis of the digital camera can be effectively decreased without conspicuously increasing the size inside the plane orthogonal to the photographing optical axis of the digital camera.

Furthermore, when the lens barrel according to the present invention is used in the mobile information terminal, the size in the photographing optical axis of the mobile information terminal can be effectively decreased without conspicuously increasing the size inside the plane orthogonal to the photographing optical axis of the terminal.

Furthermore, when the lens barrel according to the present invention is used in the image input device such as the scanner, the size in the photographing optical axis of the image input device can be effectively decreased without conspicuously increasing the size inside the plane orthogonal to the photographing optical axis of the image input device.

Although the present invention has been described in terms of exemplary embodiments, it is not limited thereto. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A lens barrel, comprising:
   a) a plurality of lens groups each having at least one lens;
   b) a plurality of lens retaining frames each retaining corresponding one of the plurality of the lens groups, said plurality of the lens retaining frames comprising a retractable lens retaining frame,
   c) lens retaining frame driving devices configured to drive the plurality of the lens retaining frames,
   said retractable lens retaining frame being configured to retain and move at least one lens group such that at least one of the plurality of lens groups is moved outside a telescopic cylinder containing therein the other lens groups, said telescopic cylinder being constituted by movable lens cylinders for said the other lens groups, respectively;

d) a main-guide shaft member which is in parallel to said optical axis of the other lens group or groups and supports the retractable lens retaining frame rotatably in longitudinal and circumferential directions of the main-guide shaft member, and e) a sub-guide shaft member configured to guide said retractable lens retaining frame along the optical axis, said sub-guide shaft member being configured to allow said retractable lens retaining frame to be retracted toward the retracted position at a retracting point on said main-guide shaft member and to guide said retractable lens retaining frame on the main-guide shaft member along said optical axis at other than the retracting point, said retractable lens retaining frame being formed with an engaging portion configured to engage with the sub-guide shaft member and to be guided along the sub-guide shaft member, and said engaging portion being formed with an opened portion configured to allow said retractable lens retaining frame to be released from the sub-guide shaft member at said retracting point.

2. The lens barrel claimed in claim 1, wherein said movable lens cylinders retain said movable lens retaining frames therein, said movable lens retaining frames are driven by said lens retaining frame driving devices via said movable lens cylinders, respectively, and said retractable lens retaining frame retracts said at least one retractable lens outside inner diameter portions of said movable lens cylinders at said retracting point.

3. The lens barrel claimed in claim 1, wherein the sub-guide shaft member is formed with a diameter-reduced portion at a position corresponding to said retracting point of said retractable lens retaining frame, said diameter-reduced portion being configured to be released from the engaging portion through the opened portion.

4. The lens barrel claimed in claim 2, wherein the sub-guide shaft member is formed with a diameter-reduced portion at a position corresponding to said retracting point of said retractable lens retaining frame, said diameter-reduced portion being configured to be released from the engaging portion through the opened portion.

5. The lens barrel set forth in claim 3, wherein a base portion of said sub-guide shaft member is fixed to a stationary portion of a lens barrel body, and said diameter-reduced portion is formed near said base portion.

6. The lens barrel set forth in claim 4, wherein a base portion of said sub-guide shaft member is fixed to a stationary portion of a lens barrel body, and said diameter-reduced portion is formed near said base portion.

7. The lens barrel set forth in claim 1, which comprises an urging device and wherein said retractable lens retaining frame receives one direction rotation urging force toward the optical axis and an urging force toward a collapsing direction along the optical axis from the urging device.

8. The lens barrel set forth in claim 2, which comprises an urging device and wherein said retractable lens retaining frame receives one direction rotation urging force toward the optical axis and an urging force toward a collapsing direction along the optical axis of the other lens groups from the urging device.

9. The lens barrel set forth in claim 3, which comprises an urging device and wherein said retractable lens retaining frame receives one direction rotation urging force toward the optical axis and an urging force toward a collapsing direction along the optical axis of the other lens groups from the urging device.

10. The lens barrel set forth in claim 4, which comprises an urging device and wherein said retractable lens retaining frame receives one direction rotation urging force toward the optical axis and an urging force toward a collapsing direction along the optical axis of the other lens groups from the urging device.

11. The lens barrel set forth in claim 5, which comprises an urging device and wherein said retractable lens retaining frame receives one direction rotation urging force toward the optical axis and an urging force toward a collapsing direction along the optical axis of the other lens groups from the urging device.

12. The lens barrel set forth in claim 6, which comprises an urging device and wherein said retractable lens retaining frame receives one direction rotation urging force toward the optical axis and an urging force toward a collapsing direction along the optical axis of the other lens groups from the urging device.

13. A digital camera comprising the lens barrel claimed in claim 1.

14. A mobile information terminal comprising the lens barrel claimed in claim 1.

15. An image inputting device comprising the lens barrel claimed in claim 1.

16. A digital camera comprising the lens barrel claimed in claim 2.

17. A mobile information terminal comprising the lens barrel claimed in claim 2.

18. An image inputting device comprising the lens barrel claimed in claim 2.

19. A digital camera comprising the lens barrel claimed in claim 3.

20. A mobile information terminal comprising the lens barrel claimed in claim 3.

21. An image inputting device comprising the lens barrel claimed in claim 3.

22. A digital camera comprising the lens barrel claimed in claim 4.

23. A mobile information terminal comprising the lens barrel claimed in claim 4.

24. An image inputting device comprising the lens barrel claimed in claim 4.

* * * * *